United States Patent [19]
Yamauchi et al.

[11] Patent Number: 5,649,102
[45] Date of Patent: Jul. 15, 1997

[54] DISTRIBUTED SHARED DATA MANAGEMENT SYSTEM FOR CONTROLLING STRUCTURED SHARED DATA AND FOR SERIALIZING ACCESS TO SHARED DATA

[75] Inventors: Masahiko Yamauchi, Kokubunji; Satoshi Yoshizawa, Kawasaki; Hideki Murayama, Kunitachi; Takehisa Hayashi, Sagamihara; Akira Kito, Ebina; Hiroshi Yashiro; Tsutomu Goto, both of Kokubunji; Kimitoshi Yamada, Hadano; Toru Horimoto, Atsugi, all of Japan

[73] Assignee: Hitachi, Ltd., Tokyo, Japan

[21] Appl. No.: 348,099

[22] Filed: Nov. 25, 1994

[30] Foreign Application Priority Data

| Nov. 26, 1993 | [JP] | Japan | 5-296300 |
| Nov. 30, 1993 | [JP] | Japan | 5-299383 |
| Oct. 7, 1994 | [JP] | Japan | 6-243677 |

[51] Int. Cl.⁶ .................................................. G06F 15/16
[52] U.S. Cl. .................... 345/200.03; 395/475; 395/468; 395/497.02
[58] Field of Search ............... 395/200.03, 200.07, 395/200.08, 468, 474–480, 497.01, 497.02, 419, 420

[56] References Cited

U.S. PATENT DOCUMENTS

| 3,886,525 | 5/1975 | Brown et al. ........................... 395/375 |
| 4,992,930 | 2/1991 | Gilfeather et al. ..................... 395/425 |

FOREIGN PATENT DOCUMENTS

| 2263797 | 8/1993 | United Kingdom . |
| PCT/US93/05853 | 6/1993 | WIPO . |

OTHER PUBLICATIONS

UNIX System Call–Programming, by Marc J. Rochkind, Ascii Publications, 1987, pp. 299–315.

Distributed Operating System, Next to came after UNIX, by Mamoru Maekawa et al., Kyoritsu Publications, 1991, pp. 124–141.

Implementation and Performance of Munin, by J.B. Carter et al., of the 13th ACM Symposium on Operating Systems Principles, 1991, pp. 152–164.

Paralalel Processing Machine by Masaharu Tomita et al., Ohm Co., 1989, pp. 133–134.

Primary Examiner—Matthew M. Kim
Attorney, Agent, or Firm—Antonelli, Terry, Stout & Kraus, LLP

[57] ABSTRACT

A distributed shared memory management system for a distributed shared memory computer system having a plurality of computers interconnected by a network, each computer having an independent address space and logically sharing data physically distributed to a storage of each computer. Each computer running a program for reading/changing the shared data includes a coherence control designation command for designating to enter a mutual exclusion state in which two or more computers cannot change the logically single shared data, a coherence control release command for designating a release of the mutual exclusion state, and a coherence control execution command for reflecting the contents of the shared data changed between the coherence control designation command and the coherence control release command, upon the logically single shared data in another computer. At least one of the plurality of computers includes a request message queue for storing a coherence control request message issued by the coherence control execution command when the coherence control designation command is executed. The coherence control designation command includes data for designating the order of reading/changing the shared data, and the request message queue includes a counter for storing a current state regarding the control of the order of reading/changing the shared data and a unit for storing a value regarding the control of the order of reading/changing the shared data.

22 Claims, 42 Drawing Sheets

U.S. PATENT DOCUMENTS

| | | | |
|---|---|---|---|
| 5,129,093 | 7/1992 | Muramatsu et al. | 395/800 |
| 5,214,759 | 5/1993 | Yamaoka et al. | 395/200 |
| 5,226,039 | 7/1993 | Frank et al. | 370/60 |
| 5,247,629 | 9/1993 | Casamatta et al. | 395/475 |
| 5,265,232 | 11/1993 | Gannon et al. | 395/425 |
| 5,333,265 | 7/1994 | Orimo et al. | 395/200 |

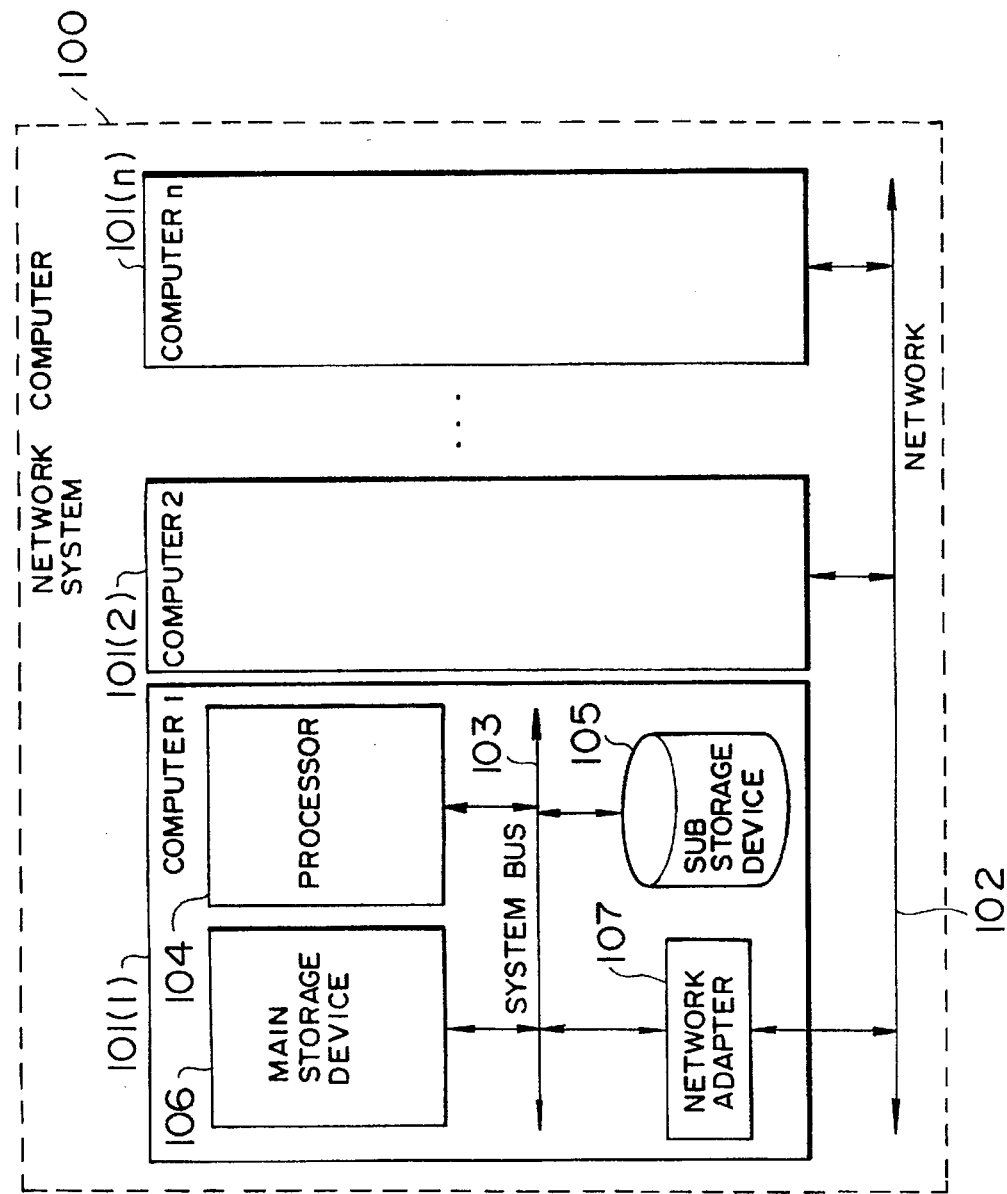

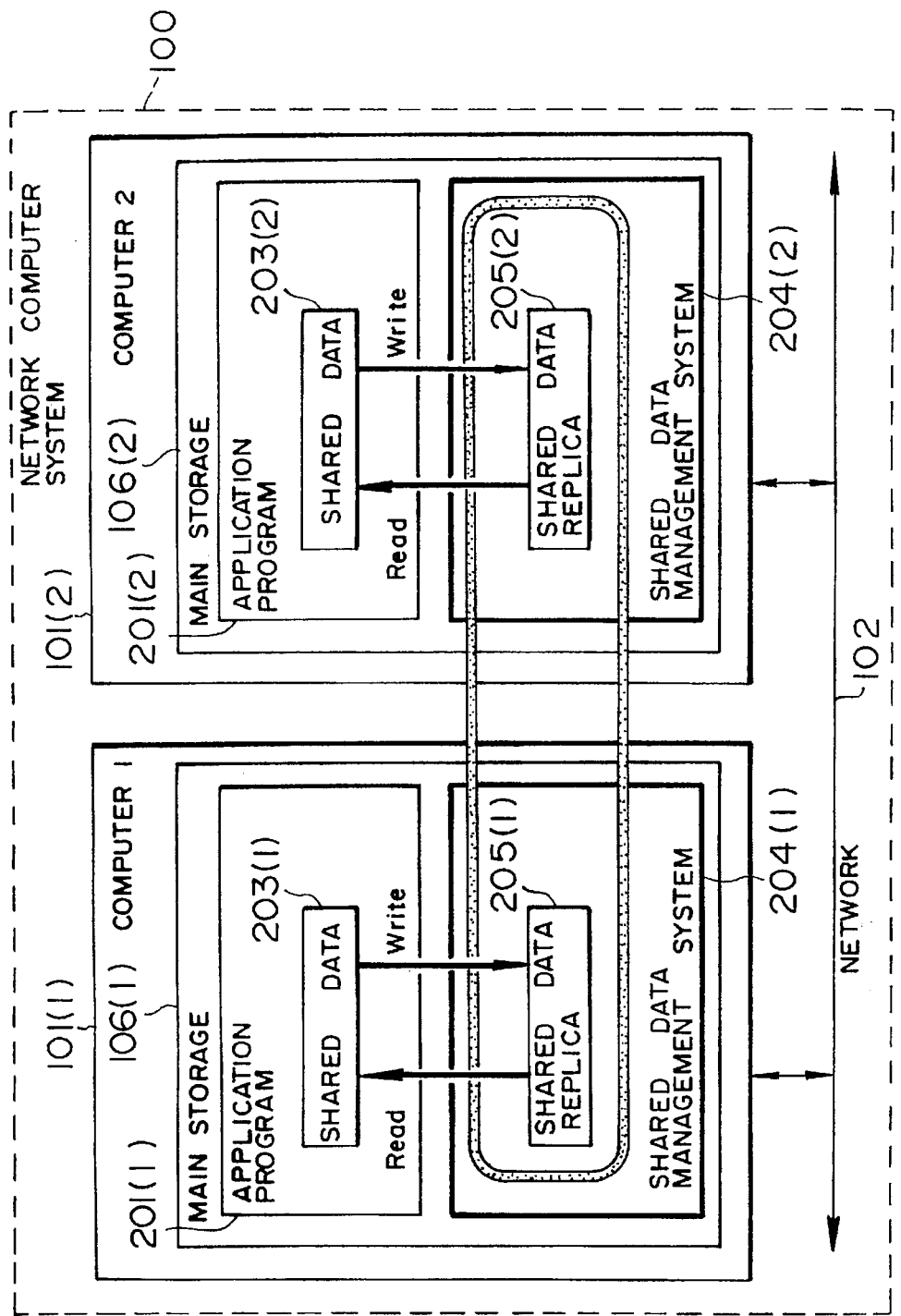

FIG. 6

SHARED DATA MANAGEMENT TABLE 405

| SHARED DATA IDENTIFIER | MANAGE-MENT NODE FLAG | START ADDRESS OF SHARED DATA | START ADDRESS OF SHARED DATA REPLICA | LENGTH OF SHARED DATA | SCATTERING FLAG | NUMBER OF SHARED DATA ELEMENTS | OFFSET ADDRESS OF SHARED DATA | LIST OF NODES USING SHARED DATA |
|---|---|---|---|---|---|---|---|---|
| 1 | 1 | 101234 | 1234 | 2000 | 0 | — | — | 1,2,3 |
| 5 | 0 | 108758 | 8758 | 1024 | 0 | — | — | 4,5 |
| 11 | 0 | 104892 | 4892 | 8 | 1 | 10 | 80 | 7,8,9,10 |
| ... | ... | ... | ... | ... | ... | ... | ... | ... |
| 6 | 1 | 107465 | 7465 | 8 | 1 | 20 | 24 | 1,2,3,4,5,6 |
| ... | ... | ... | ... | ... | ... | ... | ... | ... |
| 601 | 602 | 603 | 604 | 605 | 606 | 607 | 608 | 609 |

```
struct ss {
    int     a;
    char    b[8];
    int     *c;
    int     d;
}
```

FIG. 8

SHARED DATA MANAGEMENT TABLE 405

| SHARED DATA IDENTIFIER | ... | LIST OF NODE USING SHARED DATA | DATA STRUCTURE DEFINITION | SIZE OF DATA STRUCTURE | HIERARCHICAL ELEMENT FLAG | SHARED DATA IDENTIFIER OF HIERARCHICAL ELEMENT |
|---|---|---|---|---|---|---|
| 1 | | 1,2,3 | 0 | 0 | 0 | 0 |
| 5 | | 4,5 | 0 | 0 | 1 | 6 |
| 11 | | 7,8,9,10 | struct ss | 40 | 0 | 0 |
| ... | | ... | ... | ... | ... | ... |
| 6 | | 1,2,3,4,5,6 | 0 | 0 | 0 | 0 |
| ... | | ... | | | ... | ... |
| 601 | 602~608 | 609 | 610 | 611 | 612 | 613 |

| \multicolumn{4}{c}{DATA STRUCTURE DEFINITION TABLE} |
|---|---|---|---|
| TYPE OF ELEMENT | SIZE OF ELEMENT | OFFSET ADDRESS OF ELEMENT | SIZE OF DATA POINTED BY ELEMENT |
| int | 4 | 0 | |
| char [8] | 8 | 4 | |
| int* | 4 | 12 | 16 |
| int | 4 | 16 | |

| \multicolumn{4}{c}{DATA STRUCTURE DEFINITION TABLE} |
|---|---|---|---|
| TYPE OF ELEMENT | SIZE OF ELEMENT | OFFSET ADDRESS OF ELEMENT | SHARED DATA IDENTIFIER |
| int | 4 | 0 | |
| char [8] | 8 | 4 | |
| int* | 4 | 12 | 10 |
| int | 4 | 16 | |

| | OPERATING SYSTEM FUNCTION | | |
|---|---|---|---|
| INITIALIZATION PROCESS | dsm_open | (SHARED DATA IDENTIFIER, START ADDRESS, SIZE OF SHARED DATA AREA) | 1001 |
| | dsm_open2 | (SHARED DATA IDENTIFIER, START ADDRESS, SIZE OF ELEMENT, NUMBER OF ELEMENT, OFFSET ADDRESS | 1002 |
| SHARED DATA COHERENCE CONTROL PROCESS | dsm_acquire | (SOURCE IDENTIFIER OF SHARED DATA, DESTINATION IDENTIFIER OF SHARED DATA) | 1003 |
| | dsm_release | (SHARED DATA IDENTIFIER) | 1004 |
| TERMINATION PROCESS | dsm_close | (SHARED DATA IDENTIFIER) | 1005 |

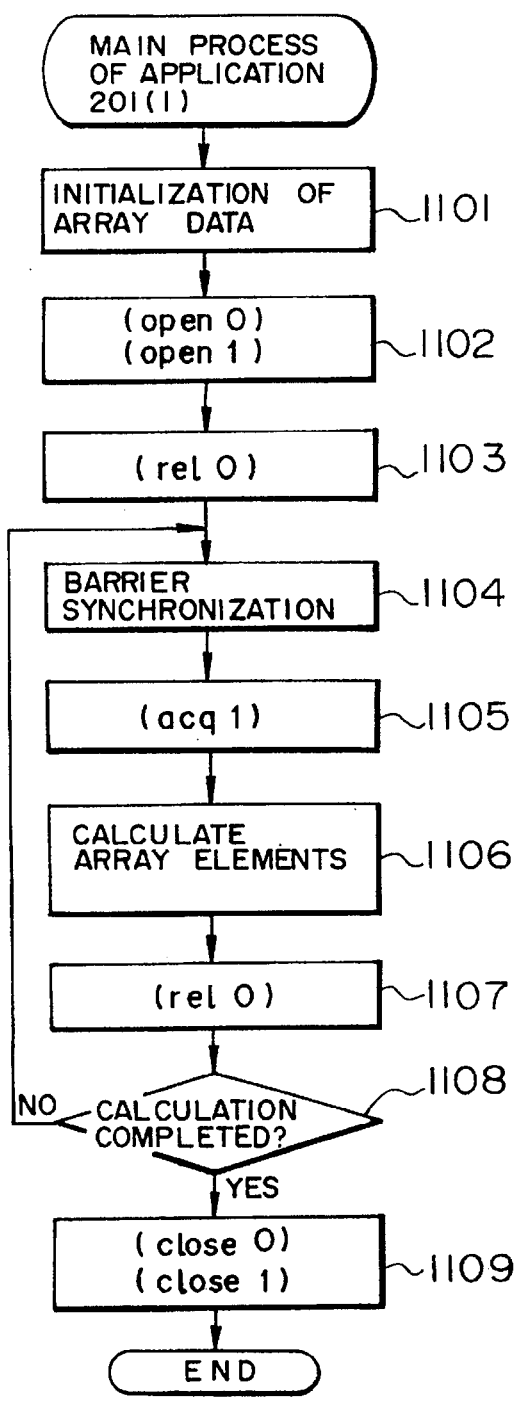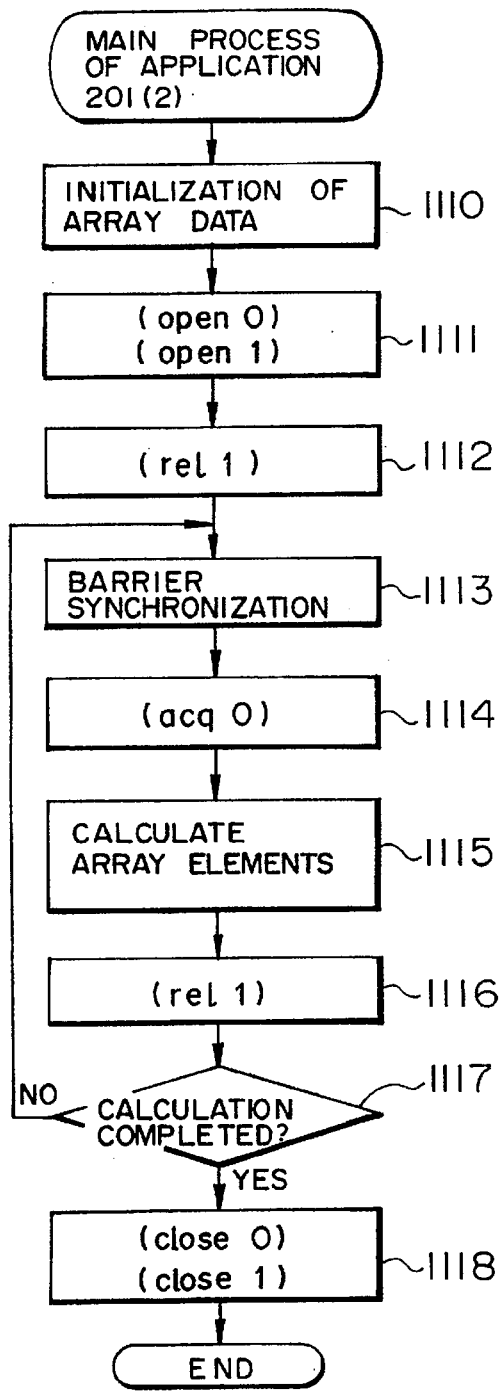

FIG.31
| SHARED DATA IDENTIFIER 1901 | START ADDRESS 1902 | SIZE 1903 | GROUP IDENTIFIER 3101 | OWNER COMPUTER 1904 | RESERVED FLAG 1905 | IN-USE FLAG 1906 | QUEUE IDENTIFIER 3102 |
|---|---|---|---|---|---|---|---|
| 1 | 0xC00010 | 4 | 1 | 1 | 0 | 1 | 1 |
| 2 | 0xC00020 | 400 | 1 | 8 | 1 | 0 | 0 |
| 3 | 0xC00100 | 8 | 2 | 3 | 0 | 1 | 2 |
| ... | ... | ... | ... | ... | ... | ... | ... |
1705
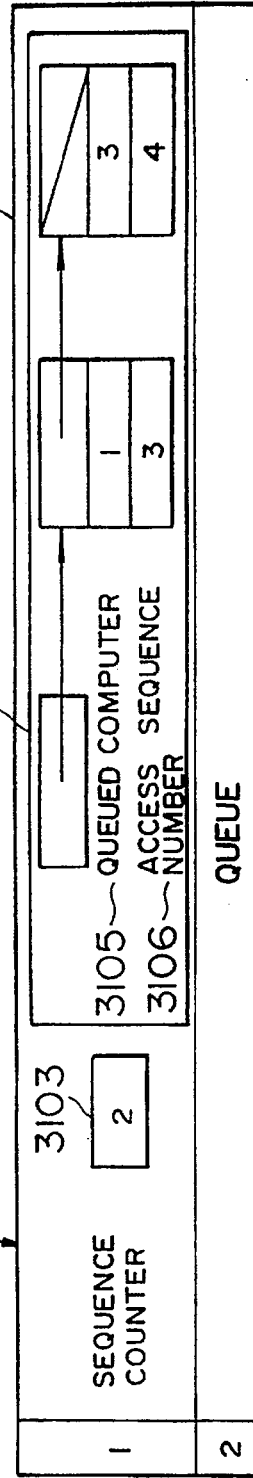
3104 QUEUED COMPUTER LIST
3105 — QUEUED COMPUTER
3106 — ACCESS SEQUENCE NUMBER
3103
SEQUENCE COUNTER
QUEUE 2901(1)
QUEUE 2901(2)
QUEUE 2901(m)

FIG. 32

| GROUP IDENTIFIER 3201 | NUMBER OF PROCESS RESERVING TO JOIN A GROUP 3202 | NUMBER OF PROCESS JOINED TO A GROUP 3203 | IDENTIFIERS JOINED TO A GROUP 3204 | BARRIER SYNCHRONI-ZATION COUNTER 3205 |
|---|---|---|---|---|
| 1 | 4 | 4 | (1,2),(2,1),(2,2),(3,1) | 0 |
| 2 | 3 | 2 | (1,1),(3,2) | 0 |
| ... | ... | ... | ... | ... |

2902 GROUP MANAGEMENT TABLE

FIG.35
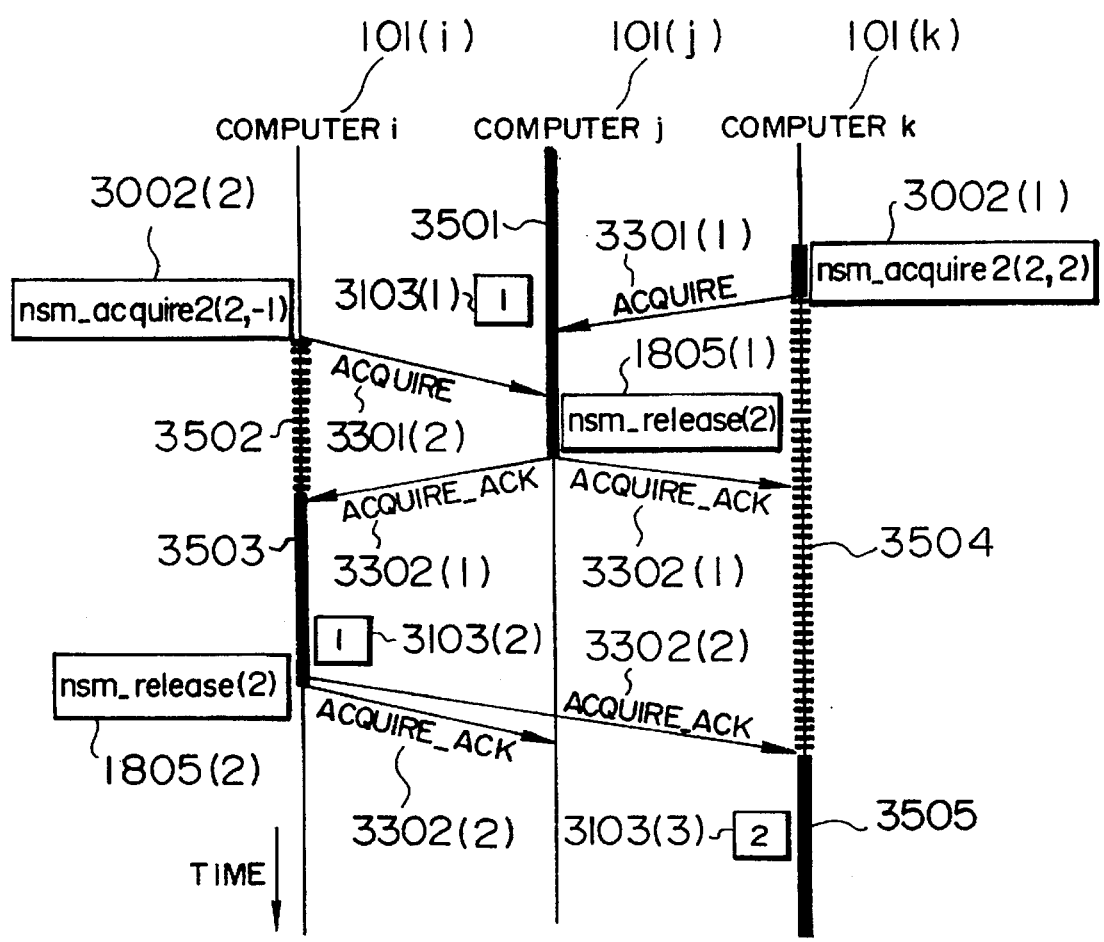
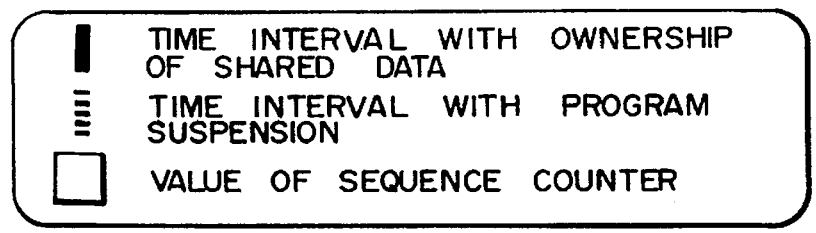

FIG.36
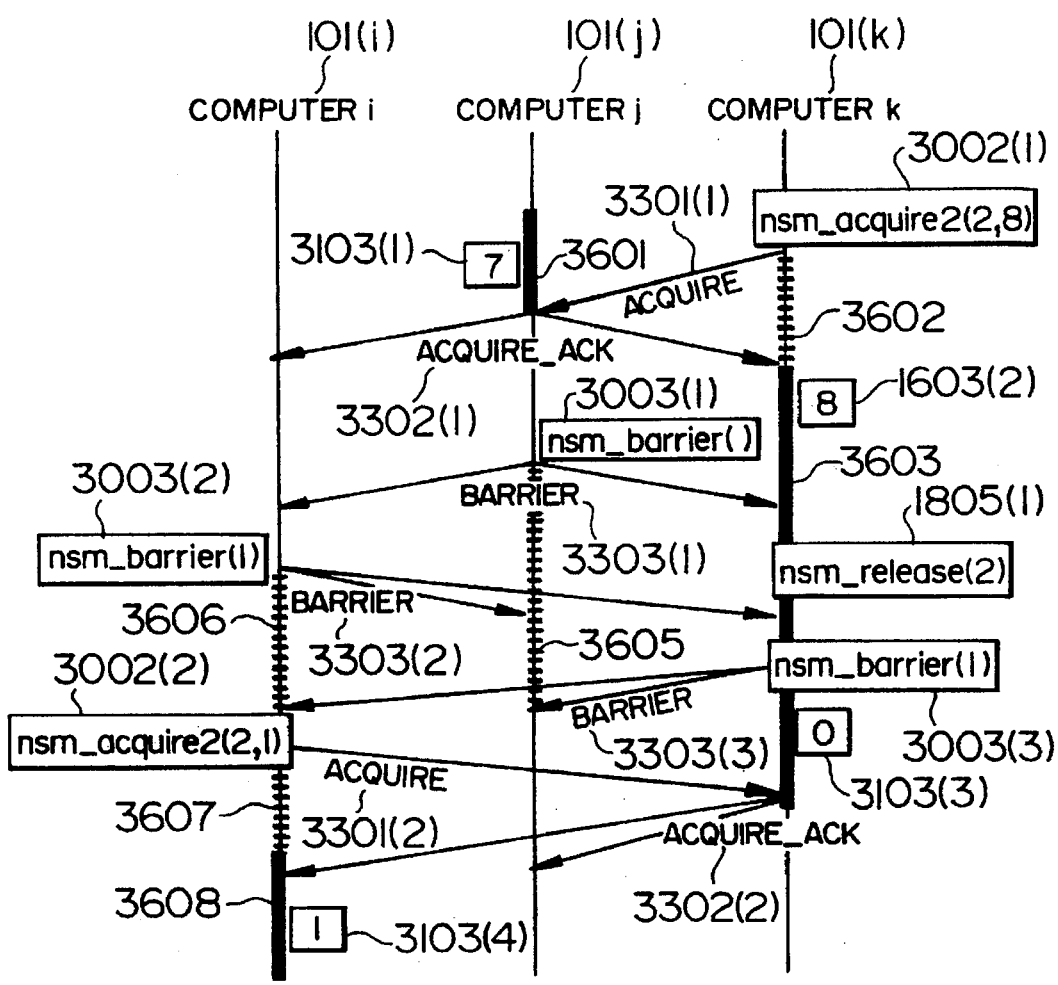
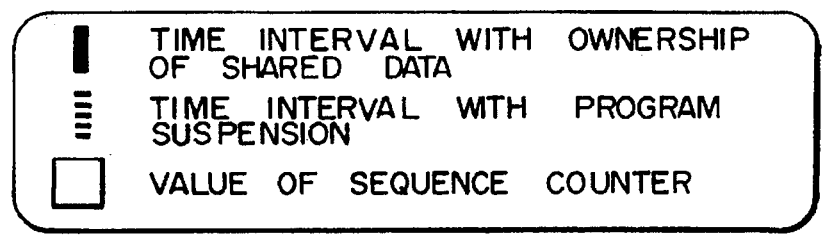

FIG. 39

3901: PICK UP REQUEST AT TOP OF QUEUED COMPUTER LIST. COMPUTER ISSUED THE REQUEST IS SET TO NEXT OWNER COMPUTER, AND COMPUTER NUMBER IS WRITTEN IN OWNER COMPUTER FIELD OF SHARED DATA MANAGEMENT TABLE

3902: ALL COMPUTER NUMBERS HAVING PROCESS IDENTIFIER FOR JOINING GROUP ARE WRITTEN IN DESTINATION COMPUTER NUMBER FILED OF PACKET HEADER.
ALSO WRITTEN ARE:
SUBJECT COMPUTER NUMBER FOR SOURCE COMPUTER NUMBER FIELD OF PACKET HEADER;
SHARED DATA IDENTIFIER FOR SHARED DATA IDENTIFIER FIELD OF PACKET HEADER;
ACQUIRE_ACK COMMAND FOR SHARED DATA MANAGEMENT COMMAND FIELD OF PACKET HEADER;
NEXT OWNER COMPUTER NUMBER FOR NEXT COMPUTER NUMBER FIELD OF PACKET HEADER;
AND QUEUE FOR SHARED DATA WITH COUNTER FOR QUEUE FIELD FOR SHARED DATA WITH COUNTER OF PACKET HEADER

3903: DATA OF DATA SIZE AND FROM START ADDRESS WRITTEN IN SHARED DATA MANAGEMENT TABLE IS COPIED TO DATA FIELD OF PAKET

3904: MULTICAST PACKET

DISTRIBUTED SHARED DATA MANAGEMENT SYSTEM FOR CONTROLLING STRUCTURED SHARED DATA AND FOR SERIALIZING ACCESS TO SHARED DATA

BACKGROUND OF THE INVENTION

The present invention relates to a technique for sharing data in physically distributed memories in a computer network system, by a plurality of applications running on a plurality of computers interconnected by a network. More particularly, the invention relates to a distributed shared memory management system which is capable of efficiently using network resources and of improving the access performance to distributed shared memories.

A virtual entity executing an application on a computer is called a process. If a plurality of processes are generated and the resources of a single CPU (central processing unit) are time divisionally allocated to each process, it becomes possible to time divisionally execute processes greater in number than the number of CPUs. This process is called time division processing. A process of executing a plurality of processes at the same time by using a plurality of CPUs is called parallel processing.

In time division processing using a single CPU computer, a shared memory has been used for data exchange between processes. For example, a shared memory in a system V is known, as described in "UNIX System Call—Programming, by Marc J. Rochkind translated by Toshihiro FUKUZAKI, Ascii Publications, 1987" at pages 299 to 315.

In time division processing, processes are not physically executed at the same time. Therefore, an improved throughput in executing a process constituted by a plurality of processes cannot be expected. In a computer network system having a plurality of computers interconnected by a network, therefore, an application is parallel processed by using a plurality of CPUs in order to improve the throughput in executing the application.

In a computer network system, shared memories are physically distributed so that it is necessary to ensure coherence between data stored the memories of the computers, and to allow each application to have virtually single shared data. This technique uses what are called distributed shared memories.

In a computer utilizing a virtual memory configuration using a paging structure, it is possible to realize distributed shared memories by extending the paging structure. Specifically, if accessed data is not in the memory, a page fault is issued, and a page which includes the data is read from an auxiliary storage and loaded in the memory. In a distributed shared memory system, when a page fault is issued, data can be loaded from another computer to the subject computer via the network instead of loading a page from the auxiliary storage.

As examples of a conventional distributed shared memory technique, there are an Ivy system (the Yale University, U.S.A.) and a DASH system (the Stanford University, U.S.A.).

In the Ivy system, each page has its owner, and the owner computer manages the names of computers which store copies of the page. Only the owner computer is permitted to write data in the page. When a read fault occurs at a computer, the owner computer transmits a copy of the page. When a write fault occurs at a computer, this computer becomes a new owner computer, and copies of the page at other computers are invalidated.

The DASH system manages distributed shared memories in a similar manner to the Ivy system, excepting that 16-byte data is used as a data unit.

The details of these conventional techniques are given in "Distributed Operating System, Next to Come after UNIX, edited by Mamoru MAEKAWA, Mario TOKORO, and Kentaro SHIMIZU, Kyoritsu Publications, 1991" at pages 124 to 141.

In order to ensure coherence of the contents of distributed shared memories, data in the memories is exchanged between computers interconnected by a network. The data transfer size and the data transfer timing become important issues of a conventional distributed shared memory management system.

The Ivy system has the following considerations.

The first consideration is associated with the data transfer size. The size of data transferred between computers for data exchange is a page. Therefore, if computers share smaller data (e.g., 8 bytes) than the page size (e.g., 4 KB), unnecessary data is transferred between computers and the efficiency of usage of network resources is substantially lowered.

In addition, if two different data sets having a high access frequency by computers A and B are stored in the same page, the page is transferred between the computers A and B each time one of the computers A and B writes data in the page. This page transfer between computers over the network upon a memory access by each computer lowers the performance of memory access.

The second consideration is associated with the data transfer timing. A page fault is issued if the page of shared data is not in the subject computer during its data read/write operation, and the shared data is transferred from another computer.

Therefore, it the computers A and B consecutively write data in a shared data field, the page is transferred between the computers at the worst each time the computer writes data in the shared data field. The cost of data transfer between computers over a network is large as compared to the memory access speed in the subject computer, thereby lowering the performance of shared data access.

The DASH system aims at solving the first consideration of the Ivy system. That is to say, the shared data unit is made small in order to reduce unnecessary data transfer because of a large data unit. Although unnecessary data transfer can be reduced, if data access to a large memory area is performed, access faults occur frequently. With a frequent access fault, the data transfer time between computers over a network becomes important. The DASH system has proposed a specific dedicated network in order to shorten the transfer time of small size data. However, this dedicated network raises the cost because it is different from a general network architecture.

The second consideration of the Ivy system, that the performance is lowered when a plurality of computers consecutively access shared data, cannot be solved by the DASH system.

Because of the above-described considerations, if the conventional distributed shared memory management system is applied to typical area division type parallel processing, data transfer over the network frequently occurs, making it impossible to obtain the good speed-up performance of parallel processing. Furthermore, for example, if a data structure having a pointer variable element is shared by a plurality of computers, shared data is dispersed and stored in the memories. In such a case, data transfer over the network occurs frequently.

SUMMARY OF THE INVENTION

It is an object of the present invention to provide a distributed shared memory management system which is capable of solving the above problems, efficiently using network resources, and of providing a high access performance.

In order to solve the first problem concerning data transfer size, there are provided a shared data management table and shared data management means for managing the shared data management table. The shared data management table stores a shared data unit designated by an application, and allows the application to copy designated shared data to a main storage.

Specifically, if two-dimensional array data is divided into two subsidiary data arrays and an application shares data at the division boundary, the application sets the boundary data as a shared data unit. The shared data unit is designated by using a memory continuous area, a memory discontinuous area (with a constant data size and a constant data interval), or a combination thereof.

In order to solve the second problem concerning data transfer timing, the timing for ensuring coherence of shared data between a plurality of computers is determined by an application in accordance with two commands, including a latest data acquisition command (1) and a latest data reflection command (2), while using the shared data unit for ensuring coherence.

Specifically, there are provided a method of giving all computers shared data and of changing the shared data at all computers at the timing when the latest data reflection command (2) is issued by the computer changing the shared data, a method of giving shared data to a single computer and transferring the shared data over a network to another computer at the timing when the latest data acquisition command (1) is issued by the other computer, or a combination of the two methods for giving shared data to one or more computers to disperse any possible danger.

When an application is executed, a shared data unit is set to prevent unnecessary data transfer and to efficiently use network resources. Coherence of shared data which is physically distributed is ensured only when an application asks for it, so that data transfer between computers over a network can be suppressed to a minimum and network resources can be efficiently used. Accordingly, the access performance to shared data can be improved.

As another example of the conventional distributed memory management technique, there is known a Munin system which designates a time interval during which coherence of shared data is ensured, when the shared data is to be accessed. The Munin system is disclosed in the paper "Implementation and Performance of Munin" by J. B. Carter, et. al., of the 13th ACM Symposium on Operating Systems Principles, 1991, October, at pages 152 to 164. With the Munin system, before a read/write operation of a shared data memory is performed, a command for requesting coherence insurance and a command for releasing the coherence insurance after the read/write operation are written in a program. The command for requesting coherence insurance is called an acquire command, and the command for releasing the coherence insurance is called a release command. If a data write operation is performed during the time interval between the acquire command and release command, the data write is not immediately reflected upon the shared data in each computer, but is reflected after the release command is issued.

With this arrangement, even if a data write operation is performed a plurality of times during the coherence control time interval, data transfer to other computers is performed once after the lapse of the coherence control time interval. As a result, it is possible to avoid unnecessary data transfer and to efficiently use network resources.

With the Munin system, there is a case wherein a plurality of computers issue the acquire command for shared data. Therefore, this system provides synchronizing means for controlling the execution order during the coherence control time interval.

In a loosely coupled computer system having a plurality of computers interconnected by a network, each computer having an independent address space, barrier synchronization is widely used as synchronizing means. In order to realize barrier synchronization, there are known a method of providing dedicated signal lines in addition to the network and a method of realizing barrier synchronization by network packets. The former method of providing dedicated signal lines requires specific hardware, raising the system cost. The latter method requires transmission of a network packet to each computer carrier synchronization is described in "Parallel Processing Machine, by Masaharu TOMITA, and Toshinori SUEYOSHI, Ohm Co., 1989" at pages 133 and 134.

The Munin system provides synchronizing means in addition to coherence controlling means. Therefore, the number of packet transfers increases in a loosely coupled computer system, which realizes synchronization by transferring packets. As a result, the number of packets increases and the load on the network increases. This is a first problem associated with conventional barrier synchronization.

In a loosely coupled computer system in which each computer is controlled independently by each OS (operating system) under a multi-process multi-user environment, there is a possibility of scattered operations of computers, depending upon the load and the scheduling of each computer, even if processes are uniformly assigned to each computer. As a result, an idle wait time exists. This is a second problem associated with conventional barrier synchronization.

It is another object of the present invention to provide a distributed shared memory computer system which is capable of realizing coherence control and synchronization control using a small number of network packets so as i to efficiently use network resources and therefore improve the access performance to distributed shared memories.

It is still another object of the present invention to provide a distributed shared memory computer system which is capable of reducing wasteful waiting time during synchronization and of efficiently executing a program.

According to the present invention, in order for a program to designate the shared data coherence insurance time interval, there are provided coherence control designation means and coherence control release means for releasing a designation of coherence control. There is also provided means for storing a coherence control request for shared data received from another computer during the coherence insurance time interval. The coherence control request storing means includes counter means for counting the number of coherence control requests and means for storing a value which controls the access order to shared data. With these means, it becomes possible to realize a synchronization process and ensure coherence of shared data, without increasing the number of packets, thereby solving the above-mentioned first problem of barrier synchronization. Furthermore, synchronization with only those computers related to an access to shared data is performed so that the wasteful wait time can be shortened, thereby solving the above-mentioned second problem.

The coherence control designating means may be divided into means for reserving a coherence control and means for waiting for an acknowledgement of reservation. With this arrangement, it becomes possible to execute another calculation in a multiple manner without suspending a program during the coherence control insurance time interval.

According to the present invention, it is possible to reduce the number of network packets necessary for the synchronization for shared data coherence control and for parallel program control, and to efficiently use network resources.

Still further, by establishing synchronization only between those computers related to an access to shared data, wasteful waiting time can be reduced as compared to a method of realizing synchronization between all computers at the same time, thereby improving the are efficiency of executing a program.

BRIEF DESCRIPTION OF THE DRAWINGS

FIG. 1 is a block diagram showing a computer network system according to an embodiment of the invention.

FIG. 3 is a block diagram explaining a storage of shared data according to the embodiment of the invention.

FIG. 6 shows a shared data management table according to the embodiment of the invention.

FIG. 8 shows another example of the shared data management table according to the embodiment of the invention.

FIGS. 9A and 9B show data structure definition tables according to the embodiment of the invention.

FIG. 11 explains the shared data access functions according to the embodiment of the invention.

FIGS. 12A and 12B are flow charts of the main process of an application using shared data according to the embodiment of the invention.

FIG. 31 is a diagram showing the structures of a shared data management table and a queue for shared data with a counter according to the embodiment of the invention.

FIG. 32 is a diagram showing the structure of a group management table according to the embodiment of the invention.

FIG. 35 is a timing chart explaining the operation when the coherence control designation command designates a specific access number according to the embodiment of the invention.

FIG. 36 is a timing chart explaining the fundamental operation when a barrier synchronization command with an access number counter reset function is issued according to the embodiment of the invention.

FIG. 39 is a PAD explaining the operation by commands in a shared data coherence control command memory area when a coherence control acknowledge command is transmitted according to the embodiment of the invention.

DETAILED DESCRIPTION OF THE PREFERRED EMBODIMENTS

Figure 2A:
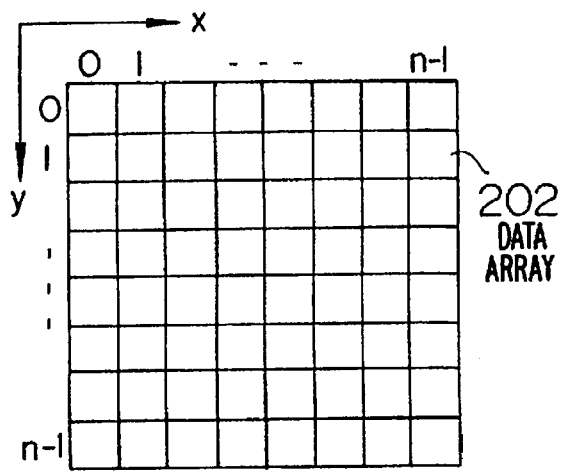
FIGS. 2A to 2D are diagrams explaining an example of area division type parallel processing according to the embodiment of the inventions.

FIG. 1 is a block diagram showing an embodiment of a computer network system 100 according to the invention.

Referring to FIG. 1, the computer network system 100 is configured by a plurality of computers 101 interconnected by a network 102. Each computer 101 has a system bus 103 used as a data transfer path between blocks constituting the computer, a processor 104 for executing a program, a subsidiary storage 105 such as a magnetic disk for storing programs and data, a main storage 106 for storing programs and data during a program execution, and a network adapter 107 for controlling data transfer to and from the network 102. The shared data management system of the invention is used, for example, when the computers 101 (1) and 101 (2) execute applications in parallel and use shared data.

FIGS. 2A to 2D are schematic diagrams explaining area division type parallel processing which uses a distributed shared memory.

Figure 2B:
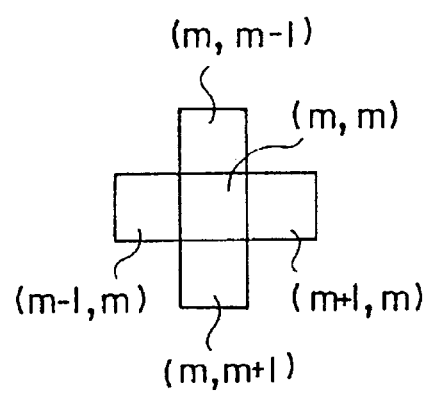
Figure 2C:
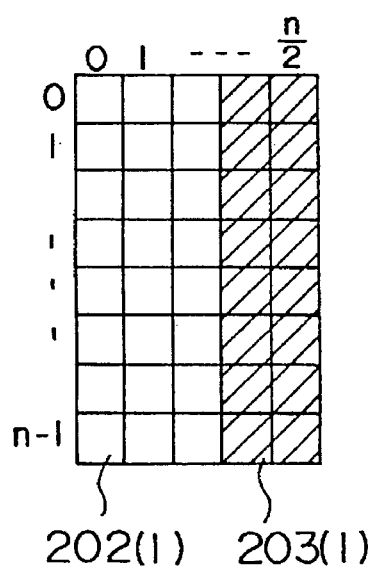
Figure 2D:
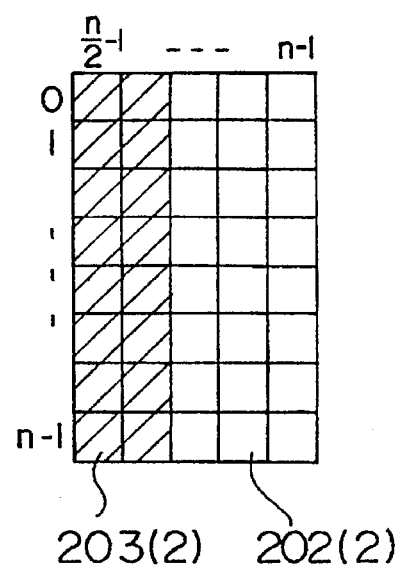

In area division type parallel processing, a data array, such as shown in FIG. 2A, is divided into two areas shown in FIGS. 2C and 2D and processed in parallel by two different computers. The area division type parallel processing can be used for a variety of scientific and technical calculations, such as a hydrodynamics analysis problem calculation, a structural analysis problem calculation, and other analysis problem calculations.

A solution to a two-dimensional thermal diffusion analysis problem will be described with reference to FIG. 2, as an example of the area division type parallel processing. In this example, an area to be analyzed is defined by a two-dimensional array of n*n elements. Array data 202 is stored in the main storage 106 and the processor 104 calculates a new value for each element. This calculation is performed for all elements of the two-dimensional array shown in FIG. 2A by using adjacent elements of each element. The new values of elements are repetitively calculated during predetermined time intervals until a termination condition is satisfied. A calculation using adjacent elements is performed, for example, in the manner shown in FIG. 2B. Specifically, a new value of an array element (m, m) is calculated from the values of four adjacent elements (m, m−1), (m+1, m), (m, m+1), (m−1, m) and the value of the subject array element (m, m). For example, values representing the difference between the value of the element (m, m) and the values of the four adjacent elements are first calculated, and the difference values multiplied by thermal conductivities are added to the value of the subject element (m, m).

FIGS. 2C and 2D show the divided areas whose data is calculated by two computers in parallel. As described above, a calculation of each array element for the analysis is performed by using adjacent elements. Therefore, for the columns 202 (1) from x=0 to x=(n/2)−2 and the columns 202 (2) from x=(n/2)+1 to x=(n−1), it is sufficient if each computer assigned to calculate each area can perform a data read/write operation. In this case, therefore, the data is stored in the local memory 106 of each computer. However, for the columns 203 (1) and 203 (2) from x=(n/2)−1 to x=(n/2), it is necessary that both the computers be able to perform a data read/write operation. In this case, the data is stored in a shared memory area.

A typical scale of such an analysis problem, i.e., the number of array elements shown in FIG. 2A, is in the order of from several hundreds of rows*several hundreds of columns to several thousands of rows*several thousands of columns.

As will be described hereinunder, the distributed shared memory system of the invention provides an efficient data exchange between computers even for the above-described area distribution type parallel processing.

FIG. 3 is a block diagram for explaining a shared data management system in which data is shared by a plurality of processes executing the same application, according to the embodiment of the invention.

Referring to FIG. 3, an application 201 (1) running on the computer 101 (1) and an application 201 (2) running on the computer 101 (2) share data. There is no physical memory shared by the computers 101 of the computer network system 100. It is necessary to ensure coherence between physically distributed shared data 203 (1) and 203 (2), by software, hardware, or a combination thereof. With this coherence control, the application 201 (1) on the computer 101 (1) and the application 201 (2) on the computer 101 (2) can be considered as if they share a single set of data.

In this embodiment, a shared data management system 204 on each computer provides a virtual space for ensuring coherence of shared data. When the application 201 reads/writes the shared data, the virtual space with data coherence being ensured by the shared data management system 204 is used. Specifically, in this embodiment, shared data is written in, or read from, the shared data replica or copy area 205.

In this embodiment, a copy 205 of the shared data 203 used by the application 201 is stored in the shared data management system 204 of each computer 101. This copy 205 is generated when an application declares that it uses shared data. This operation is performed in order to minimize a process delay of a request for acquiring the shared data 203 by the application 201. The shared data management systems 204 ensure coherence of copies 205 of physically distributed shared data. Specifically, when a copy of shared data is changed at one computer, its shared data management system informs all computers 101 having a copy 205 of the shared data that there has been a data change.

In order to conserve the memory capacity required for each shared data management system 204, a copy may be generated at the computer whose application 201 indicates the latest shared data reflection, instead of generating a copy of shared data at all computers. At the same time, an identifier of the computer having the copy 205 of shared data is sent to other computers. A copy of shared data may be had by one or more computers of the computer network system.

Figure 4:
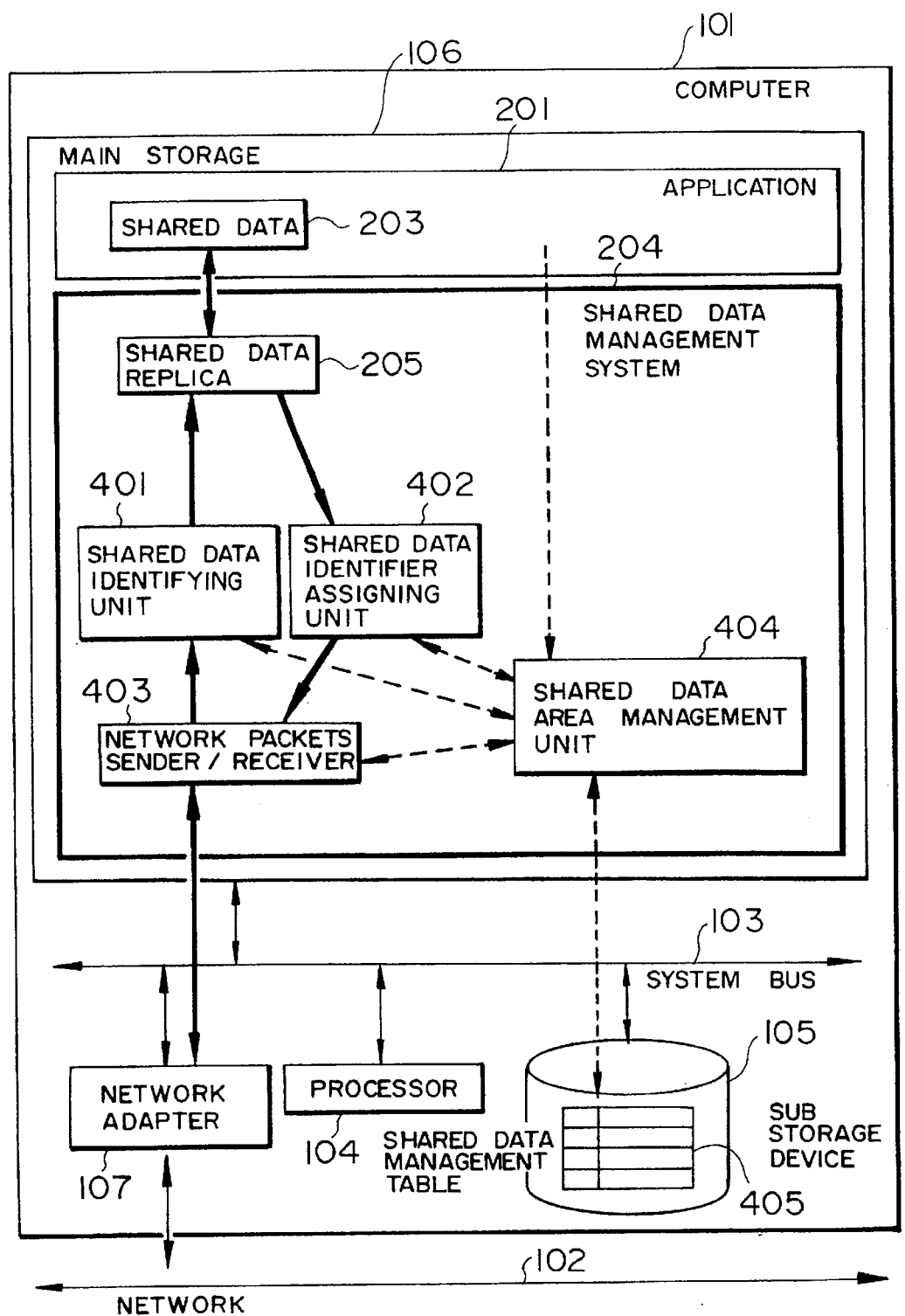
FIG. 4 is a block diagram of a shared data management system according to the embodiment of the invention.

FIG. 4 is a block diagram for explaining the shared data management method according to an embodiment of the invention.

The shared data management system 204 is configured by a shared data identifying unit 401, a shared data identifier assigning unit 402, a packet sender/receiver 403, and a shared data area management unit 404. The auxiliary storage 105 has a shared data management table 405. This table 405 is developed in the main storage 106 in advance so as to speed up its access and renewal. The details of the shared data management table 405 will be explained later.

The shared data identifying unit 401 identifies a shared data identifier in a packet sent from the packet sender/receiver 403. The shared data identifying unit 401 checks a memory area corresponding to the shared data identifier and writes data in the memory area.

The shared data identifier assigning unit 402 receives a shared data identifier and information on a corresponding memory area, reads data in the memory area, and generates a packet containing shared data, which is sent to another computer.

The packet sender/receiver 403 analyzes a command in a packet received by the network adapter 107 and transfers data to blocks of the shared data management system where the data is processed. The packet sender/receiver 403 sets up the network adapter 107 in order to send a packet generated at the shared data identifier assigning unit 402 to another computer.

The shared data area management unit 404 performs the management of the shared data management table 405 and the control of blocks of the shared data management system 204. Further, the shared data area management unit 404 receives a process request for shared data of the application 201 to thereafter add or delete an entry of the shared data management table 405. Furthermore, the shared data area management unit 404 controls the shared data identifier assigning unit 402 and the packet sender/receiver 405 for the transmission of shared data to another computer. Conversely, it controls the shared data identifying unit 401 and the packet sender/receiver 403 for the reception of shared data from another computer.

Each process performed by the units 401 to 404 is executed by software, hardware, or a combination thereof. A process to be executed by software is carried out in the following way. A program describing the software process contents is stored in the auxiliary storage 105. The program is developed on the main storage 106 connected by the system bus 103, and is executed by the processor 104.

Figure 5:
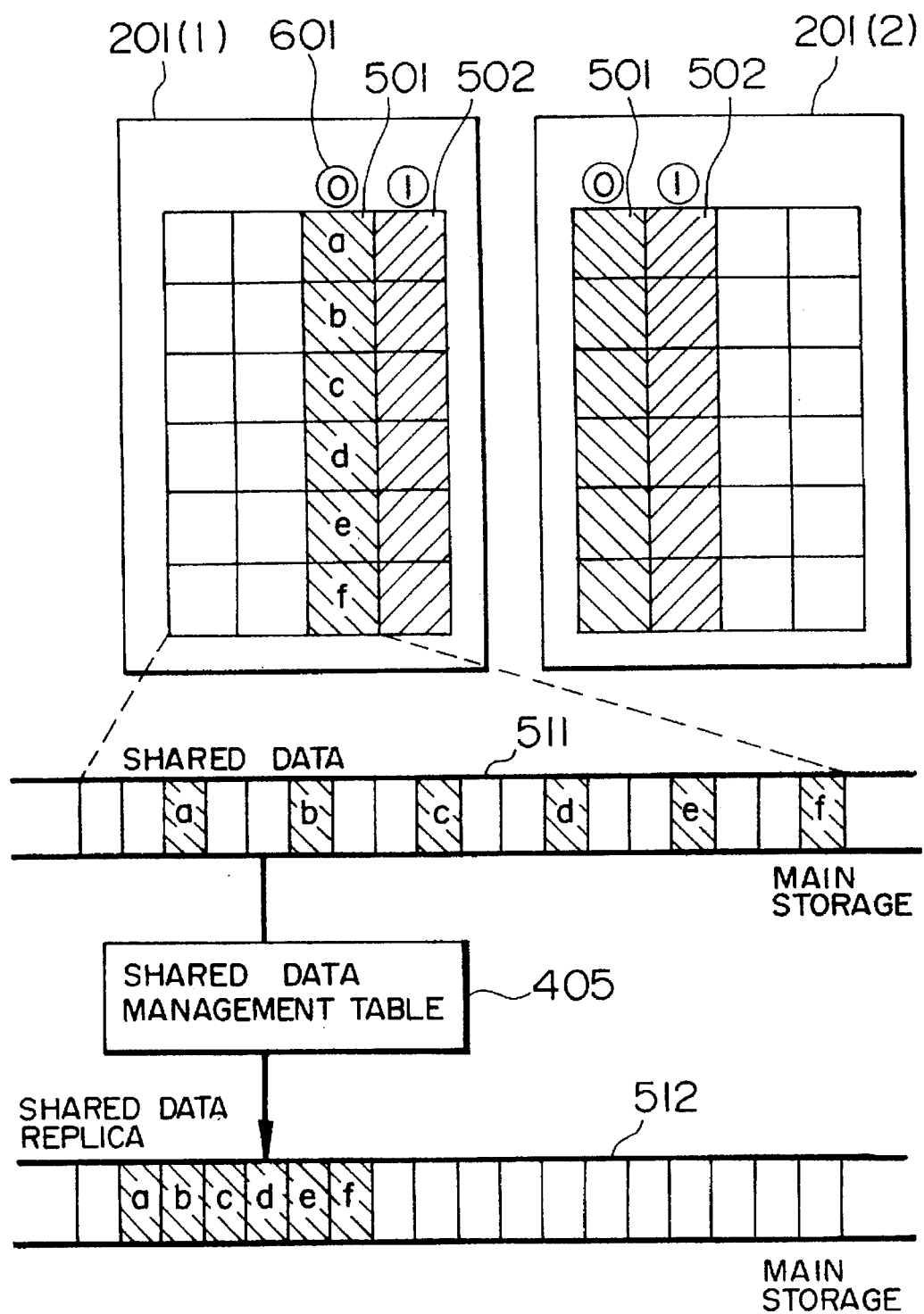
FIG. 5 is a diagram explaining an application of shared data to area division type parallel processing according to the embodiment of the invention.

FIG. 5 is an example of the allocation of shared data of divided array data in the main storage, when area division type parallel processing is carried out.

For the purpose of simplicity, in this example, an array of 6 rows*6 columns is divided in the row direction into two areas which are parallel processed by two computers. In practice, an array having a number of elements is divided both in the row and column directions into a number of areas which are parallel processed by a number of computers. The explanation given with reference to FIG. 5 is also applicable to such cases.

Each element of an array has data of a double precision real number and of an eight-byte length. One column 501 at the divided boarder area is declared to be shared data having a shared data identifier "0", and the other column 502 is declared to be shared data having a shared data identifier "1". A partial array of 6 rows, 3 columns is stored in the main storage at an area 511. As shown, the shared data 501 is disposed in the main storage at discontinuous locations.

A copy of shared data (shared data replica) generated upon a shared data declaration of the invention is stored in the main storage at an area 512. As shown, the copied shared data is disposed in the main storage at continuous locations. The correspondence between the shared data at the area 511 and the copied shared data at the area 512 is managed by the shared data management table 405. The correspondence between data at the areas 511 and 512 is managed by using the shared data identifier as a search key. Each correspondence is automatically generated in the shared data management table 405 when the application 201 declares that it uses shared data. In this manner, it is possible to designate discontinuous shared data by a single identifier (shared data identifier) and to reduce a wasteful memory area by bundling discontinuous data at a single continuous set of memory locations.

FIG. 6 shows an example of the shared data management table 405 of the invention, which has a structure particularly suitable for use with area division type parallel processing.

The shared data management table 405 has shared data identifier entries 601, management node flag entries 602 indicating whether or not each computer manages shared data, shared data address entries 603 indicating the start address of each set of shared data, shared data replica address entries 604 indicating the start address of each set of shared data replica, shared data size entries 605 indicating a size of each set of shared data, and computer list entries 609 indicating the list of nodes using the shared data.

The shared data management table 405 also has scattering flag entries indicating whether or not shared data to be used by an application is being stored at continuous locations, shared data scattering number entries 607 indicating the number of scattered shared data sets, and shared data offset entries 608 indicating an interval between scattered shared data sets. With these entries, it becomes possible for an application to declare not only shared data at a continuous memory area but also shared data at memory areas disposed at a predetermined interval and each storing a predetermined size of data.

With the computer list entry 609, it becomes possible to identify all computers storing shared data identified by the shared data identifier. The computer list entry 609 may be used for indicating a shared data change to other computers. A function of broadcasting a message to all computers on the network may be used without using the computer list entry 609. The broadcast function is required to have some reliability such that no packet is lost and the order of packets received by each computer will not change.

If all of the computers do not use a copy of shared data, it is necessary to use entries for storing the identifiers of computers storing a copy of the shared data.

Figures 7A, 7B:
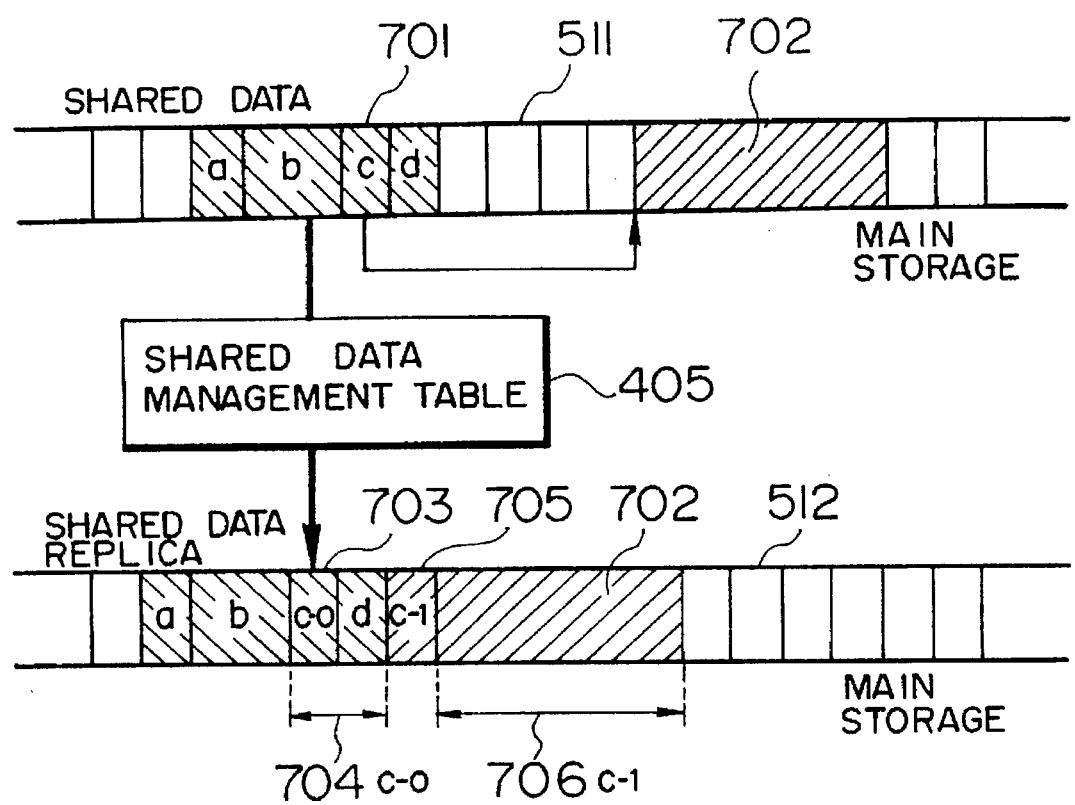
FIGS. 7A and 7B are diagrams explaining an application to shared data having a data structure according to the embodiment of the invention.

FIGS. 7A and 7B illustrate the operation wherein a plurality of computers share data having a data structure containing a pointer variable, according to the embodiment of the invention.

FIG. 7A shows an example of a data structure declaration stated by a C language. In this example, the third element c is an integer pointer variable. An embodiment of the invention sharing data having such a data structure, will be described.

When the data structure declared as shown in FIG. 7A is to be shared, it is disposed in the main memory at the area 511 shown in FIG. 7B. In this allocation, the element c stored at an area 701 is an address on the main storage, and this address points a data area 702. The data structure shared by a plurality of computers includes the data stored as the elements a, b, and c and the data at the area 702, and the address stored as the element c is not shared because each computer manages the main memory 106 independently and each computer does not always have the same shared data storage address of the area 702.

A copy of shared data (shared data replica) generated when a shared data declaration of this invention is issued, is disposed in the main memory, for example, at an area 512. An area 703 corresponding to the area 701 of the area 511 storing the element stores an offset value 704 to the start address of the data storage area. The start area 705 of the data storage area, designated by the offset value 704, stores a data length 706, and data 702 is stored after the start area 705. In this manner, shared data can be stored in the main storage at continuous locations even if a plurality of computers share the data structure including a pointer variable element. The correspondence between the shared data at the area 511 and the copied shared data at the area 512 is managed by the shared data management table 405. The correspondence between data at the areas 511 and 512 is managed by using the shared data identifier as a search key. Similar to the case described with reference to FIG. 5, each correspondence is automatically generated in the shared data management table 405 when the application 201 declares that it uses shared data. In this manner, it is possible to designate discontinuous shared data by a single identifier (shared data identifier) and to reduce communication traffic on the network between a plurality of computers.

FIG. 8 shows another example of the shared data management table 405 of the invention, wherein shared data having a hierarchical data structure is managed, according to the embodiment of the invention.

In this embodiment, in contrast with the shared data management table 405 shown in FIG. 6, the embodiment table 405 has data structure definition entries 610 and data structure size entries 611. For the shared data corresponding to a shared data identifier 601 and having a data structure, a data structure definition is stored in the data structure definition entry 610, and a data length of the shared data at the shared data replica area 512 is stored in the entry 611. In this example shown in FIG. 8, the shared data of a shared data identifier "11" has a data structure.

An example of a data structure definition table stored in the data structure definition entry 610 of the shared data management table 405 is shown in FIG. 9A. The data structure definition table 801 has entries 802 for storing the type of an element of the data structure, entries 803 for storing the size of the element, entries 804 for storing an offset address of the element in the data structure, and data size entries 805 for storing the size of data pointed to by the element.

The shared data management table 405 shown in FIG. 8 also has hierarchical element flag entries 612 and hierarchical element shared data identifier entries 613 to define a hierarchical relationship between a plurality of sets of shared data. A shared data coherence control process, such as an acquisition process, can therefore be executed for the shared data, including data hierarchical levels registered in hierarchical element shared data identified entries 613 in the order of pointer elements stated in the data structure.

Another example of managing a data structure containing a pointer variable as a hierarchical structure is shown in FIG. 9B. Similar to the data structure definition table 801 shown in FIG. 9A, the table 801 shown in FIG. 9B has entries 803 to 805. The table 801 shown in FIG. 9 also has entries 806 for storing a shared data identifier pointed to by a pointer.

Figure 10:
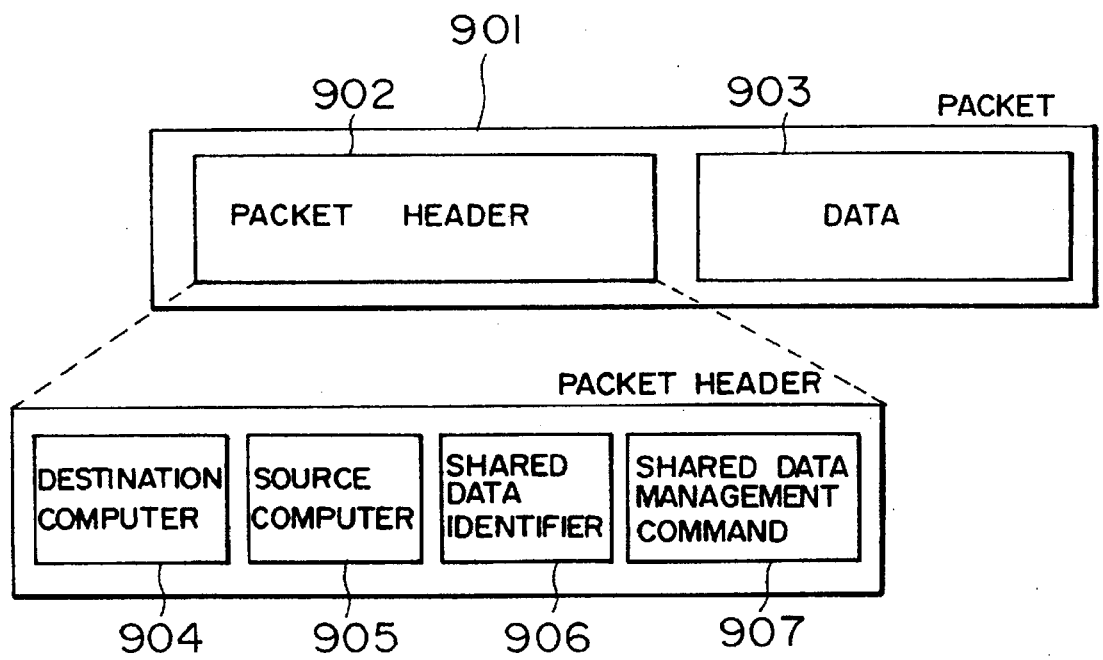
FIG. 10 shows the structure of a communication packet according to the embodiment of the invention.

FIG. 10 shows an example of the structure of a packet used by the shared data management system 204 of the invention.

A packet 901 is constituted by a packet header 902 and a data field 903. The packet header 902 contains a destination computer field 904, a source computer field 905, a shared data identifier field 906, and a shared data management command field 907. For example, assuming that a computer 1 informs a computer 2 of a change in the shared data of a shared data identifier "12", "2" is stored in the destination computer field 904, "1" is stored in the source computer field 905, "12" is stored in the shared data identifier field 906, an identifier indicating "shared data change notice" is stored in the shared data management command field 907, and the changed shared data is stored in the data field 903. This packet is then transmitted to the computers having the corresponding shared data or to all computers.

FIG. 11 is a table showing examples of access functions used for the access to shared data, the access functions being provided to the application 201 for the shared data management system of the invention.

In this example, a character string starting from "dsm_" is a name of an operating system function called by an application which uses the shared data management system. In order for the application to access shared data, an initialization process, a shared data coherence control process, and a termination process are executed.

First, at the initializing processes dsm_open 1001 and dsm open2 1002, the application declares a shared data unit to the shared data management system. Specifically, a shared data identifier is assigned to a memory area. The shared data management system establishes management information entries necessary for the management of each shared data unit. At the process dsm_open 1001, a continuous memory area is declared as one shared data unit. At the process dsm_open2, a memory area, in which data of a constant size is disposed at a constant interval, is declared as one shared data Next, at the shared data coherence control processes dsm_acquire 1003 and dsm_release 1004, the shared data management system ensures coherence of shared data units as the application performs a read/write operations relative to the memory area declared as the shared data unit, by surrounding a series of read/write operations by the functions dsm acquire 1003 and dsm_release 1004.

Lastly, when the application does not require the shared data (shared data unit), it asks the shared data management system for the termination process dsm_close 1005. The shared data management system then releases the management information entries established by the initialization process.

The details of the operations of the initialization process, shared data control process, and termination process will be explained later.

FIG. 12 is a flow chart showing a main process executed by an application when it performs an area division type parallel processing by using the distributed shared memory, according to the embodiment of the invention.

An application of each computer calculates a new value of each element of the array data shown in FIGS. 2A to 2D and FIG. 5 by using the values of four adjacent elements and the subject element as explained with reference to FIG. 2B.

First, at Step 1101, array data necessary for the application 201 (1) is read from the array data is stored in an auxiliary storage or the like, and is stored in the main memory 106. At Step 1102, the shared data used by the application is declared. Specifically, the memory area of the partial array 501 is declared by assigning a shared data identifier "0" and the memory area of the partial array 502 is declared by assigning a shared data identifier "1". In the flow chart shown in FIG. 12, these declarations are written in an abbreviated representation of (open 0) and (open 1) and are performed by using the routine 1001. At Step 1103, an operation of reflecting the shared data of the shared data identifier "0" in the partial array assigned to the application 201 (1), upon a virtual shared data space, is performed by using the routine 1004. In the flow chart, this operation is written in an abbreviated representation of (ref 0).

Steps 1104 to 1108 correspond to the main processing loop of the application. At Step 1104, synchronization with another application is established. Executed at Step 1105 is an operation of acquiring the latest data from the virtual shared data space. Specifically, the process dsm acquire 1003 is executed by setting both the destination and source shared data identifiers to "1". In the flow chart, this operation is written with an abbreviated representation of (acq 1). At Step 1106, all elements of the partial array are calculated by using four adjacent elements and the subject element. At Step 1107, similar to Step 1103, the calculation results at Step 1106 are reflected upon the virtual shared data space. At Step 1108, it is checked to determine whether the calculations have been completed. If not, the control returns to Step 1104 to repeat Steps 1104 to 1108. If completed, the control advances to Step 1109.

At Step 1109, the shared data is released. In this example, the shared data of the shared data identifiers "0" and "1" is released by the routine 1005. In the flow chart, this operation is written in an abbreviated representation of (close 0) and (close 1).

The application 201 (2) also executes similar operations to Steps 1101 to 1109. However, because of the different partial array, Steps 1112, 1114, and 1116 are executed by using data different from the corresponding Steps executed by the application 201 (1).

Figure 13:
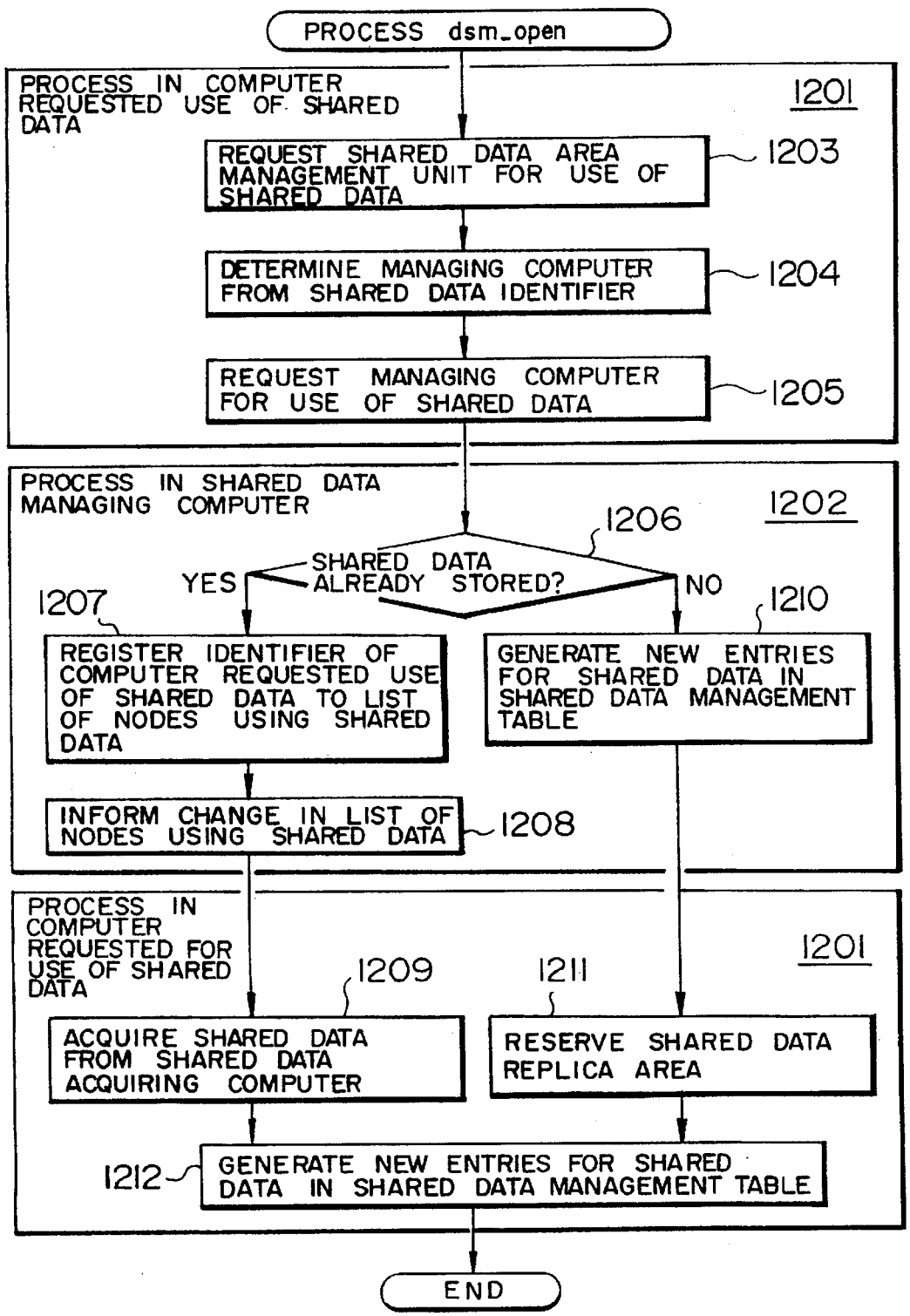
FIG. 13 is a flow chart of a process of starting using shared data according to the embodiment of the invention.

FIG. 13 is a flow chart showing a process executed by the shared data management system when the shared data initialization process shown in FIG. 11 is performed, according to the embodiment of the invention.

The process surrounded by a block 1201 is executed by a computer 101 running an application which declares a use of shared data, and the process surrounded by a block 1202 is executed by a computer which manages the shared data to which is assigned a shared data identifier.

First, at Step 1203, an application sets up the routine dsm_open 1001 in order to declare a use of shared data by informing the shared data area management unit 404 of a shared data identifier and a memory area of the shared data. At Step 1204, a computer managing the shared data is determined in accordance with the designated shared data identifier. For example, numbers are uniquely assigned in advance to all computers of the computer network system. If a remainder obtained by dividing a shared data identifier by the total number of computers of the computer network system is equal to a predetermined number, a computer with such a remainder may be determined as a shared data managing computer. At Step 1205, the shared data managing computer determined by the shared data area management unit is informed that it can use shared data.

At Step 1206, the shared data managing computer checks to determine whether the declared shared data has already been used. If not, at Step 1210, new entries are generated in the shared data management table 405 of the shared data managing computer. A list of computers storing shared data is initialized. If the declared shared data has already been used, at Step 1207, the computer 609 which has declared a use of shared data is added to the list of nodes using shared data and at Step 1208, a change in the list of nodes using shared data is communicated to computers registered to the list.

If the shared data has already been declared, at Step 1209, the computer which has declared a use of the shared data acquires the latest shared data in accordance with the list and uses it as a copy of the shared data. If the shared data has not been declared, at Step 1211, a memory area for the shared data replica is reserved.

At Step 1212, new entries are generated in the shared data management table, and the shared data address, copied shared data address, and the like are initialized.

Figure 14:
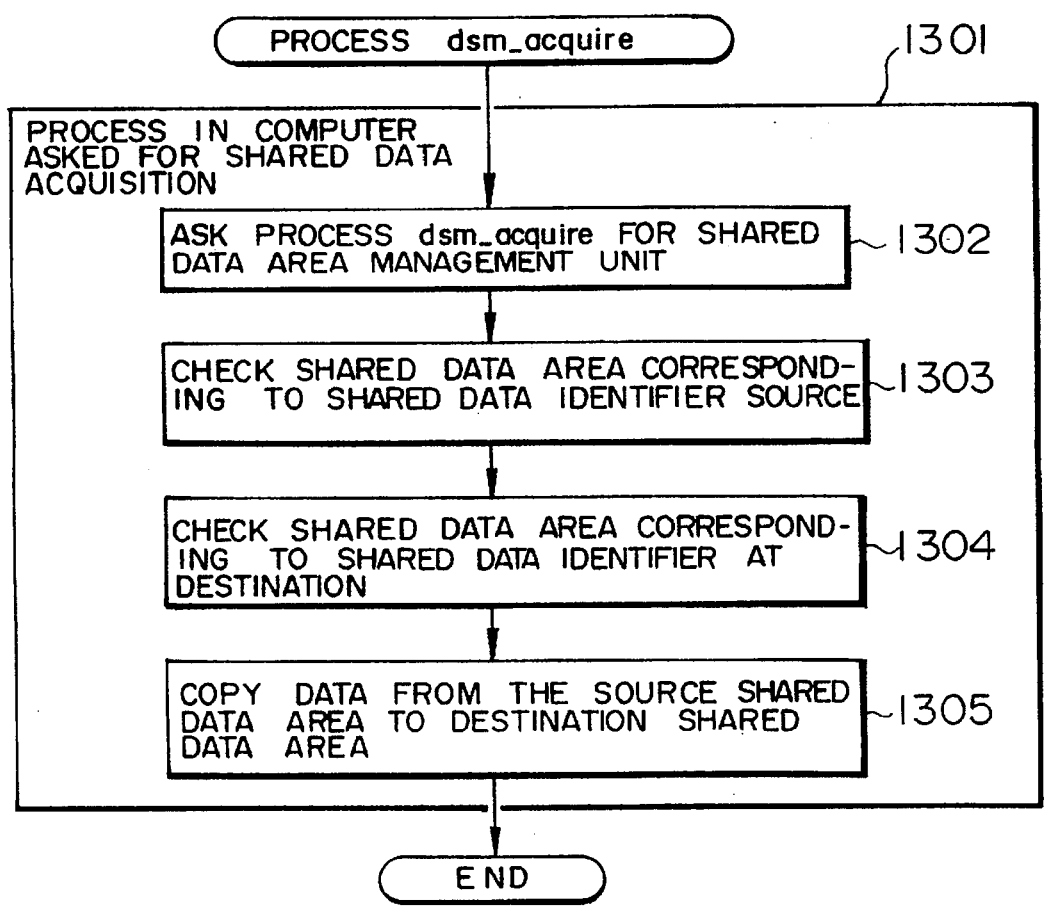
FIG. 14 is a flow chart of a shared data acquisition process according to the embodiment of the invention.

FIG. 14 is a flow chart of the process executed by the shared data management system when the shared data coherence control explained with reference to FIG. 11 is executed, according to the embodiment of the invention.

The process surrounded by a block 1301 is executed by a computer which has issued the process dsm_acquire 1003 in order to acquire latest shared data.

First, at Step 1302, in order to acquire latest shared data for an application, the application asks the shared data area management unit 404 for the process dsm acquire, by designating a shared data identifier (at a source) of the shared data to be acquired and a shared data identifier (at a destination) for representing a memory area at which the acquired shared data is stored.

At Step 1303, a copied shared data address corresponding to the acquired shared data identifier (at a source), a shared data size, and the like are searched for in the shared data management table 405 by using the shared data identifier as a search key.

Next, like Step 1303, at Step 1304, a shared data address and a shared data size corresponding to the shared data identifier care checked in accordance with the shared data identifier at a destination.

At Step 1305, the copied shared data 205 at the source shared data memory area 512 is copied to the destination shared data memory area 511.

If "1" is set to the scattering flag 606 of the shared data management table 405 when the source shared data is copied at Step 1305, the storage type at the area 512 shown in FIG. 5 is changed to the storage type 511. This process is performed by copying each element at an interval of the shared data offset value 608. Similarly, if a data structure definition is stored in the data structure definition entry 610 of the shared data management table 405 and "1" is set to the hierarchical element flag 612, data is copied from the area 512 to the area 511 while changing the storage type.

Figure 15:
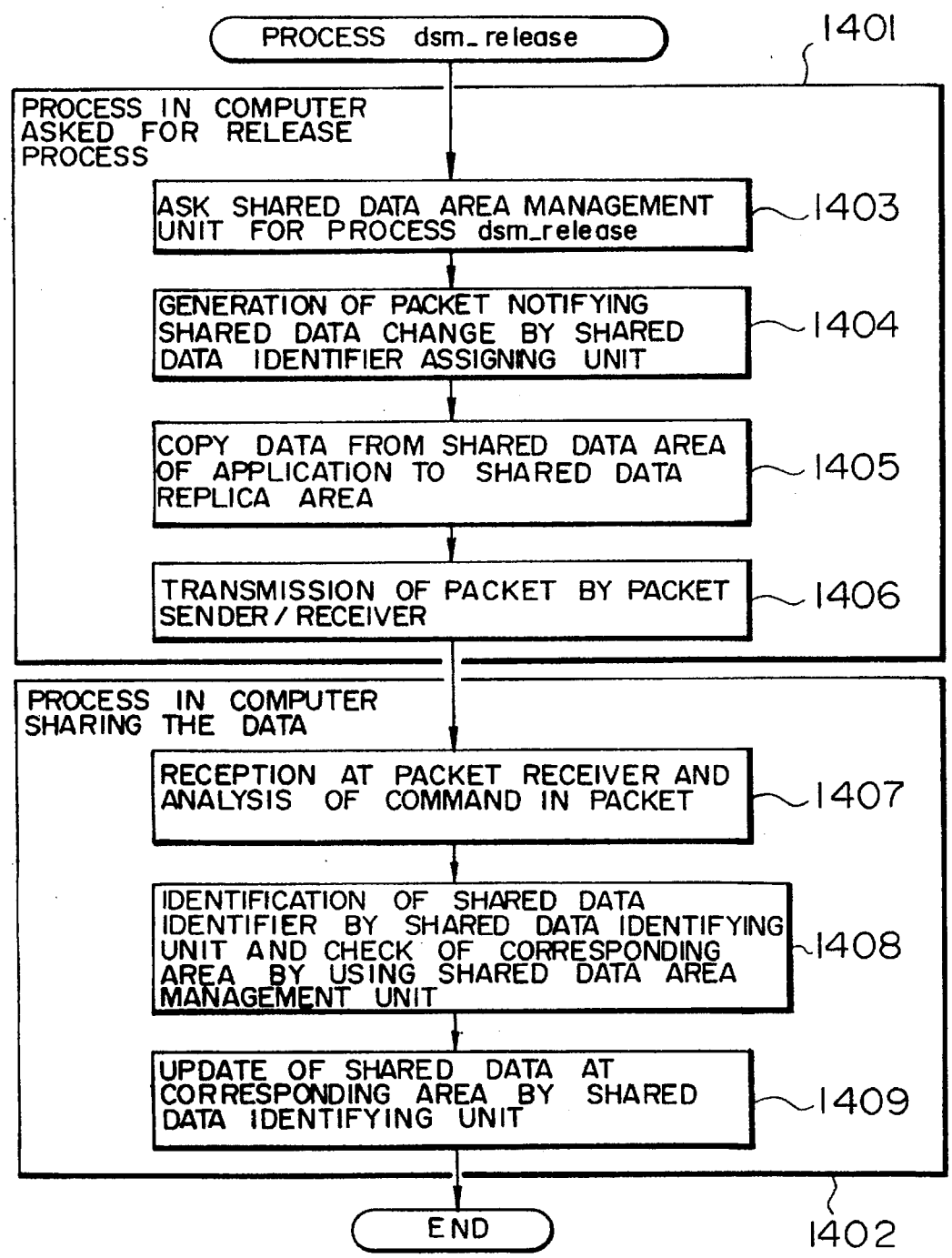
FIG. 15 is a flow chart of a shared data reflection process according to the embodiment of the invention.

FIG. 15 is a flow chart showing the process executed by the shared data management system when the shared data coherence control explained with reference to FIG. 11 is performed, according to the embodiment of the invention.

The process surrounded by a block 1401 is executed by a computer which issued the process dsm_release 1004 in order to reflect the shared data for the application on the shared data management system, and the process surrounded by a block 1402 is executed by all computers which store the reflected shared data.

First, at Step 1403, in order to reflect shared data for an application upon the shared data management system, the application asks the shared data management unit for the process dsm_release 1004 by designating a shared data identifier.

At Step 1404, a memory area corresponding to the designated shared data identifier is searched for in the shared data management table by using the shared data identifier as a search key. The shared data identifier assigning unit reads the data in the searched memory area to generate a packet which is used for communicating a change in the shared data to all computers storing the designated shared data.

At Step 1404, the shared data at the memory area 511 is copied as the copied shared data 205 at the memory area 512. In this case, the process is performed in the reverse direction of the copying process performed at Step 1405 shown in FIG. 14. Specifically, data is copied while changing the storage type at the memory area 511 to the storage type at the memory area 512 shown in FIG. 5 and FIG. 7B.

At Step 1406, the packet sender/receiver transmits the packet generated by the shared data identifier assigning unit, in accordance with the shared data storing computer list in the shared data management table. At Step 1407, the packet sender/receiver at a computer storing the shared data receives a packet indicating a change in the shared data transmitted via the network. The packet sender/receiver checks the packet to determine whether it has a shared data change notice, and transfers the packet to the shared data identifying unit.

At Step 1408, the shared data identifying unit 401 identifies the shared data identifier in the packet. In accordance with the shared data identifier, the shared data management table is searched to check a corresponding copied shared data address, shared data memory size, and the like.

At Step 1409, the shared data identifying unit writes the changed shared data received from the network, in response to the shared data change notice.

Figure 16:
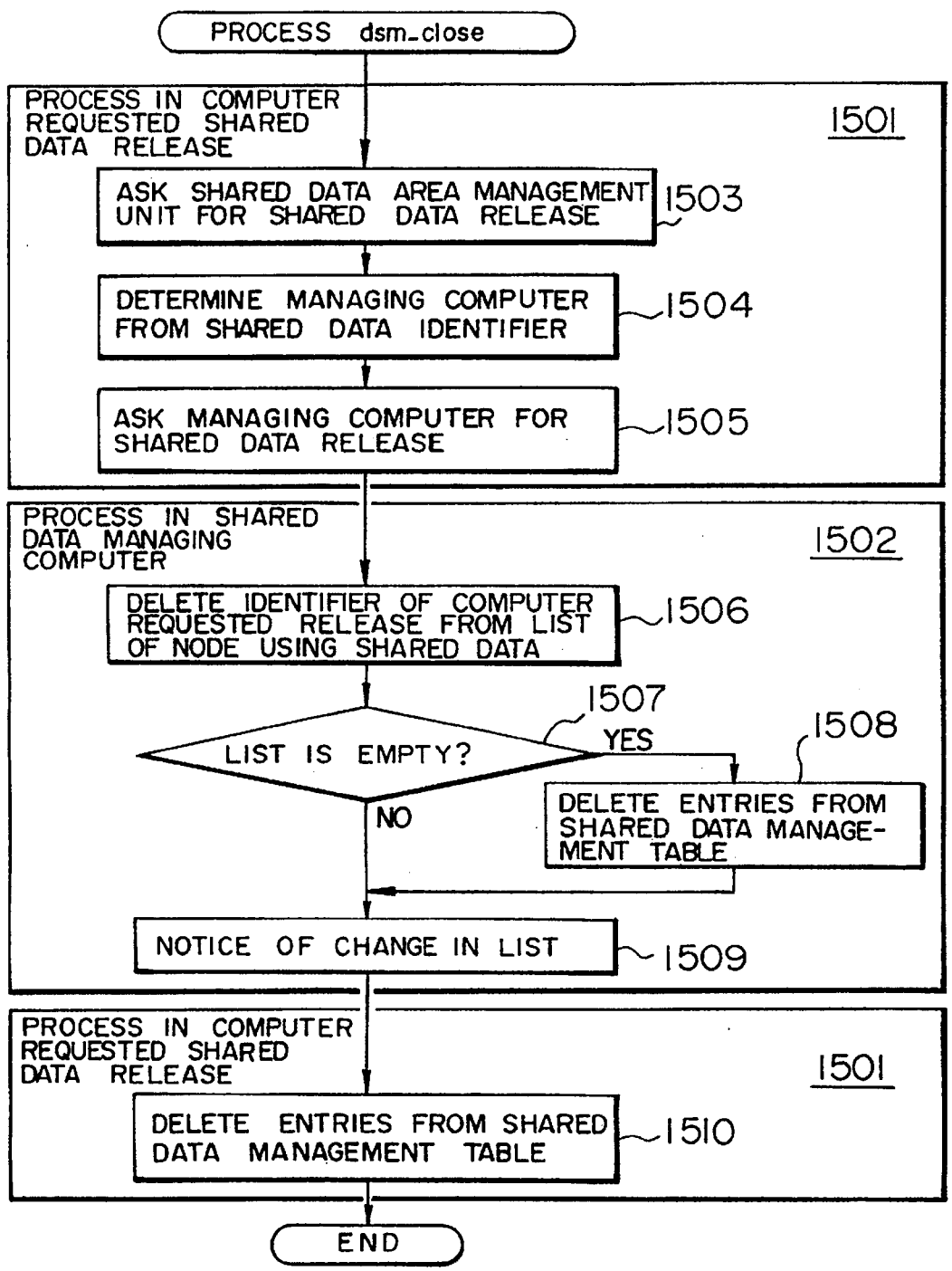
FIG. 16 is a flow chart of a shared data release process according to the embodiment of the invention.

FIG. 16 is a flow chart showing the process executed by the shared data management system when the shared data termination process explained with reference to FIG. 11 is executed, according to the embodiment of the invention.

The process surrounded by a block 1501 is executed by a computer which requested a release of shared data, and the process surrounded by a block 1502 is executed by a shared data managing computer determined by a shared data identifier.

First, at Step 1503, an application asks the shared data area management unit for the process dsm release 1004 in order to release the shared data by designating the shared data identifier. At Step 1504, in accordance with the designated shared data identifier, a shared data managing computer is determined. At Step 1505, the shared data managing computer determined by the shared data area management unit is instructed to release the shared data.

At Step 1506, the shared data managing computer deletes the identifier of the computer which requested a release, from the list of the nodes using shared data in the shared data management table, in accordance with the shared data identifier.

After the identifier of the computer which requested a release is deleted from the shared data storing computer list of the shared data management table, it is checked at Step 1507 to determine whether the shared data storing computer list has become empty. If the list is empty, at Step 1508, the entries of the shared data in the shared data management table 405 of the shared data managing computer 43 are deleted. If not empty, at Step 1509, a change in the shared data storing computer list is communicated to the computers registered in the shared data storing computer list.

At Step 1510, the computer which has declared a release of shared data deletes the entries of the shared data in the shared data management table to release the memory area assigned to the copied shared data.

An embodiment of the invention has been described above. The objects, structures, and effects of the preferred embodiment of the invention will be summarized with reference to FIG. 4.

In a computer network system having a plurality of computers interconnected by a network, a distributed shared memory by which applications can access shared data, as if the shared data is being stored at a single memory area, can be realized by using data regarding a shared data area, timings of a shared data coherence control, and other data. Accordingly, the amount of data transmitted over the network and the number of data transmissions can be reduced, thereby efficiently using network resources and improving the access performance to the shared data.

In the preferred embodiment of this invention shown in FIG. 4, the shared data management system 204 is constituted by the shared data identifying unit 401, shared data identifier assigning unit 402, packet sender/receiver 403, and shared data area management unit 404, and is provided with the shared data management table 405.

When the application 201 designates the shared data (shared data unit) and a copy to the memory, the shared data area management unit 404 stores a correspondence between the shared data and the memory in the shared data management table 405. In order to ensure coherence between shared data, the following constitutional elements are provided to a computer instructed to change the shared data and a computer receiving the changed shared data.

The shared data identifier assigning unit 402 is provided so that at the computer instructed to change the shared data, this unit 402 checks the memory area corresponding to a shared data identifier, assigns the shared data identifier to the data in the memory area, and generates a packet for communicating a shared data change to other computers.

The shared data identifying unit 401 is provided so that at the computer receiving the shared data change notice, the unit 401 identifies the shared data identifier in a packet received via the network, checks the memory area corresponding to the shared data identifier by using the shared data area management unit, and writes the changed shared data into the memory area.

The packet sender/receiver 403 is provided so that both the computers can send and receive a packet and control the network adapter.

According to the preferred embodiment of the invention, there is provided means for supplying information on the shared data used by applications to the shared data management system. Accordingly, the amount of unnecessary data transferred over the network and the number of data transmissions can be reduced, and the network resources can be efficiently used. Since unnecessary data is not transferred over the network, the data transfer time on the network is shortened so that an access performance to the shared data can be improved, for example, the speed in area division type parallel processing can be improved.

Figure 17:
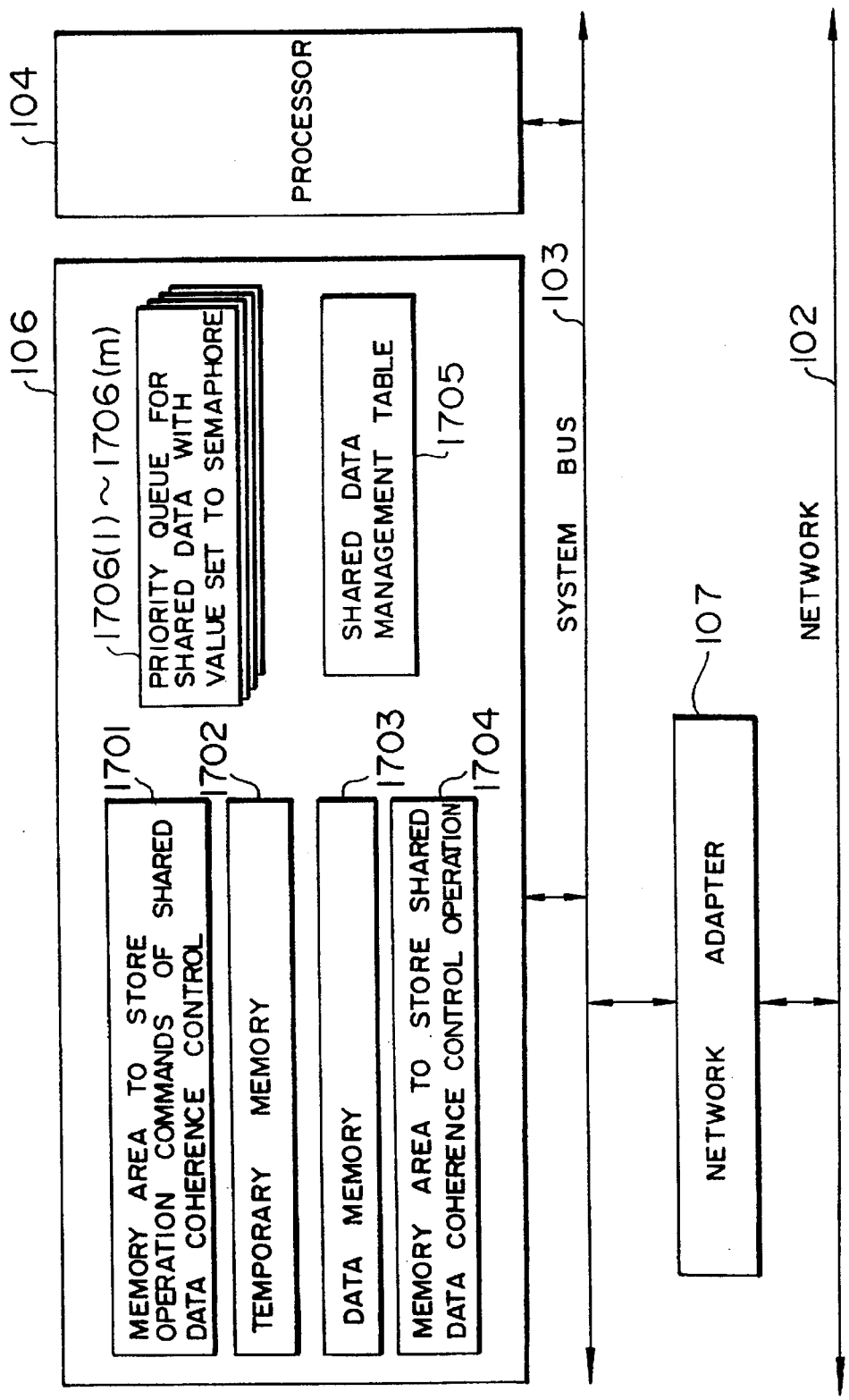
FIG. 17 is a block diagram showing a main storage and a network adapter according to another embodiment of the invention.

FIG. 17 is a block diagram of the main storage 106 according to another embodiment of the invention.

The main storage 106 has a memory area 1701 for storing operation commands of shared data coherence control, a temporary memory area 1702, a shared data memory area 1703, a memory area 1704 for storing a shared data coherence control operation, priority queues 1706 (1) to 1706 (m) for shared data with semaphore values being set, and a shared data management table 1705.

Commands stored in the memory areas 1701 and 1704 are read and supplied via the system bus 103 to the processor 104. In response to each command, the processor 104 reads data from, or writes data to, the working memory 1702, shared data memory area 1703, priority queues 1706, and shared data management table 1705, and controls the network adapter 107 for data transfer. Commands stored in the coherence control command memory area 1701 include a shared data coherence control designation command and a shared data coherence control release command which are read by the processor 104 via the system bus 103 to control the network adapter 107 for data transfer.

Commands stored in the coherence control operation memory area 1704 are used for ensuring coherence of shared data between the subject computer and other computers 101, by using the shared data management table 1705 and priority queues 1706. In response to the shared data coherence control command in the coherence control command memory area 1701, the processor 104 reads a command from the coherence control operation memory area 1704.

Upon reading the commands in the coherence control operation memory area 1704, the processor 104 refers to the shared data management table 1705 and queues 1706, and transmits necessary data to other computers 101 via the network adapter 107 and network 102.

When a packet is sent from another computer 101 via the network to the network adapter 107, an interrupt is issued and the processor 104 detects a reception of the packet. As a method of detecting a reception of a packet from another computer 101, the processor 104 may periodically monitor the network adapter 107.

When the processor 104 detects a reception of a packet from the other computer 101, it executes commands in the coherence control operation memory area 1704. Referring to the shared data management table 1705 and queues 1706, the commands read from the memory area 1704 change, if necessary, the shared data in the shared data memory area 1703 via the system bus 103. The shared data management table 1705 is used for ensuring coherence of the shared data stored in the shared data memory area 1703 of the subject computer 101. Each priority queue 1706 is a buffer for loading a coherence control request from a respective computer 101.

Figure 18:
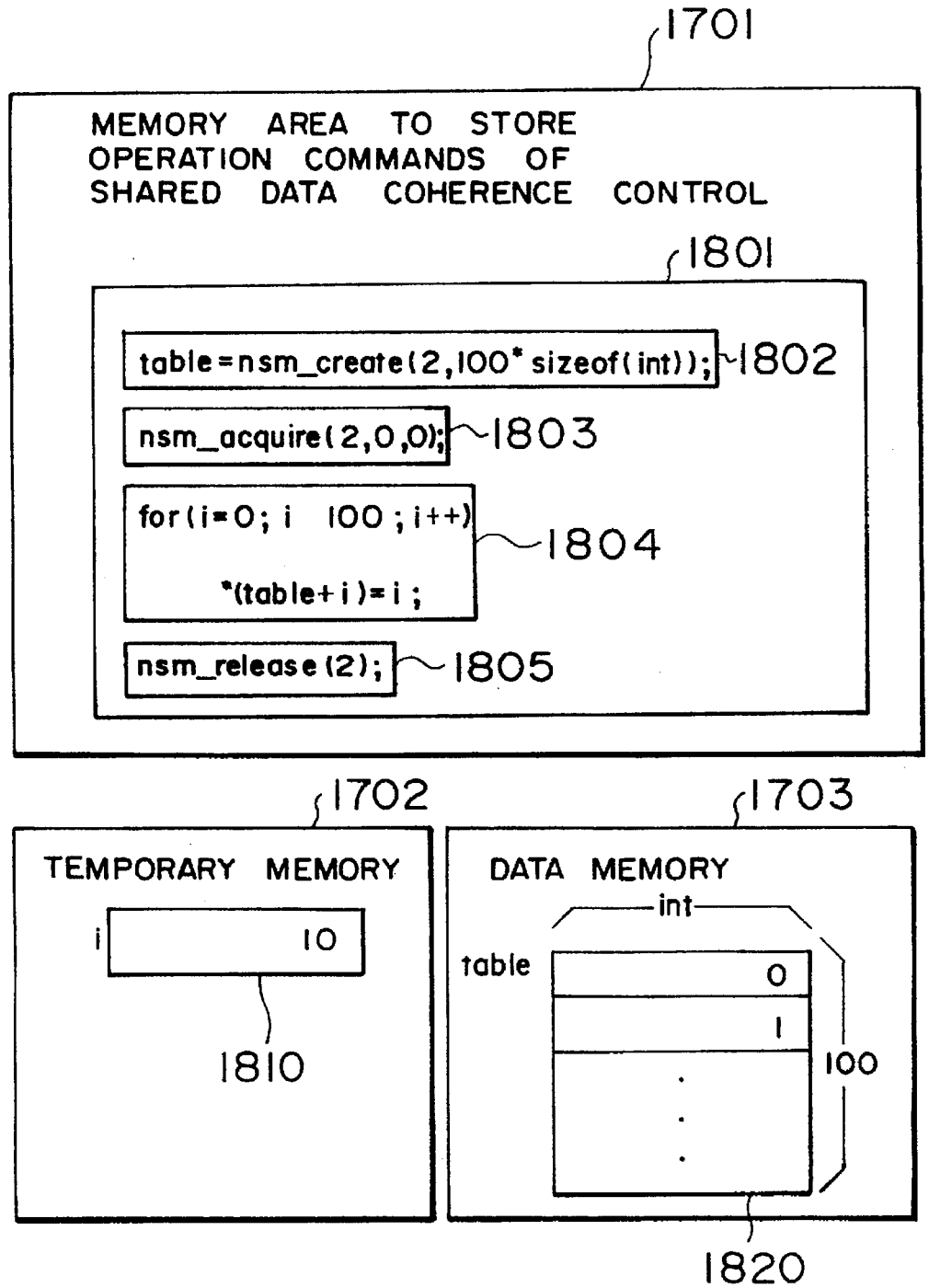
FIG. 18 is a diagram showing the structure of a main memory according to the embodiment of the invention.

FIG. 18 shows the details of the coherence control command memory area 1701, working memory area 1702, and shared data memory area 1703, respectively, of the main storage 106 of the embodiment of the invention.

The coherence control commands in the coherence control enable/disable command memory area 1701, which run on an application of a computer, are, for example, a command sequence described by a C language such, as shown in FIG. 18. The command sequence 1801 includes a command 1802 for generating shared data, a command 1803 for designating coherence control, a command 1804 for changing shared data, and a command 1805 for releasing coherence control. In writing a program for parallel processing, a programmer enters the shared data generation, coherence control designation, shared data change, and coherence control release while considering a priority or the like of applications at respective computers.

The command 1802 is constituted by a shared data identifier "2" and a shared data size. In this example, array data of an integer (int) type having an element size of 100 is generated, and the function "table" stores a pointer to an area of the array data. When this command is executed, the shared data 1820 represented by the function "table" is stored in the shared data memory area 1703 of the computer. A plurality of sets of shared data are stored in the shared data memory area 1703. The command 1803 is a coherence control designation command for ensuring coherence of the shared data 1820 generated by the shared data generation command 1802. The command 1803 designates a shared data identifier of the shared data to be subjected to a coherence control, a shared data queue semaphore value, and a coherence control priority. The command 1804 is a command for changing the shared data designated by the command 1803. The command 1805 is a command for releasing the coherence control of the shared data 1802 of the shared data identifier "2". It is to be noted that the command 1804 performs the operations of changing the shared data 1820 a plurality of times. These repetitive change operations of the shared data 1820 by the command 1804 postpone the change operations of another computer 101 until the coherence control release command 1805 is issued. It is therefore possible to reduce the amount of data transferred over the network 108.

The commands 1802, 1803, and 1805 supply control commands for setting up the coherence control execution commands. When these commands are detected and the coherence control execution commands are set up, the shared data management table is supplied with new data or updated, or when necessary, a coherence control of shared data 1820 in another computer is executed via the network adapter 107. Stored in the working memory area 1702 are variables used temporarily by the subject computer, for example, variables (i) 1810 used by the command sequence 1801.

Figure 19:
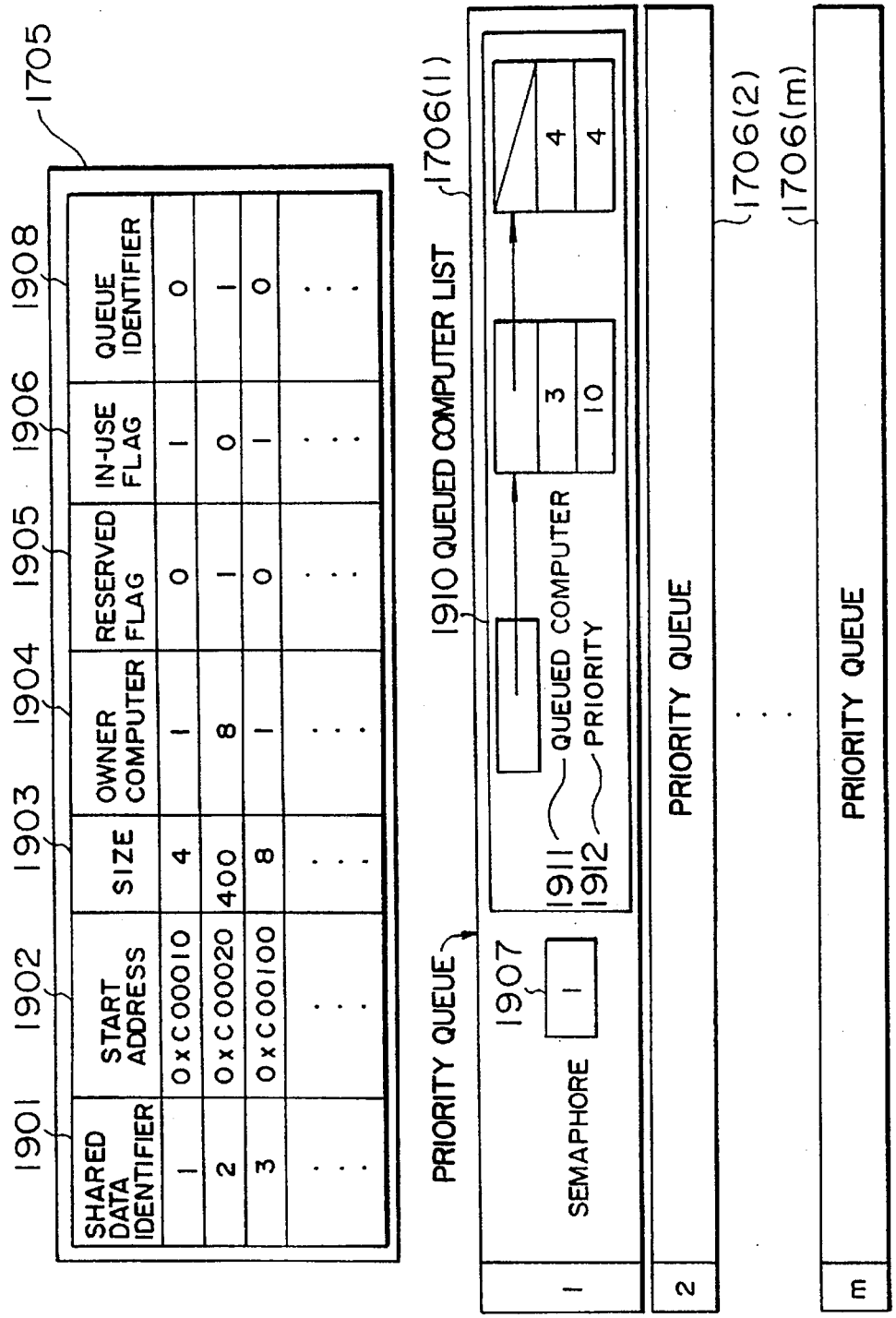
FIG. 19 is a diagram showing the structure of a shared data management table according to the embodiment of the invention.

FIG. 19 shows examples of the shared data management table 1705, and priority queue 1706. The shared data management table 1705 has for each shared data array 1820, a shared data identifier 1901, a start address 1902, a size 1903, an owner computer number 1904, a reservation flag 1905, an in-use flag 1906, and a queue number 1908. The queue number 1908 identifies one of a plurality of queues 1706. Each queue 1706 is constituted by a counter 1907 and a queued computer list 1910. The queued computer list 1910 is a priority queue having entries of combinations of a queued computer 1911 and a priority. The shared data identifier 1901 is used for identifying a set of shared data among a plurality set of shared data at the shared data memory area 1703, and is commonly used by each computer 101 of the loosely coupled computer system 100. The start address 102 and size 1903 determine the position and size of the shared data 1820.

The owner computer number 1904 is a serial number assigned to a computer having the latest shared data of the shared data identifier 1901. If the owner computer number 1904 is the same as the subject computer number, the owner of the shared data is the subject computer. The reservation flag 1905 indicates whether or not the coherence control designation command 1803 has been executed already. If a plurality of coherence control requests are issued to the same shared data, a fault is issued by checking the reservation flag. The in-use flag 1906 takes a value "1" until the coherence control release command 1805 is issued after the subject computer becomes the owner computer in response to the coherence control designation command 1803. The queue number 1908 identifies the priority queue 1706 which is effective only when the subject computer is the owner computer.

The priority queue 1706 is constituted by a counter 1907 and a queued computer list 1910. The contents of the counter 1907 are changed each time a semaphore value designated by the coherence control designation command 1803 is received. The contents of the queued computer list 1910 are controlled by using this counter 1907. The queued computer list 1910 has entries of queued computers 1911 and priorities 1912. This list 1910 is a priority queue which stores coherence control requests from other computers issued by the coherence control designation command 1803 relative to the shared data of the owner computer. In this embodiment, as the value of a priority in the queued computer list 1910 becomes large, the priority degree becomes high. The details of the embodiment using the priority queue 1706 will be explained later with reference to FIGS. 25 and 26.

Figure 20:
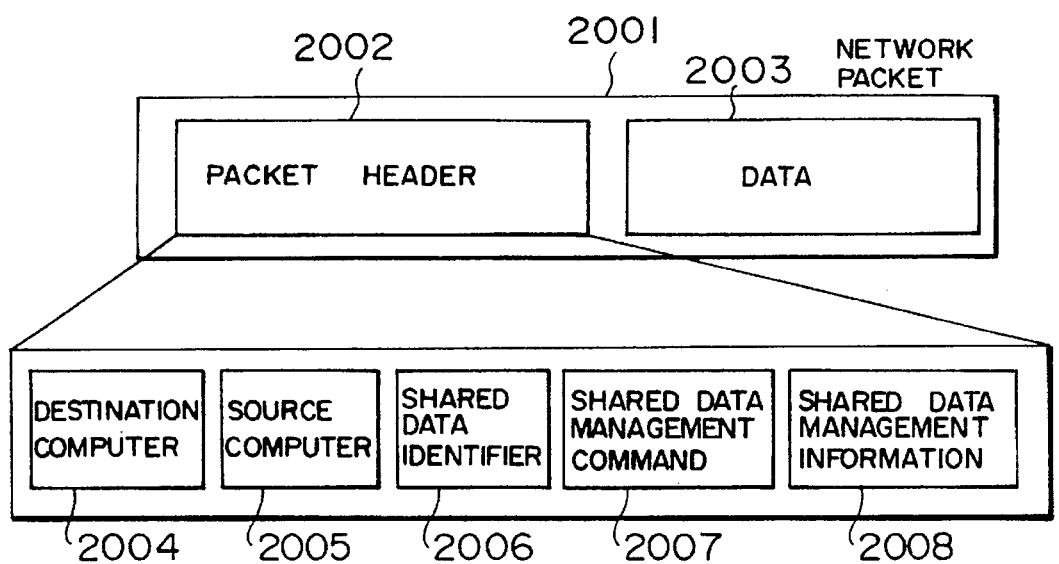
FIG. 20 is a diagram showing the structure of a communication packet according to the embodiment of the invention.

FIG. 20 shows an example of a network packet 2001 transferred via the network adapter 2003 over the network 102.

The packet 2001 is constituted by a packet header 2002 and a data field 2003. A coherence control packet header 2002 has a destination computer number 2004, a source computer number 2005, a shared data identifier 2006, a shared data management command field 2007, and a shared data management data field 2008. In order to control coherence of the shared data 1820 having the shared data identifier 2006, the source computer 2005 transmits a shared data management command 2007 and shared data management data 2008 to the destination computer 2004.

Figure 21:
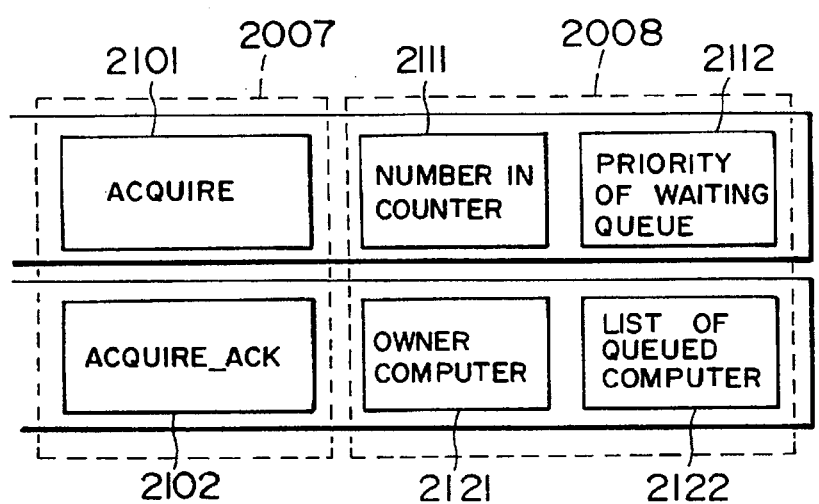
FIG. 21 is a diagram showing the structure of a communication packet according to the embodiment of the invention.

FIG. 21 is a diagram showing the details of the shared data management commands 2007 and shared data management data 2008.

In this embodiment, the shared data management commands 2007 includes two commands, one being a coherence control request command "ACQUIRE" 2101 and the other being a coherence control acknowledge command "ACQUIRE_ACK" 2102. The shared data management data 2008 follows the coherence control request commands.

The coherence control request command "ACQUIRE" 2101 uses a number in counter 2111 and a priority of waiting queue 2112, and the coherence control acknowledge command "ACQUIRE_ACK" 2102 uses the target owner computer number 2121 and a queued computer list 2122. If the shared data management command 2007 is the coherence control request command "ACQUIRE" 2101, the data field 2003 is empty.

In the case of the coherence control acknowledge command "ACQUIRE_ACK" 2102, latest shared data of the owner computer is loaded on the data field 2003.

The shared data management command is broadcast to all computers. For this broadcast procedure, it is required that a packet transmitted from each computer reaches all computers in the same order. For this broadcast, the value of the destination computer number of the packet header is set, for example, to "−1" and the network adapter 107 broadcasts when it is requested to transmit a packet to the destination computer of the number "1".

Figure 22:
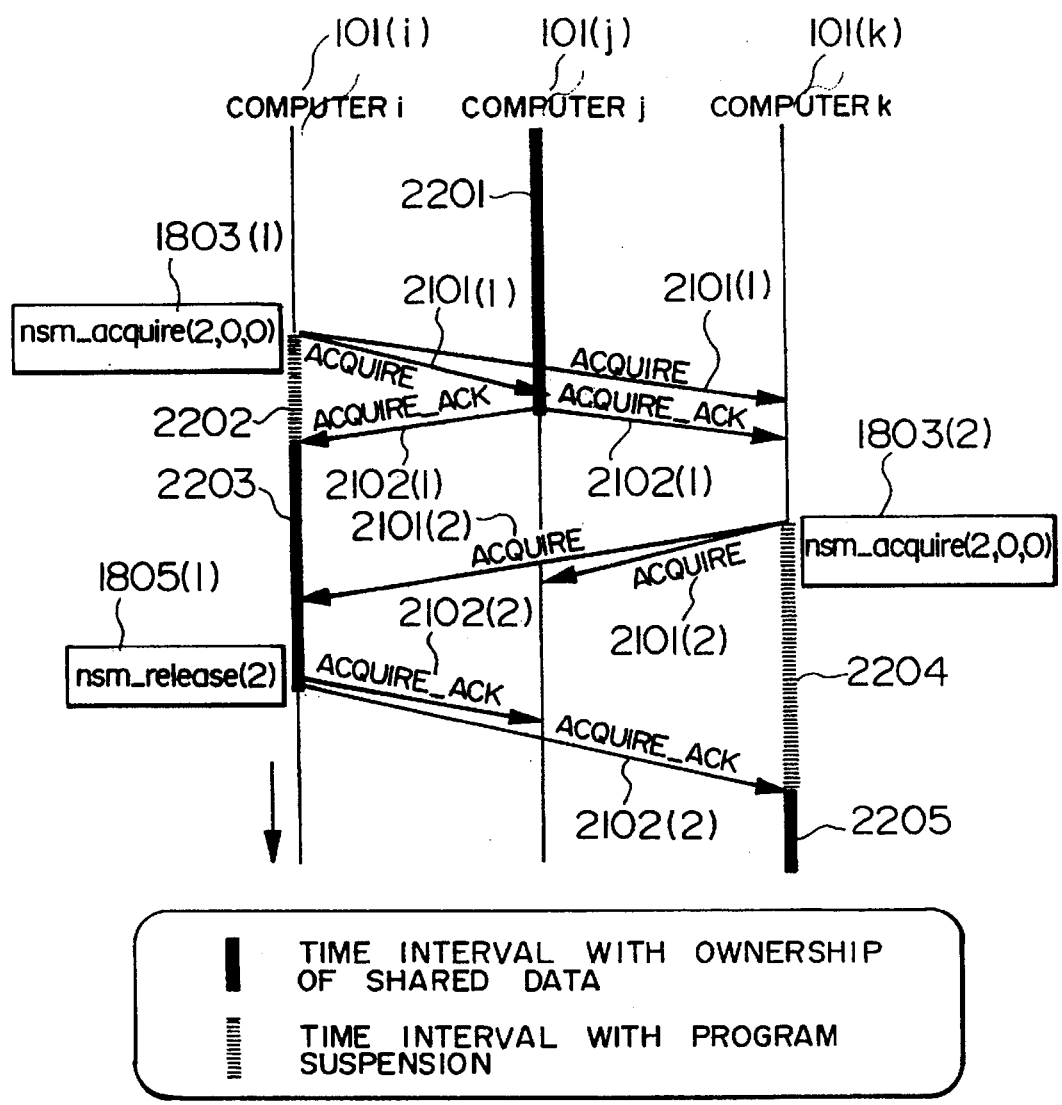
FIG. 22 is a timing chart explaining the operation by commands in a shared data coherence control command memory area according to the embodiment of the invention.

FIG. 22 is a timing chart for explaining the operation when a plurality of computers 101 issue the coherence control execution command, according to the embodiment of the invention.

During time intervals 2201, 2203, and 2205, the computer owns the shared data of the shared data identifier "2", and during time intervals 2202 and 2204, the program which issued the coherence control designation command 1803 is being suspended. When the coherence control designation command 1803 (1) is issued among the commands in the coherence control designation command memory area 1704 of the computer 101 (i), the coherence control request command "ACQUIRE" 2101 (1) is broadcast to all computers. It is assumed that the owner computer 101 (j) has already issued the coherence control release command 1805 before the command 2101 (1) is broadcast. Upon reception of the coherence control request command "ACQUIRE" 2101 (1), the computer 101 (j) broadcasts the coherence control acknowledge command "ACQUIRE_ACK" 2102 (1) to all computers. The program of the computer 101 (i) is suspended until it receives the coherence control acknowledge command "ACQUIRE_ACK" 2102 (1). Upon reception of this command, the owner computer is switched from the computer 101 (j) to the computer 101 (i). When another computer such as a computer 101 (k) receives the coherence control acknowledge command "ACQUIRE_ACK" 2102 (1), it reflects a change in the owner computer from the computer 101 (j) to the computer 101 (i) upon the shared data management table. Even if a coherence control acknowledge command "ACQUIRE_ACK" 2102 (2) issued by the computer 101 (k) in response to the coherence control designation command 1803 (2) reaches the owner computer 101 (i), a coherence control acknowledge command "ACQUIRE_ACK" 2102 (2) is not transmitted until the computer 101 (i) issues the coherence control release command 1805 (1). Because the computer 101 (k) waits for the coherence control acknowledge command "ACQUIRE_ACK" 2102 (2), it becomes possible to provide synchronization for the coherence control.

Figure 23:
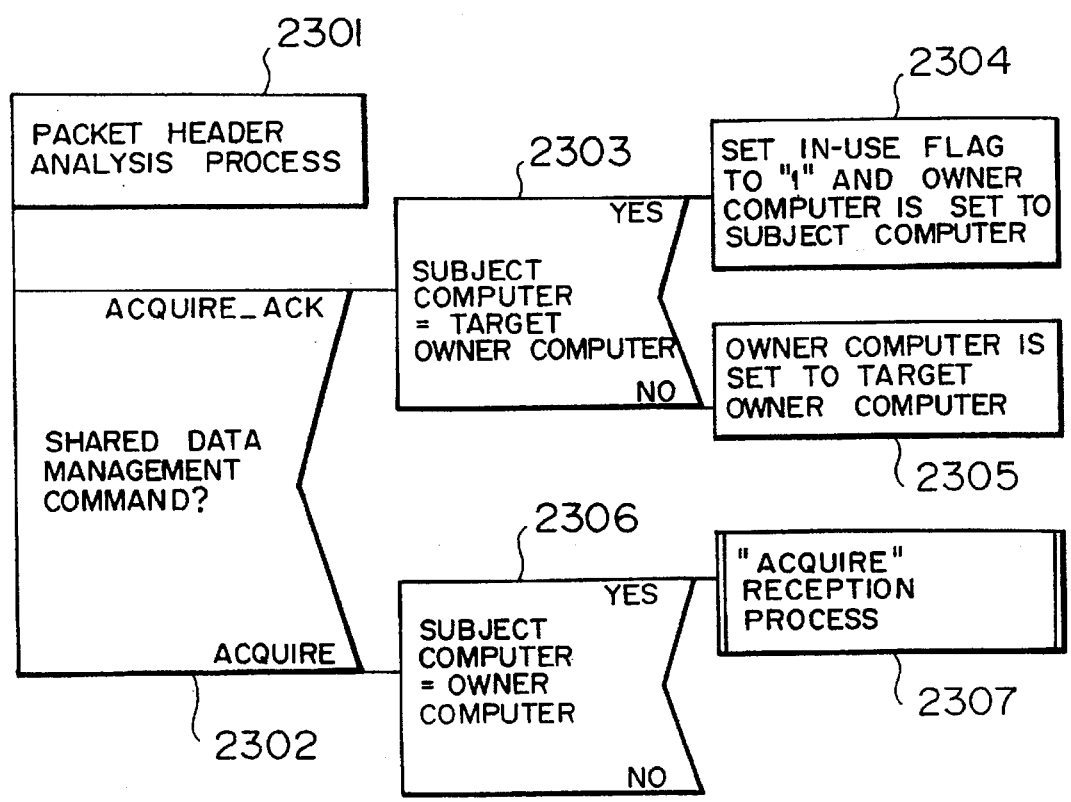
FIG. 23 is a PAD explaining the operation by commands in the shared data coherence control command memory area according to the embodiment of the invention.

FIG. 23 is a program analysis diagram (PAD) for explaining the operations by the commands stored at the coherence control operation memory area 1704 when a network packet 2001 is received at the network adapter 107.

First, at Step 2301 of a packet header analysis process, the network packet 2001 is disassembled into the destination computer number 2004, source computer number 2005, shared data identifier 2006, shared data command 2007, shared data management data 2008, and shared data 2003. Next, at Step 2302, the shared data management command 2007 is checked whether it is the coherence control acknowledge command "ACQUIRE_ACK" or the coherence control request command "ACQUIRE". If it is the coherence control acknowledge command "ACQUIRE_ACK" the control advances to Step 2303 whereat it is checked whether a target owner computer 2121 in the received packet is for the subject computer. If so, at Step 2304, the in-use flag 1906 is set to "1" and the owner computer 1904 is set to the subject computer. If the target computer number 2121 in the received packet is not for the subject computer, the owner computer 1904 in the shard data management table 1705 is set to the target computer 2121.

If the shared data management command 2007 at Step 2320 is the coherence control request command "ACQUIRE" 2101, then at Step 2306 the owner computer number 1904 in the shared data management table 1705 and the subject computer number are checked. If the subject computer is the owner computer, an "ACQUIRE" reception process is performed at Step 2307.

Figure 24:
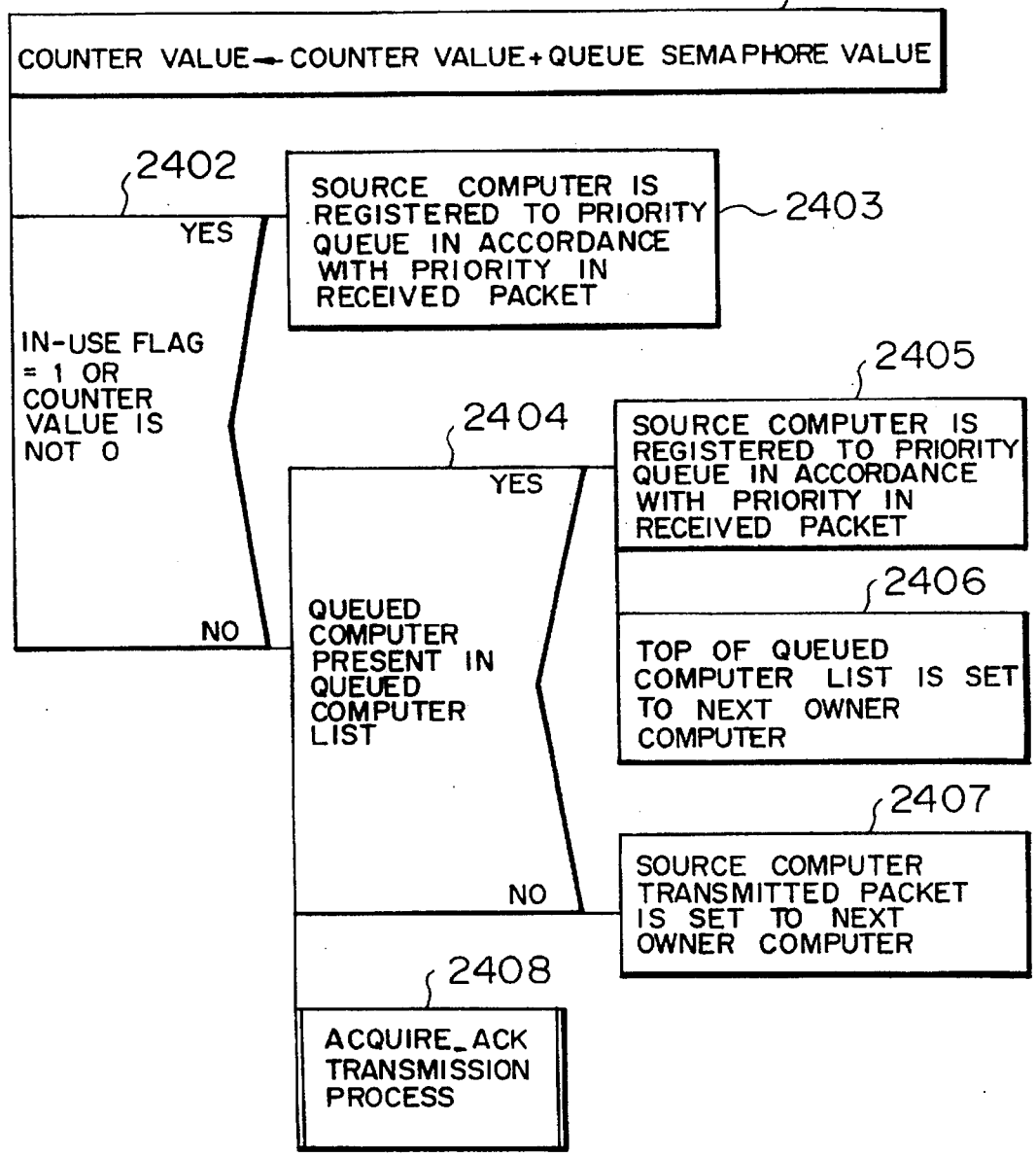
FIG. 24 is a PAD explaining the operation by commands in the shared data coherence control command memory area according to the embodiment of the invention.

FIG. 24 is a PAD explaining the details of the "ACQUIRE" reception process.

First, at Step 2401, the value of the counter 1907 of the queue 1706 designated by the shared data identifier 2006 in the received packet is added to the queue semaphore value 2402 in the received packet, the added value being a new value of the counter 1907.

Next, at Step 2402, it is checked to determine whether the in-use flat 1906 in the shared data management table 1705 is "1" and the value of the counter 1907 is "0". If the in-use flat 1906 is "1" or if the value of the counter 1907 is not "0", at Step 2403, the source computer is registered to the priority queue 1706 in accordance with the priority 2112 in the received packet. If the impulse flat 1906 is "1" and the value of the counter 1907 is "0", at Step 2404, the priority queue 1706 is referred to, based upon the queue number 1908. If there is a queued computer, at Step 2405, the source computer is registered to the priority queue 1706 in accordance with the priority in the received packet, and at Step 2406, the top of the queued computers is set to the next owner computer. If there is no queued computer at Step 2404, the source computer 2005 is set to the next owner computer. With the processes at Steps 2405 and 2406, it become possible to preferentially receive the coherence control request command "ACQUIRE" issued first.

With the process at Step 2403, it becomes possible to arrange coherence control requests by a plurality of computers in a priority order. If a request is to be processed in the requested order by neglecting a priority order, the priorities of a plurality of computers are set to the same value.

Figure 25:
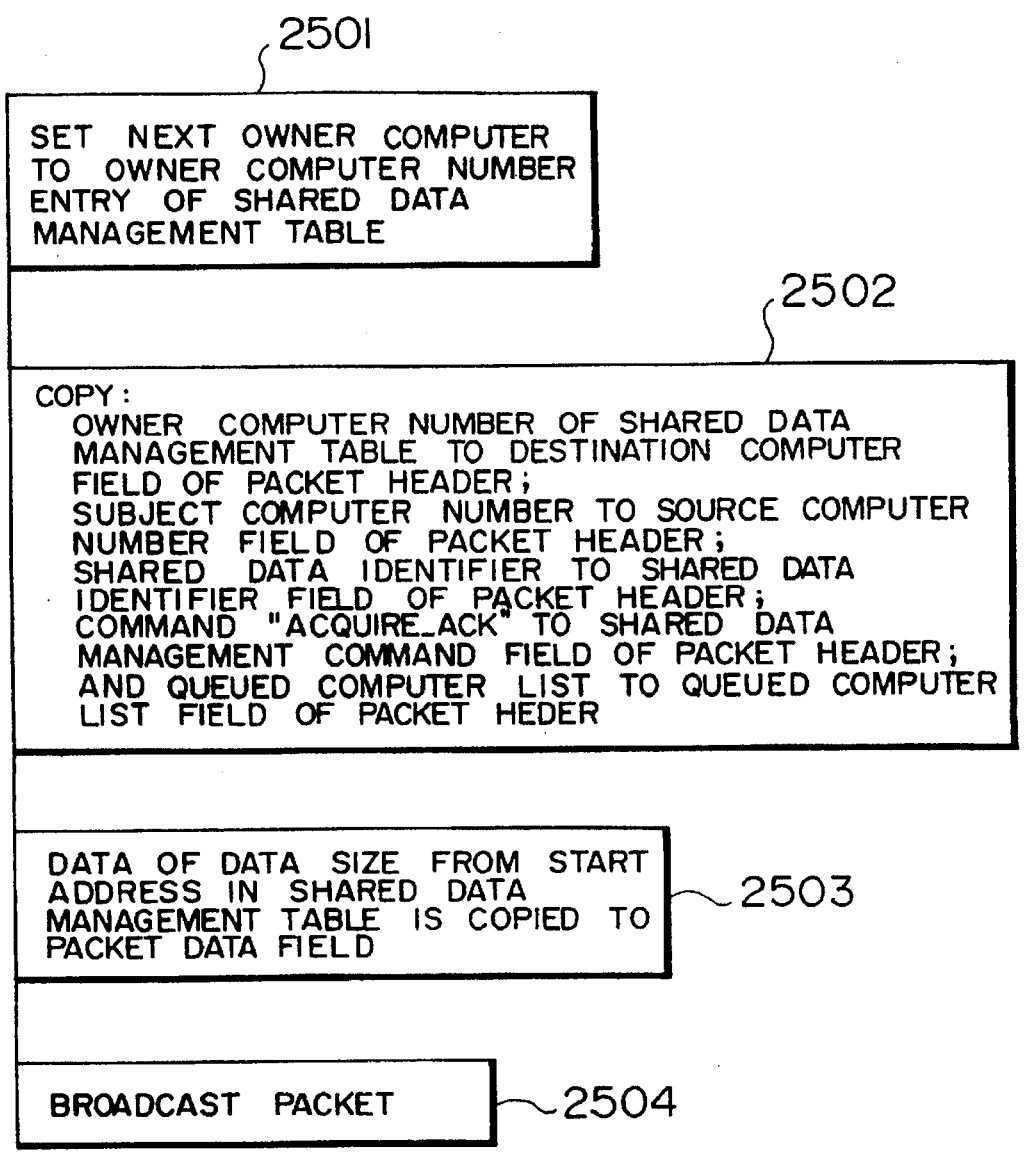
FIG. 25 is a PAD explaining the operation by commands in the shared data coherence control command memory area according to the embodiment of the invention.

FIG. 25 is a PAD for explaining the details of an "ACQUIRE_ACK" transmission process at Step 2408.

In the "ACQUIRE_ACK" transmission process, first at Step 2501, the next owner computer is set to the owner computer number entry 1904 of the shared data management table 1705. Next, at Step 2502, the owner computer number in the shared data management table 1705 is copied to the destination computer number field 2004 of the packet header, the subject computer number is copied to the source computer field 2005 of the packet header, the shared data identifier 1901 is copied to the shared data identifier field 1901 is copied to the shared data identifier field 2006 of the packet header, the command "ACQUIRE_ACK" 2101 is copied to the shared data command field 2007, and the queued computer data identifier 1901 is copied to the queued computer list field 2122 of the packet header. Next, at Step 2503, data of the predetermined data size from the start address 1902 in the shared data management table is copied to the data field of the packet. Lastly, at Step 2504, the network adapter 107 is instructed to receive the packet and transmit it to the destination computer 2004.

Figure 26:
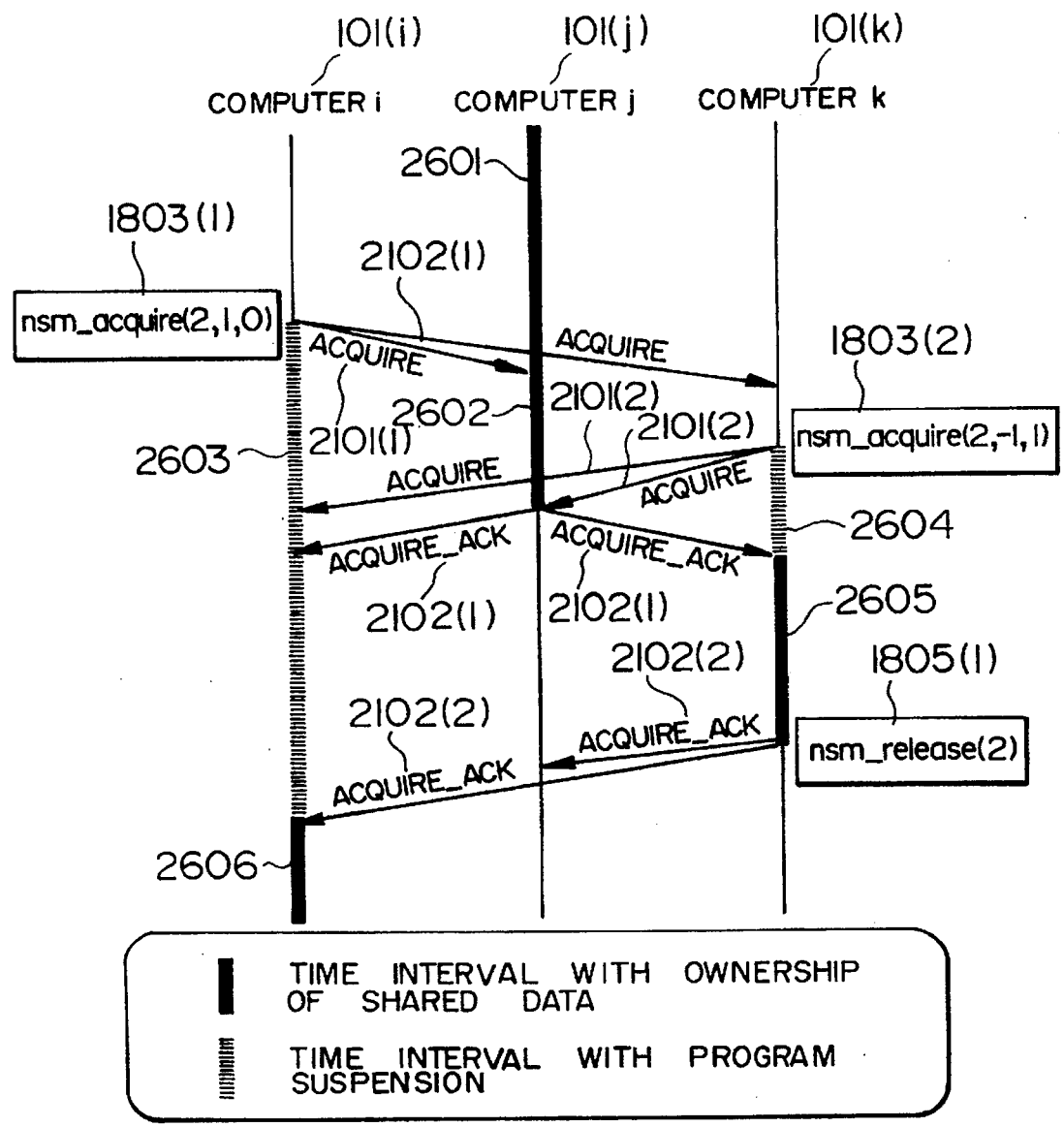
FIG. 26 is a timing chart explaining the operation by commands in a shared data coherence control command memory area according to the embodiment of the invention.

FIG. 26 is a timing chart for explaining the operation when the coherence control designation command 1802 sets a queue semaphore according to the embodiment of the invention.

During time intervals 2601, 2605 and 2606, the computer owns the shared data of the shared data identifier "2", and during time intervals 2603 and 2605, the program which issued the coherence control designation command 1803 is being suspended. It is assumed that the coherence control release command has been already issued during the time interval 1601. During the time interval 2601, in response to the coherence control designation command 1803 (1) issued by the computer 101 (i), a queue semaphore value "1" and a priority "0" are entered for the shared data identifier "2". The computer 101 (i) broadcasts the coherence control designation command "ACQUIRE" 2101 (1) to request a coherence control to the owner computer 101 (j).

At this time, the value of the counter of the priority queue 1706 corresponding to the shared data identified "2" of the computer 101 (j) is "0" to which the queue semaphore value "1" set by the coherence control designation command 1803 (1) is added. The new value of the counter 1907 becomes "1". When the value of the counter is not "0" the coherence control acknowledge command "ACQUIRE_ACK" is not returned. It is assumed that during this time period, the computer 101 (k) issues another coherence control designation command 1803 (2) and broadcasts the coherence control request command "ACQUIRE" 2101 (2). At this time, a queue semaphore value of "−1" and a priority "1" are set. The queue semaphore value "−1" is added to the value of the counter 1907 of the queue 1706 corresponding to the shared data identifier "2" of the computer 101 (j), and the new value of the counter 1907 becomes "0". The coherence control request with the priority "0" issued by the computer 101 (i) by the preceding coherence control designation command 2101 (1) and stored in the priority queue 1706, is compared with the coherence control request with the priority "1" from the computer 101 (k). The computer 101 (k) having a higher priority is set to the owner computer, and the coherence control acknowledge command "ACQUIRE_ACK" 2103 (1) is broadcast so that the owner computer for the shared data identifier "2" changes to the computer 101 (k). The coherence control request information of the computer 101 (i) is transmitted to the owner computer 101 (k) as the shared data management data of the coherence control acknowledge command "ACQUIRE_ACK" 2103 (1). The coherence control request by the computer 101 (i) is postponed until the computer 101 (k) executes the coherence control release command 1805 (1).

Since the coherence control designation command 1803 designates both the queue semaphore and priority, not only synchronization for a coherence control but also synchronization for the control of parallel programs are established.

Figure 27:
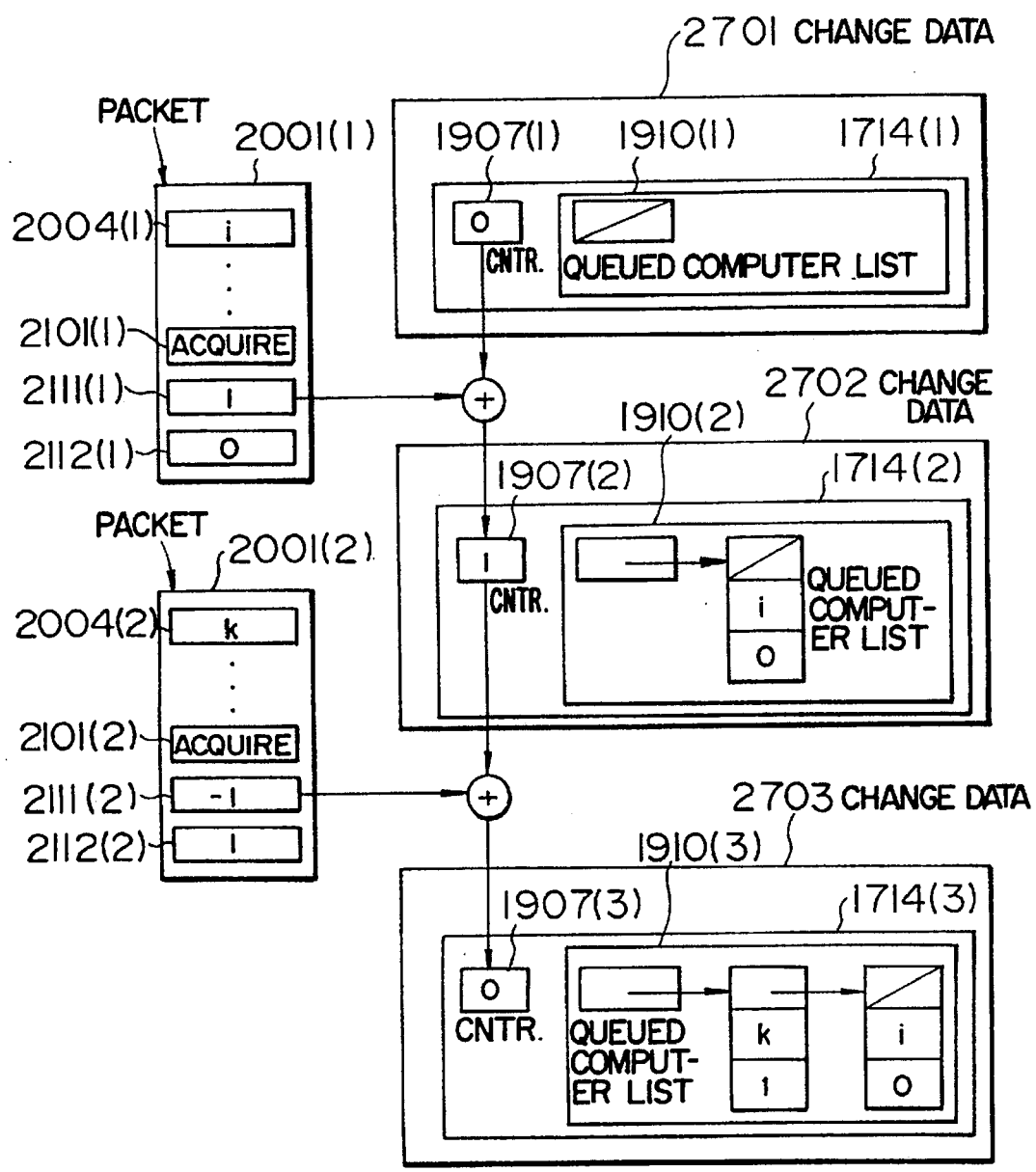
FIG. 27 is a diagram showing a shared data management table and a counter according to the embodiment of the invention.

FIG. 27 shows a change in the priority queue 1706 corresponding to the shared data identifier "2" of the computer 101 (i) when the coherence control designation command 1803 sets the queue semaphore, as explained with reference to FIG. 26.

A change in the contents of the priority queue 1706 of the computer 101 (j) with time is indicated at 2701, 2702, and 2703. The contents 2701 correspond to the time interval 2601 shown in FIG. 26, the contents 2702 correspond to the time interval 2602 shown in FIG. 26, and the contents 2703 correspond to the time immediately before the coherence control acknowledge command "ACQUIRE_ACK" 2102 (1) is transmitted immediately after the time interval 2702 shown in FIG. 26. The fields 2004 (1) and 2004 (2) of the source computers which issued network packets are set with "i" and "k" indicating that the command was issued from the computers 101 (i) and 101 (k), respectively. The values of counters 1907 (1), 1907 (2), and 1907 (3) in the contents 2701 and 2702 are respectively added to queue semaphore values 2111 (1) and 2111 (2) set by the coherence control designation commands 2101 (1) and 2101 (2). As seen from the contents 2703, since the coherence control request later issued by the computer 101 (k) has the priority 2112 (2), which is higher than the priority 2112 (1) of the coherence control request first issued by the computer 101 (i), the top of the queued computer list 1910 (3) is exchanged. Since the value of the counter 1907 (3) is "0", the coherence control requested by the computer 101 (k) at the top of the queued computer list 1910 (3) is first executed.

Figure 28:
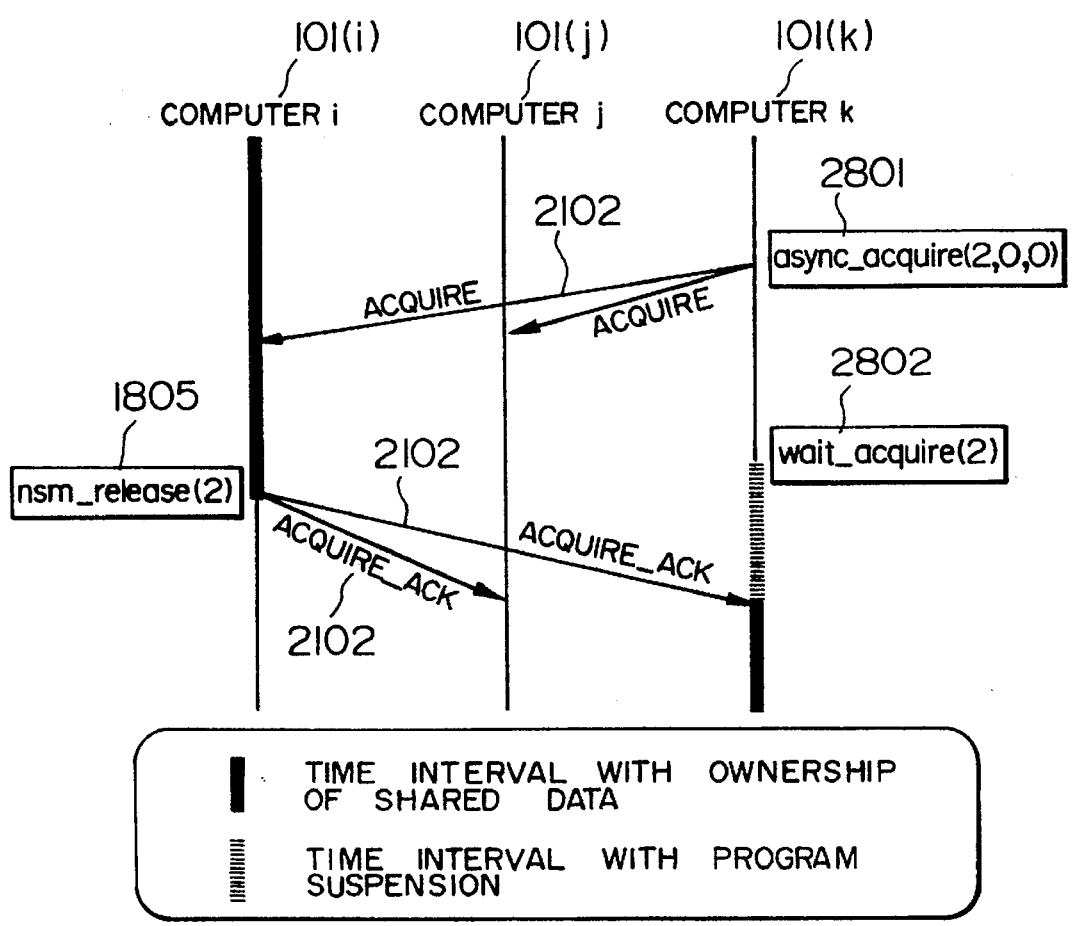
FIG. 28 is a timing chart explaining the operation by commands in a shared data coherence control command memory area according to the embodiment of the invention.
Figure 29:
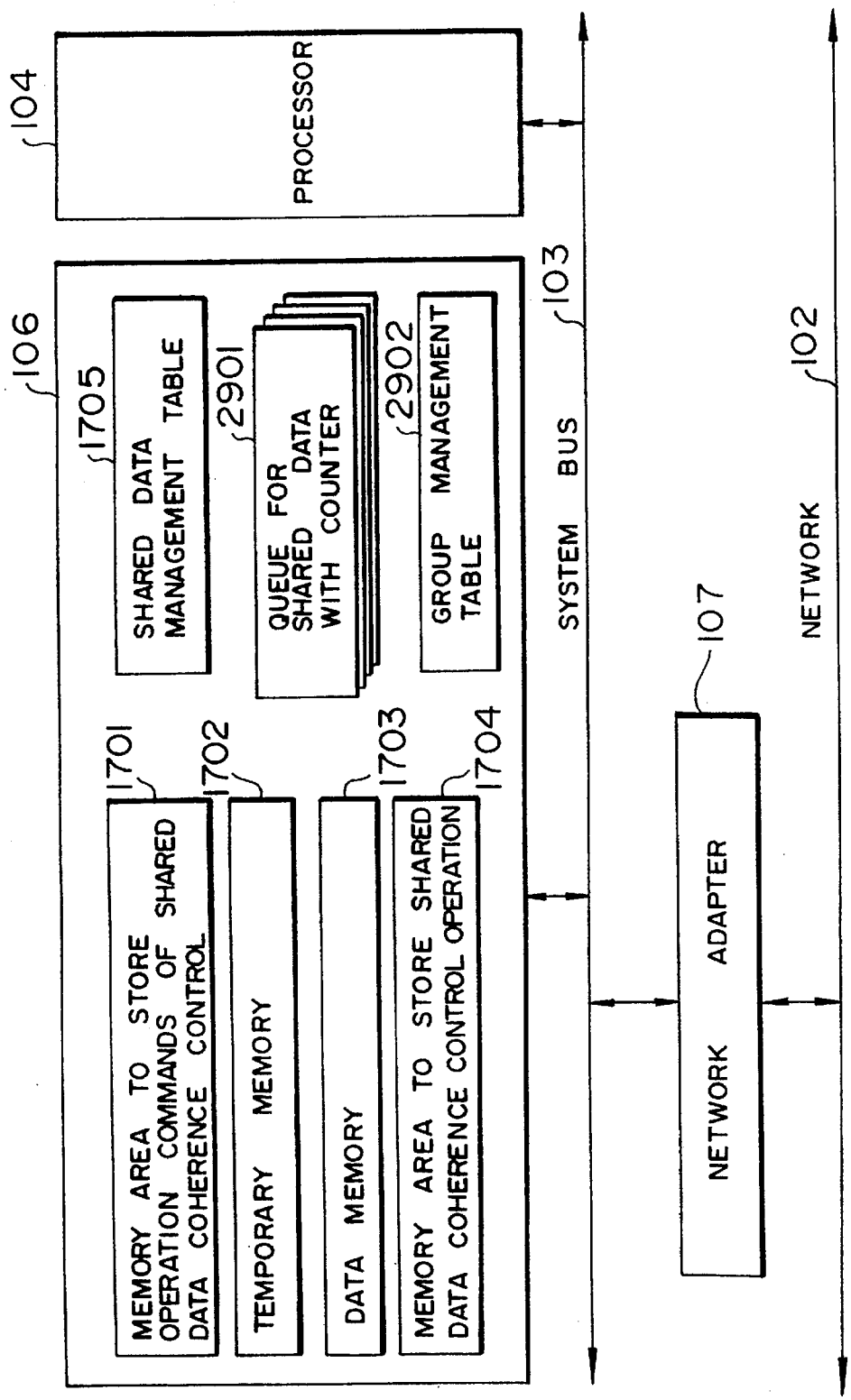
FIG. 29 is a block diagram showing a main storage and a network adapter according to another embodiment of the invention.

FIG. 28 is a diagram explaining the operation when the coherence control designation command 1804 is divided into an asynchronous coherence control request command 2801 and a coherence control request wait command 2802, according to the embodiment of the invention.

If the computer 101 (i) is an owner computer of the shared data of the shared data identifier "2" and the computer 101 (k) executes the coherence control designation command 1803, the coherence control request command "ACQUIRE" 2101 is transmitted to the computer 101 (i). After the coherence control designation command 1803 is executed, the program on the computer 101 (k) is suspended until it receives the coherence control acknowledge command 2102. However, by dividing the coherence control designation command 1803 into the asynchronous coherence control request command 2801 and the coherence control request wait command 2802, it becomes possible to execute another process which does not access the shared data, during the time interval between the two commands 2801 and 2802. These commands 2801 and 2802 can be executed without changing the structures of the shared data management table 1705 and priority queues 1706 and the contents of the coherence control operation memory area 1704.

In the above embodiment, the coherence control designation command controls the value of the counter 1907 and the priority 1912 to provide synchronization for the control of a parallel program flow. The invention can realize the control using such a coherence control designation command by a difference method. Another embodiment of the invention will be described with reference to FIGS. 29 to 44.

A main storage 106 has a memory area 1701 for storing operation commands of shared data coherence control, a working memory area 1702, a shared data memory area 1703, a memory area 1704 for storing a shared data coherence control operation, a shared data management table 1705, queues 2901 for shared data with counters, and a group management table 2902.

As compared to FIG. 17, the queues 1706 for shared data with semaphore values being set are replaced by the queues 2901 for shared data with counters, and the group management table 2902 is newly added.

Similar to the queue 1706, the queue 2901 is a buffer for storing shared data coherence control requests from other computers 101. However, the storage contents are different, and the details thereof will be described later with reference to FIG. 31.

An entity which reads a command in the coherence control command memory area 1701 and executes the command is conceptually called a process. In this embodiment, a single computer may have a plurality of processes. A plurality of Processes which share data and perform a single object job is called a group. The group management table 2902 manages processes belonging to each group.

Figure 30:
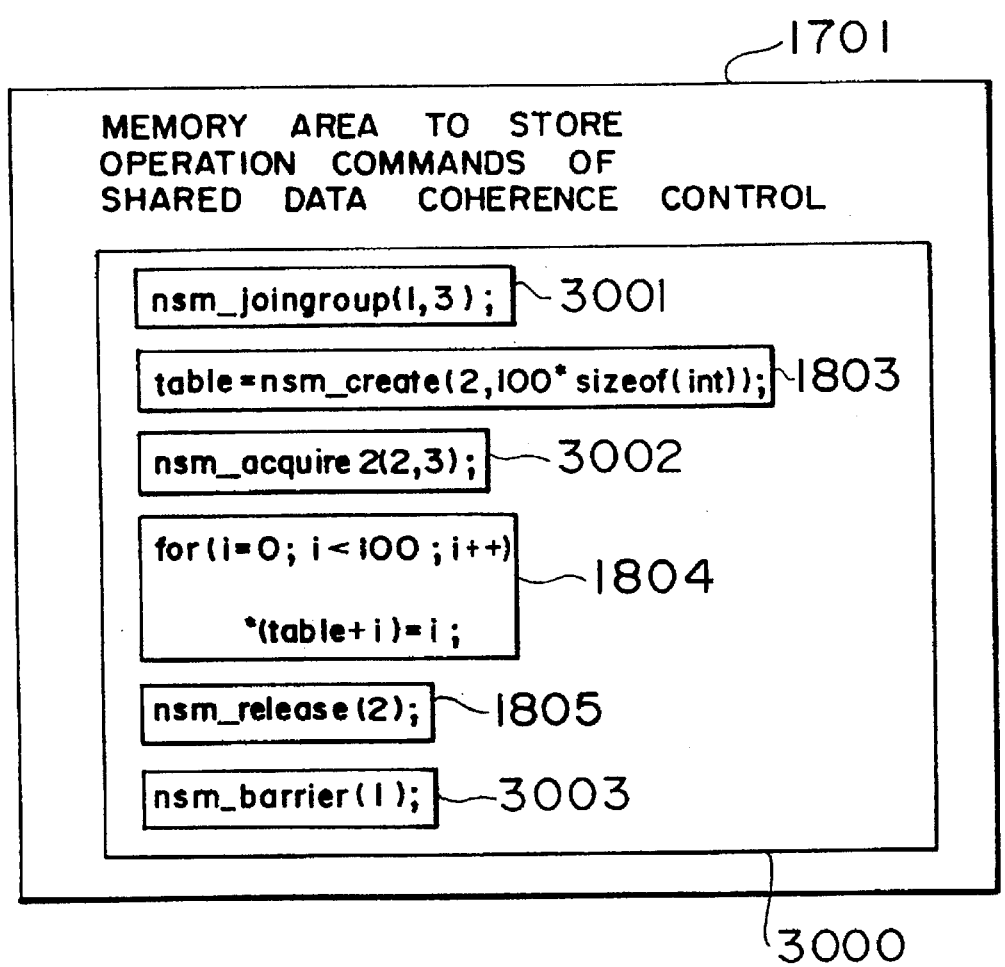
FIG. 30 shows the structure of a shared data coherence control command memory area according to the embodiment of the invention.

FIG. 30 is a diagram for explaining in detail the coherence control command memory area 1701 stored in the main storage 106 of this embodiment.

A command sequence 3001 is an example of coherence control commands in the coherence control command memory area 1701 written in a C language. The command sequence 3001 includes a group joining command 3001 for declaring a joining to a group, a command 1802 for generating shared data, a command 3002 for designating coherence control, a command 1804 for changing shared data, a command 1805 for releasing coherence control, and a command 3003 for barrier synchronization with an extended function of access number counter reset.

The commands, other than the group joining command 3001, coherence control designation command 3002, and barrier synchronization command 3003, are the same as those described with reference to FIG. 18.

The command 3001 is a command for declaring a joining to a group represented by a group identifier "1". In this embodiment, it is assumed that this command is executed before the shared data generation command 1802 and that one process is permitted to join only one group.

The command 3002 is a coherence control designation command for designating a coherence control of shared data 1802 generated by the shared data generation command 1802. This command 3002 designates a shared data identifier of shared data to be subjected to coherence control, and an access number for designating the access order of shared data. The access order of shared data may be controlled by designating a serial number as an argument of the coherence control designation command 3002.

However, if access numbers are designated collectively for the whole of the programs, a large burden is imposed on a programmer. To solve this problem, the command 3003 is provided which can independently designate serial numbers to a definite group of processes of a program.

The command 3003 instructs barrier synchronization between all processes belonging to a group indicated by the group identifier "1". In the embodiment system, in order to sequentially control the access order in accordance with the access number designated by the command 3002, an access number counter is provided for counting the number of coherence requests with access accepted. Since the barrier synchronization command 3003 has the function of resetting the access number counter, it is possible to designate the access number starting from "1" after the issuance of the command 3003.

FIG. 31 shows examples of the shared data management table 1705 and the queue 2901.

The different points of the shared data management table 705 from that shown in FIG. 19 are an addition of a group identifier 3101 for each of shared data and a replacement of the queue number 1908 by the queue number 3102. A group identifier of a group of a process which uses shared data is entered in the group identifier entry 3101 for each set of shared data. The queue number 3102 identifies one of the queues 2901.

Each queue 2901 is constituted by a sequence counter (access number counter) 3103 and a queued computer list 3104. This list 3104 is a queue for storing coherence control requests in entries as combinations of queued computer numbers 3105 and access sequence numbers 3106. The list 3104 stores coherence control requests issued by other computers using the coherence control designation command 3002 relative to shared data owned by the subject computer. The access number counter 3103 counts the number of coherence requests with access accepted, and is used for controlling the access order in accordance with the access number designated by the coherence control designation command 3002. The details of the embodiment using the queue 2901 will be explained later.

FIG. 32 shows an example of the group management table 2902. This table 2902 stores, for each group, a group identifier 3201, a number 3202 of processes reserved to join a group, a number 3203 of processes joined to a group, a process identifier 3204 of a process joined to a group, and a barrier synchronization counter field 3205.

Each process joins a group before initialization of shared data. When a group is designated by the group joining command 3001, the commands in the coherence control command memory area 1701 are read and executed to enter necessary data items in the group management table 2902. The number of processes reserving to join a group designated by the group joining command 3001 is set to the field 3202 for the number of processes reserved to join the group. In order to uniquely identify the process which issued the group joining command 3001 in the system, there is stored in the field 3204 of the number of processes joined to the group a combination of a computer number of a computer for the process and an intra-computer process identifier. As the computer number, an IP address may be used, and as the intracomputer process identifier, a process ID of UNIX may be used. The number of processes registered to the group joining process identifier field 3204 is entered in the field 3203 for the number of processes joined to the group. When the number of processes which issued the group joining command 3001 reaches the value set in the field 3202 for the number of processes reserved to join the group, parallel processing using shared data is started. The barrier counter value field 3205 is used for counting the number of barrier synchronization commands 3003 with the access number counter reset function issued by processes belonging to the group.

The contents of the group joining command 3001 are broadcast to all computers, and the same data items are written in the group management table 2902 of each computer. The details of the operation when the group joining command 3001 is issued will be later given with reference to FIGS. 43 and 44.

Figure 33:
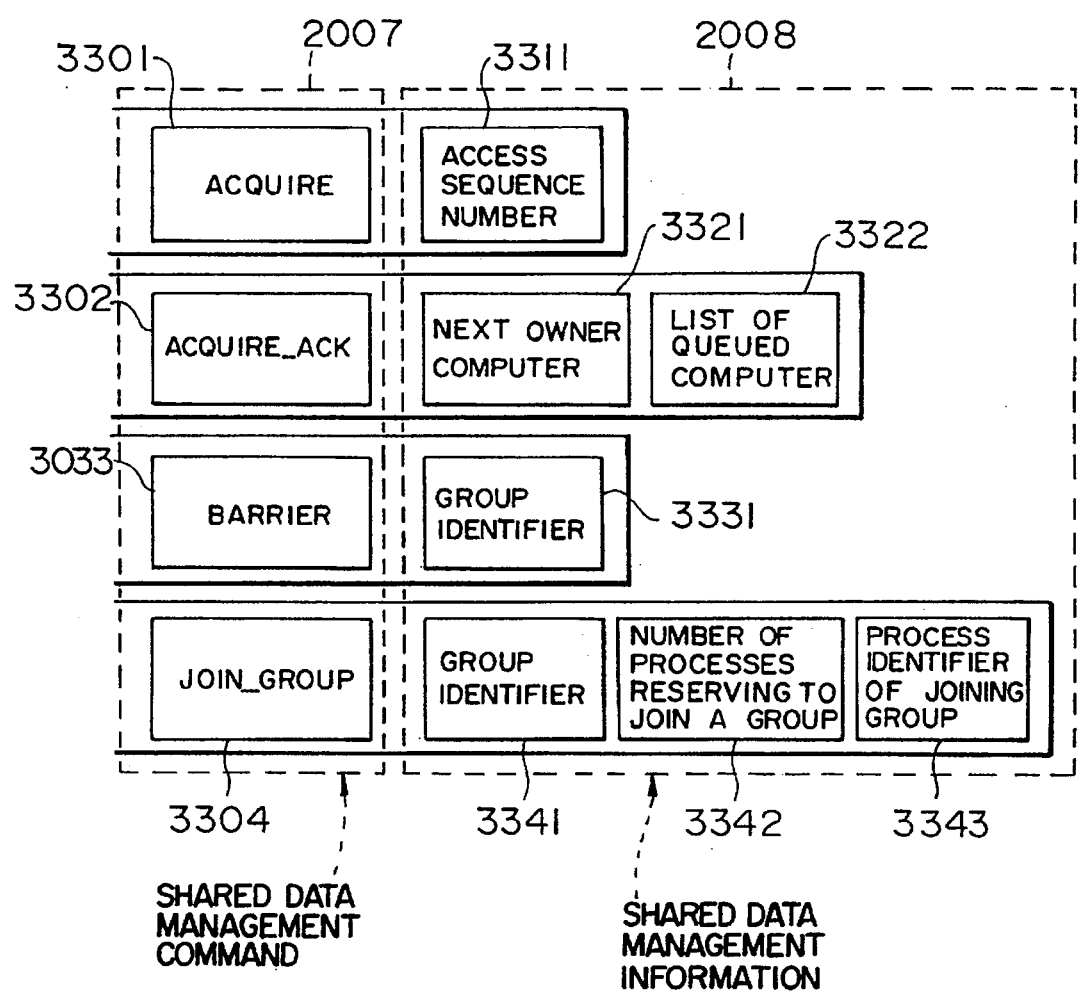
FIG. 33 is a diagram a showing the structure of a communication packet according to the embodiment of the invention.

FIG. 33 shows the details of the shared data management commands 2007 and the shared data management data 2008 in the packet header 2002 shown in FIG. 20.

The shared data management commands 2007 of this embodiment have four commands, including a coherence control request command "ACQUIRE" 3301, a coherence control acknowledge command "ACQUIRE_ACK" 3302, a barrier synchronization command "BARRIER" 3303 with the access number counter reset function, and a group joining command "JOIN_GROUP" 3304. Stored as the shared data management data 2008 are an access sequence number 3311 for the coherence control request command "ACQUIRE" 3301, a next owner computer number 3321 and a queued computer list 3322 for the coherence control acknowledge command "ACQUIRE_ACK" 3302, a group identifier 3331 for the barrier synchronization command "BARRIER" 3303 with the access number counter reset function, and a group identifier 3341, the number 3342 of processes reserved to join the group, and the process identifier 3343 of a process joined to the group, respectively, for the group joining command "JOIN_GROUP" 3304.

Only when the shared data management command 2007 is the coherence control acknowledge command "ACQUIRE_ACK" 3302, will the latest data stored at the owner computer be stored in the data field 2003.

The coherence control acknowledge command "ACQUIRE_ACK" and the barrier synchronization command "BARRIER" 3303 are multicast to the computers having a process belonging to the group, excepting the subject computer. In this case, the numbers of all computers to be multicast are written in the destination computer number field 2004 of the packet header. In order to identify each destination computer to be multicast, the following process is performed. First, reference is made to the shared data management table 1705 to obtain the group identifier 3101 of a group which uses shared data. Next, reference is made to the group management table 2902 to obtain the number 3207 of processes which have joined to the group corresponding to the group identifier. The number of processes joined to a group is written by a combination of a computer number and an intra-computer process identifier. The computer having a computer number in the number 3207 field is identified to be the destination computer.

The group joining command "JOIN_GROUP" 3304 is broadcast to all computers.

The multicast and broadcast operations are required so that a packet transmitted from each computer reaches all computers in the same order.

Figure 34:
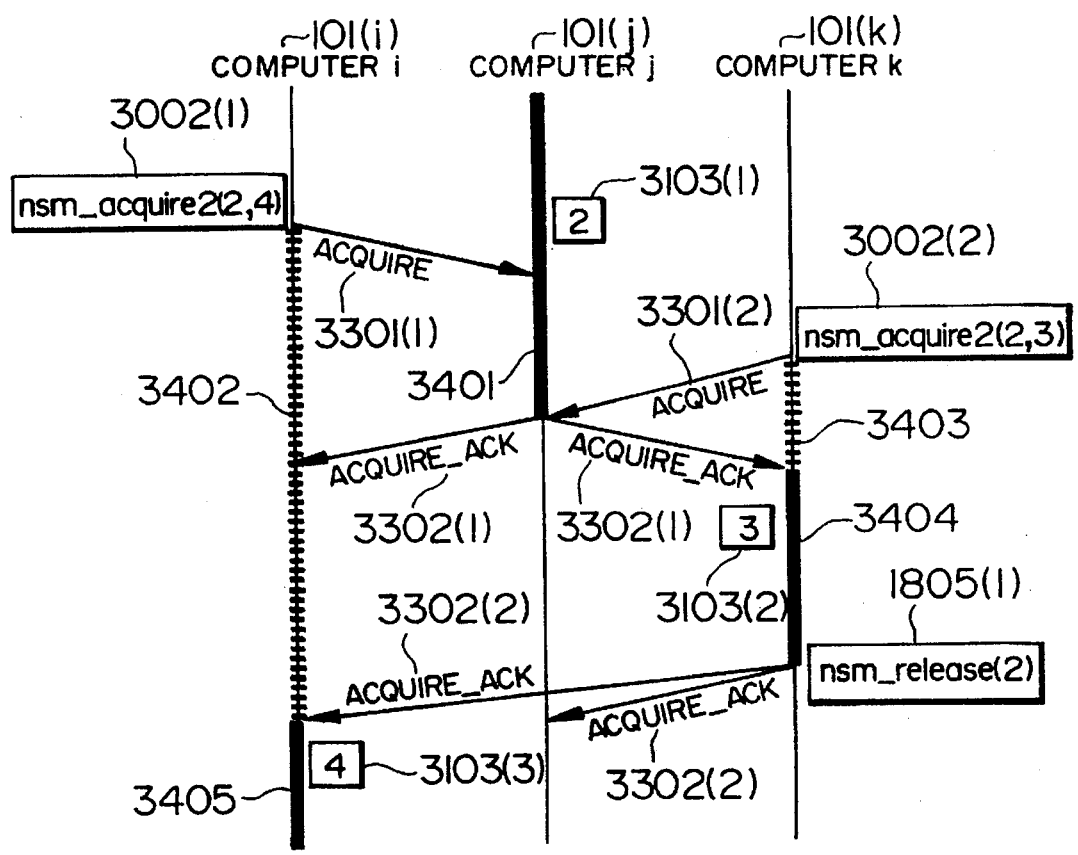
FIG. 34 is a timing chart explaining the fundamental operation when a coherence control designation command is issued according to the embodiment of the invention.

FIG. 34 is a timing chart for explaining the operation when processes on a plurality of computers 101 issue the coherence control designation command 3002. During time intervals 3401, 3404, and 3405, the computer owns the shared data of the shared data identifier "2", and during time intervals 3402 and 3403, the processes which issued the coherence control designation commands 3302 (1) and 3302 (2) are suspended.

It is assumed that the access number counter value 3103 (1) corresponding to the shared data identifier "2" is "2" during the time interval 3401.

When the process on the computer 101 (1) issues the coherence control designation command 3002 (1) by designating the shared data identifier "2" and the access number "4", the commands in the coherence control operation memory area 1704 are executed to perform the following process.

The owner computer number 1904 in the shared data management table 1705 is referred to so as to obtain the owner computer 101 (j). Next, necessary data is entered in the packet header 2002. Specifically, the number of the computer 101 (j) is written in the destination computer field 2004, the number of the subject computer is written in the source computer field 2005, the shared data identifier "2" is written in the shared data identifier field 2006, the coherence control reservation command "ACQUIRE" 3301 (1) is written in the shared data management command field 2007, and the access number "4" is written in the access number field 3311. Then, the packet is transferred to the network adapter 107 to transmit the coherence control reservation command "ACQUIRE" 3301 (1) to the owner computer 101 (j).

The contents of the coherence control reservation command "ACQUIRE" 1801 (1) transmitted from the computer 101 (i) to the computer 101 (j) are entered in the queued computer list 3104 and in the queued computer list 3322 of the coherence control acknowledge command "ACQUIRE_ACK" 3302 (1) which is transmitted to the owner computer 101 (k). Prior to transmitting the command "ACQUIRE_ACK" 3302 (1), the access number counter 3103 (1) is incremented by 1 so that the value of the access number counter 3103 (2) becomes "3". The coherence control request by the computer 101 (i) is postponed until the coherence control release command 1805 (1) is executed by the computer 101 (k).

By designating the access number using the coherence control designation command 3002, it becomes possible to realize not only the mutual exclusion necessary for the coherence control, but also synchronization for the control of the parallel program flow.

FIG. 35 is a timing chart for explaining the operation when the coherence control designation command 3002 designates an exceptional change in the access order.

In this embodiment, the access order is exceptionally changed if a predetermined specific value is set to the access number. In this example, the access is preferentially permitted when "−1" is set to the access number.

In the following, shared data having the shared data identifier "2" is used. It is assumed that the value of the access number counter 3103 (1) is "1" during a time interval 3501. The coherence control designation command 3002 (1) issued by the process on the computer 101 (k) designates to access the shared data of the shared data identifier "2" at the second time as indicated by the access number "2". In the normal case, when the process on the computer 101 (j) issues the coherence control release command 1805 (1), the coherence control acknowledge command "ACQUIRE__ACK" 3302 is transmitted to the computer 101 (k). However, if the coherence control designation command 3002 (2) issued by the computer 101 (i) designates the shared data identifier '2' and the access number "–1", then the coherence control acknowledge command "ACQUIRE__ACK" 3302 (1) is transmitted to the computer 101 (i). At this time, the value of the access number counter 3103 (2) during a time interval 3503 does not change from the value during the time interval 3501. Then, after the coherence control release command 1805 (2) is issued, the coherence control acknowledge command "ACQUIRE__ACK" 3302 (2) is transmitted to the computer 101 (k) and the value of the access numbercounter 3103 (3) becomes "2".

If there are two coherence control designation commands 3002 designating the access number "–1", the owner computer which first received the coherence control reservation command "ACQUIRE" 3301 is given a priority.

This function may be used when the access order is changed or a particular coherence control is to be preferentially performed.

FIG. 36 is a timing chart for explaining the operation when the barrier synchronization command 3003 with the access number counter reset function is executed.

During a time interval after the process on the computer 101 (k) issued the coherence control designation command 3302 (1) by designating the shared data identifier "2" and an access number '8', the value of the access number counter 3103 (2) is "8". The barrier synchronization command 3003 with the access number counter reset function is a command for providing a barrier synchronization and designating the access number "1" again by resetting the access number counter to "0"

When the process on the computer 101 (j) issues the barrier synchronization command 3003, the commands in the coherence control command memory area 1704 are executed and the group management table 2902 is referred to so as to increment the barrier counter 3205 of the corresponding group by "1". The barrier synchronization command "BARRIER" 3303 is broadcast to computers having a process joined to the group. The computers 101 (i) and 101 (k) which have received the barrier synchronization command "BARRIER" 3303 refer to the group management tables 2902 and increment the barrier counters 3205 of the corresponding group by "1". When the processes on the computers 101 (i) and 101 (k) issue the barrier synchronization commands 3003 (2) and 3003 (3), a similar process is performed. The process which issued the barrier synchronization command 3003 is suspended until all processes in the group issue the barrier synchronization commands, as indicated at time intervals 3605 and 3606.

After the process of each computer 101 executes the barrier synchronization command 3003 and when the value of the barrier counter 3205 becomes equal to the number 3203 of processes joined to the group, the value of the access number counter 3103 (3) is set to "0" to continue the process. After this process, the coherence control designation command 3002 (2) can designate the access number starting from "1".

In this manner, programs whose modules are given serial numbers can be written, reducing the burden on the programmer.

Figure 37:
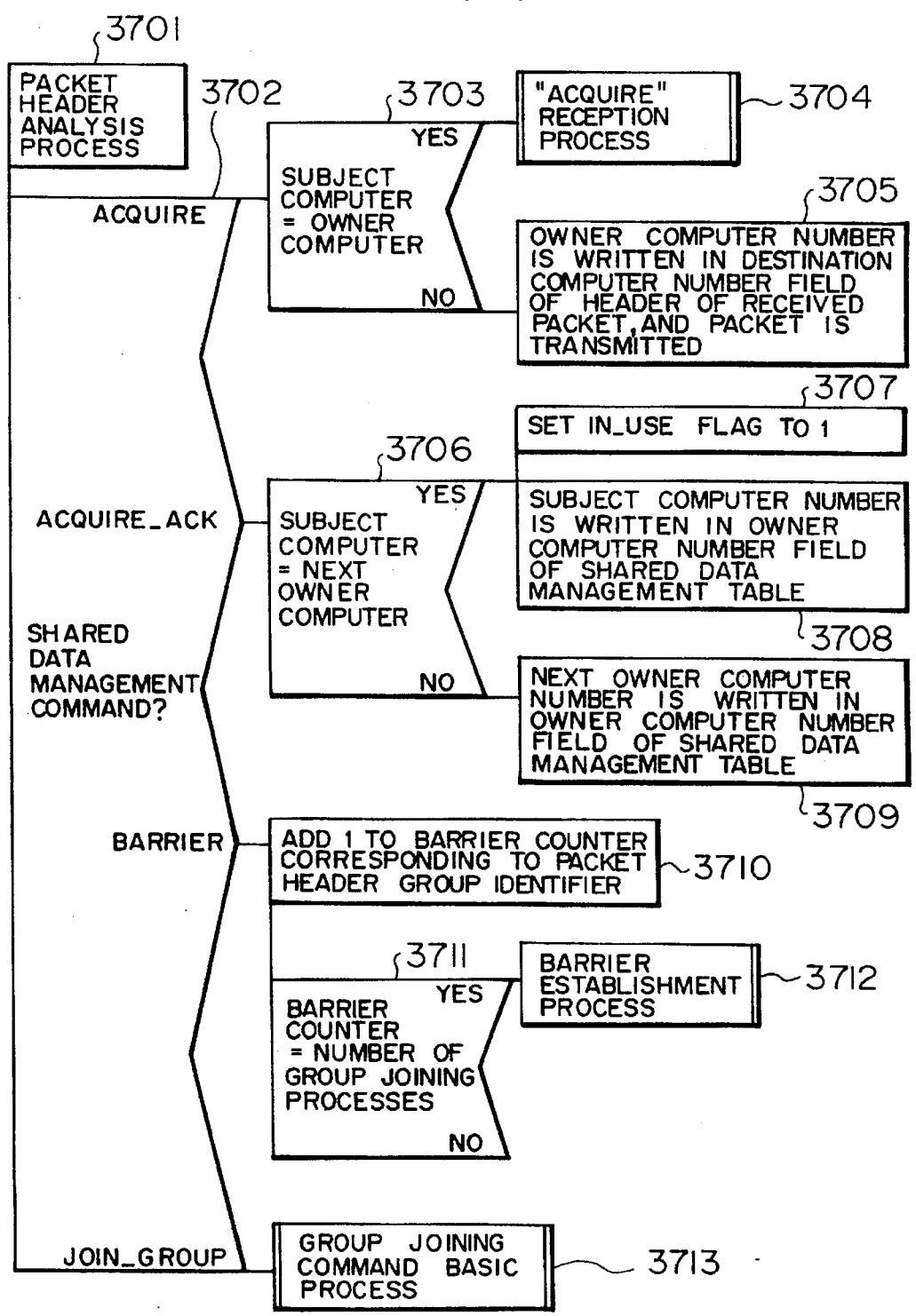
FIG. 37 is a PAD explaining the operation by commands in a shared data coherence control command memory area when a communication packet is received according to the embodiment of the invention.

FIG. 37 is a PAD for explaining the operations by commands in the coherence control execution command memory area 1704, which commands are executed when the network packet 2001 is received from the network adapter 107.

First, by a packet analysis process at Step 3701, the network packet 2001 is separated into the destination computer number 2004, source computer number 2005, shared data identifier 2006, shared data management command 2007, shared data management data 2008, and shared data 2003. Next, at Step 3702, the contents of the shared data management command field 2007 are checked to discriminate between the coherence control reservation command "ACQUIRE" 3301, coherence control acknowledge command "ACQUIRE__ACK" 3302, barrier synchronization command "BARRIER" 3303, and group joining command "JOIN__GROUP" 3304.

If the shared data management command 2007 is the coherence control reservation command "ACQUIRE" 3301, the control advances to Step 3703 whereat it is determined whether the owner computer 1904 written in the shared data management table 1705 is the subject computer or not. If so, at Step 3704, an "ACQUIRE" reception process is performed. If the owner computer changes after another computer transmits the coherence control reservation command "ACQUIRE" 3301, there may occur a case wherein the coherence control reservation command "ACQUIRE" 3301 reaches a computer other than the owner computer. In such a case, the control advances to Step 3705 whereat the received packet is transmitted to a new owner computer. Specifically, the received packet is transmitted after the owner computer number 1904 in the shared data management table 1705 is written in the destination computer number field 2005 of the header 2002.

If the shared data management command 2007 is the coherence control acknowledge command "ACQUIRE__ACK" 3302, the control advances to Step 3706 whereat it is checked to determine whether the subject computer has the next owner computer number 3321 in the received packet. If so, it means that permission is given to enter a coherence control time interval. Then, at Step 3707, the in-use flag 1906 in the shared data management table 1705 corresponding to the shared data identifier 1901 is set to "1". Next, at Step 3708, the subject computer number is written in the owner computer number field 1904 of the shared data management table 1705.

If the subject computer is not the next owner computer 3321, the control advances to Step 3709 whereat the next owner computer number 3321 is written in the owner computer number field 1904 of the shared data management table 1705. In this manner, the destination owner computer can be known to which computer the coherence control reservation command "ACQUIRE" 3301 is transmitted from the subject computer.

If the shared data management command 2007 is the barrier synchronization command "BARRIER" 3303, the control advances to Step 3710 whereat the barrier counter 3205 in the group management table 2902 corresponding to the group identifier 3331 is incremented by "1". Next, at Step 3711, it is checked to determine whether the value of the barrier counter 3205 is equal to the number 3203 of processes joined to the group. If equal, a barrier establishment process is executed at Step 3712 which will be detailed later with reference to FIG. 44.

Figure 38:
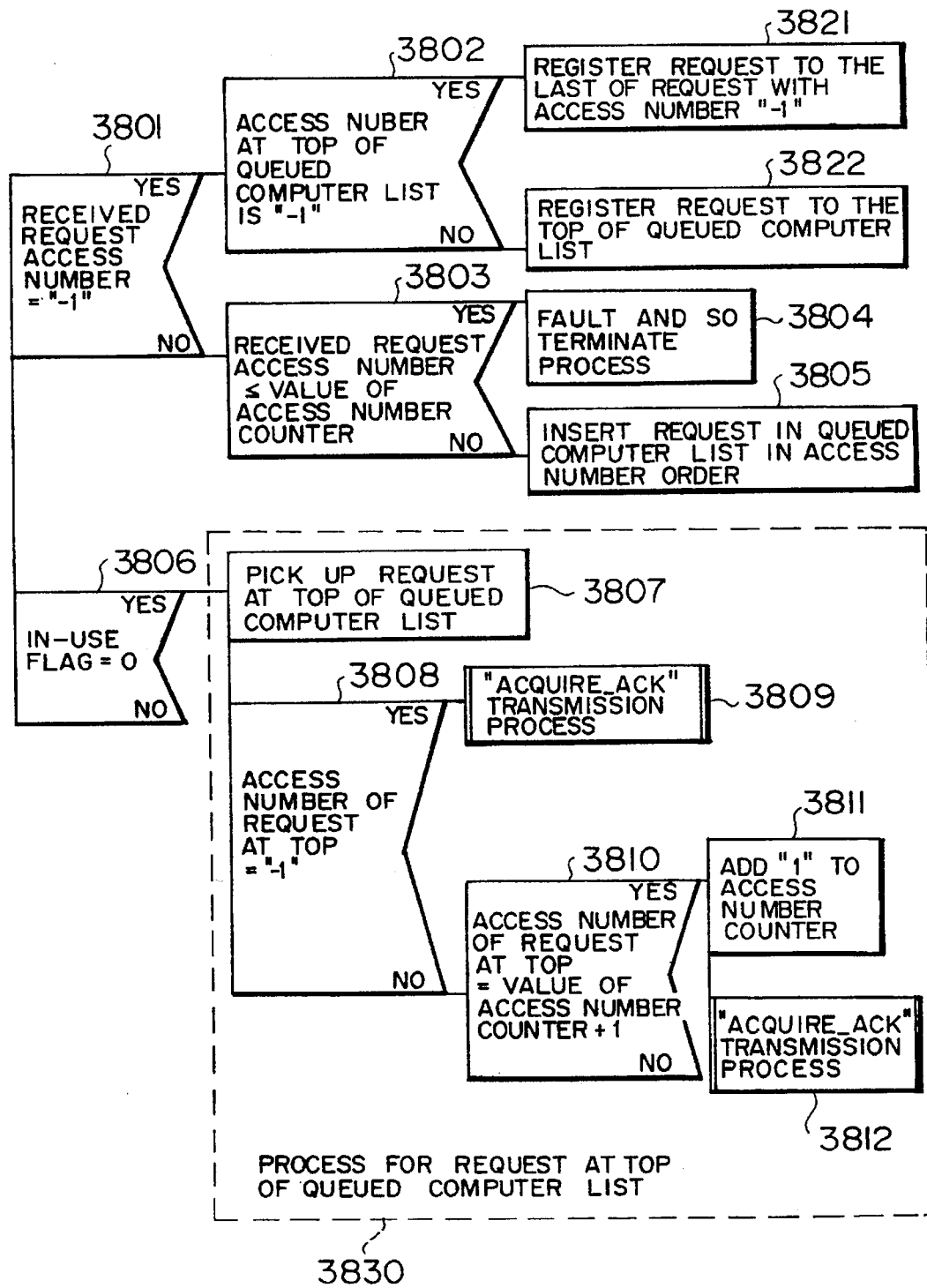
FIG. 38 is a PAD explaining the operation by commands in a shared data coherence control command memory area when a coherence control request command is received according to the embodiment of the invention.

FIG. 38 is a PAD for explaining the details of the "ACQUIRE" reception process 3704.

The following process is performed for the shared data corresponding to the shared data identifier 2006 written in the header 2002 of the received packet. The queued computer list 3104 for the shared data can be identified by the queue number 3102 in the shared data management table 1705.

First, at Step 3801, it is checked to determine whether the access number 3311 in the received packet is "−1". If it is "−1", the control advances to Step 3802.

At Step 3802, if the access number 3106 at the top in the queued computer list 3104 corresponding to the shared data is "−1", the control advances to Step 3821.

At Step 3821, if there are a plurality of consecutive coherence control requests with the access number "−1" starting from the top of the queued computer list 3104, the coherence control request of the received packet is added to the last of the control requests with the access number "−1". This addition of a coherence control is performed by writing the destination computer number 2005 in the header 2002 of the received packet in the queued computer field 3105 and writing the access number 3311 in the access number field 3106.

If the access number 3106 of the coherence control request at the top in the queued computer list 3104 corresponding to the shared data is not "−1", the control advances to Step 3822 whereat the coherence control request of the received packet is added to the top of the queued computer list 3104.

If the coherence control designation command "ACQUIRE" 3301 designating the access number "−1" is issued, a process of permitting an access in the order of reaching the owner computer is performed at Steps 3802, 3821, and 3822.

If the access number 3311 in the received packet is not "−1", the control advances to Step 3803. If the value of the access number counter 3103 corresponding to the shared data is larger than the access number 3311 in the received packet, the control advances to Step 3804 whereat a fault is declared to terminate the process. If not, the control advances to Step 3805 whereat the coherence control request is registered to the queued computer list in the ascending order of the access number.

Next, at Step 3806, the shared data management table 1705 is checked to determine whether the in-use flag 1906 for the shared data is "0". If "0" the control advances to Step 3807 whereat it is checked to determine whether the access number 3106 of the coherence control request at the top of the queued computer list 3104 for the shared data is "−1". If it is "−1" a coherence control acknowledge command "ACQUIRE_ACK" 3320 transmission process is performed immediately the details of which will be explained later with reference to FIG. 39.

If the access number of the coherence control request at the top is not "−1" the control advances to Step 3810 whereat it is checked to determine whether the access number 3106 at the top is equal to the value of the access number counter 3103+1. If it is equal, at Step 3811, "1" is added to the access number counter 3103. At Step 3812, like Step 3811, the coherence control acknowledge command "ACQUIRE_ACK" 3302 transmission process is performed.

With the processes at Steps 3810, 3811, and 3812, it is possible to arrange the access order to the shared data in accordance with the access number in the case other than the access number 1660 "−1".

FIG. 39 is a PAD for explaining the detailed "ACQUIRE_ACK" transmission process at Steps 3809 and 3812 shown in FIG. 38.

In the coherence control acknowledge command "ACQUIRE_ACK" 3302 transmission process, first at Step 3901, the coherence control request at the top of the queued computer list 3104 for the shared data is picked up. The computer corresponding to the queued computer 3105 in the picked-up request is set to the next owner computer, and the queued computer number is written in the owner computer field 1904 of the shared data management table 1705.

Next, at Step 3902, destination computer numbers of all the computers to which the coherence control acknowledge command "ACQUIRE_ACK" 3302 is multicast, are written in the destination computer number field 2004 of the packet header.

Also written are: the shared data identifier 1901 for the shared data identifier field 2006 of the packet header; the "ACQUIRE_ACK" command 3302 for the shared data management command field 2007 of the packet header; the next owner computer number for the next owner computer number field 3321 of the packet header; and the queued computer list 2901 corresponding to the shared data identifier 2006 for the queued computer list field 3322 of the packet header 2002.

Next, at Step 3903, data of the size 1903 and distance from the start address 1902 written in the shared data management table 1705 is copied to the shared data field 2003.

Lastly, at Step 3904, the network packet is transferred to the network adapter 107 to multicast the packet.

Figure 40:
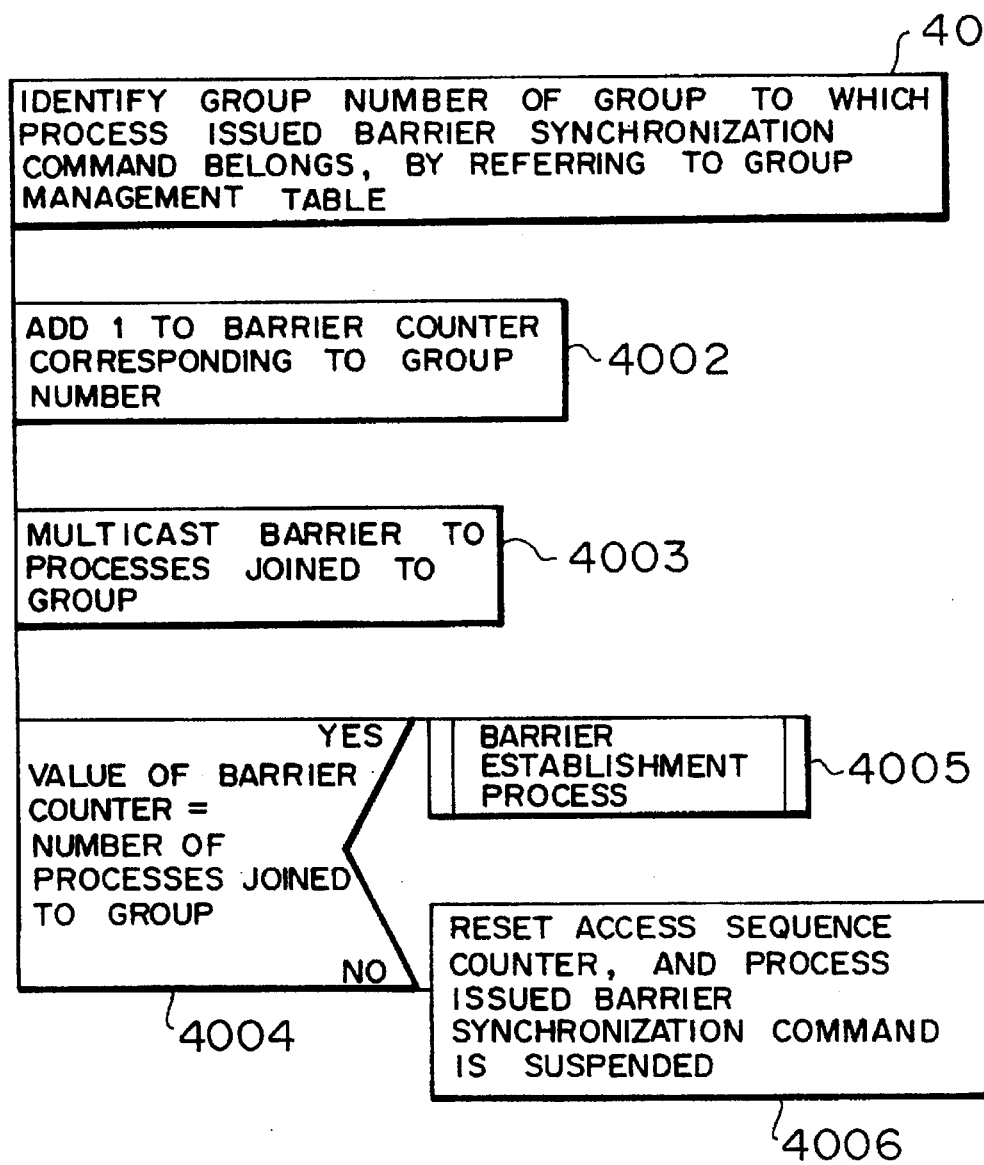
FIG. 40 is a PAD explaining the operation by commands in a shared data coherence control command memory area when the barrier synchronization command with an access number reset function is issued according to the embodiment of the invention.

FIG. 40 is a PAD for explaining the operation by commands in the coherence control execution command memory 1704, which commands are executed when the barrier synchronization command 3003 is issued.

At Step 4001, the group joining process identifier field 3204 of the group management table 2902 is referred to so as to identify the group identifier 3201 of the group to which the processes which issued the barrier synchronization command 3003 belong.

This identified group is used in the following description by way of example.

At Step 4002, "1" is added to the barrier counter 3205 corresponding to the group identifier 3201.

At Step 4003, the barrier synchronization command "BARRIER" 3303 is multicast to the computers having a process joined to the group. In this case, in the packet header 2002, there are written the barrier synchronization command "BARRIER" 3303 for the shared data management command field 2007 and the group identifier for the group identifier field 3331.

At Step 4004, it is checked to determine whether the value of the barrier counter 3205 is equal to the number 3203 of processes joined to the group. If equal, the control advances to Step 4006 to perform the barrier establishment process. If not equal, the control advances to Step 4006 whereat the process which issued the barrier synchronization command 3003 is suspended. This suspension may be continued until the process which issued the barrier synchronization command 3003 is permitted to continue the process, by a command in the coherence control execution command memory area 1704.

Figure 41:
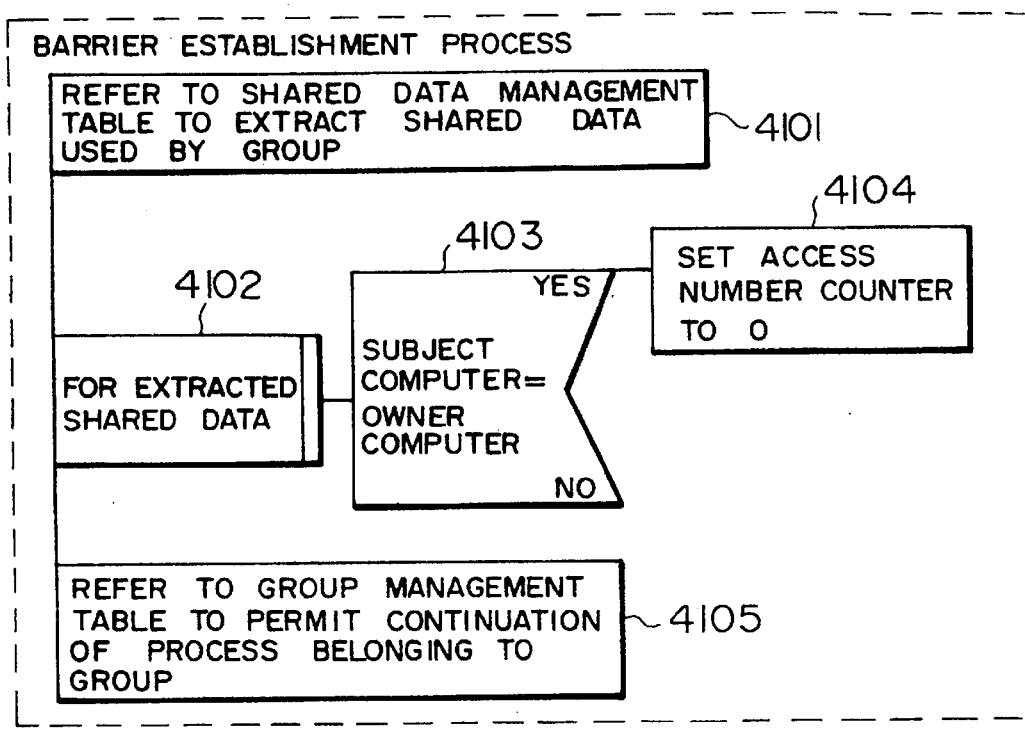
FIG. 41 is a PAD explaining the operation by commands in the shared data coherence control command memory area when a barrier synchronization is established according to the embodiment of the invention.

FIG. 41 is a PAD for explaining the detailed operation of the barrier establishment process at Step 3712 in FIG. 37 and at Step 4005 in FIG. 40.

At Step 4101, the group identifier field 3101 of the shared data management table 1705 is referred to so as to derive shared data used by the group.

Step 4102 indicates to repeat Steps 4103 and 4104 for the shared data derived at Step 4101. At Steps 4103 and 4104, if the owner computer 1904 for each set of shared data is the subject computer, the access number counter 3103 for the shared data is reset to "0".

The barrier establishment process is executed by all computers at the same time. Therefore, the access number counters 3103 for all sets of shared data belonging to the group are reset to "0"

When the process executes the barrier synchronization command 3003, the process execution is suspended until the barrier is established. At Step 4105, the suspended process is permitted to continue its operation.

Figure 42:
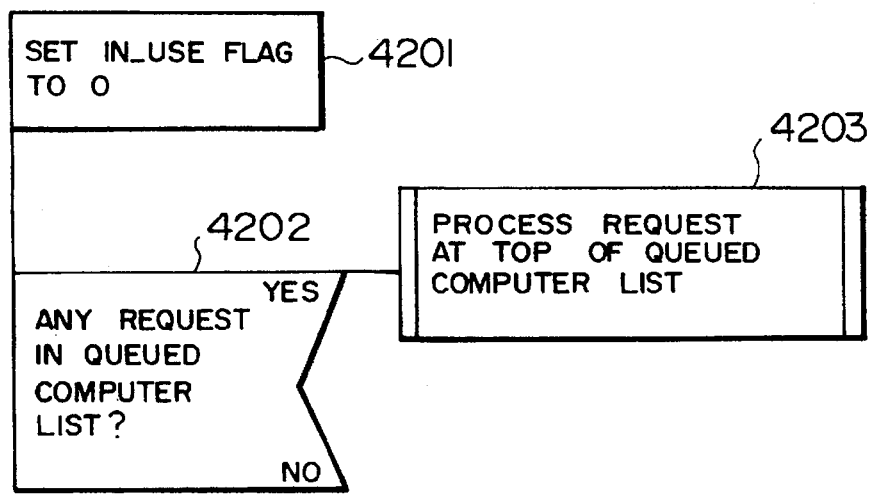
FIG. 42 is a PAD explaining the operation by commands in the shared data coherence control command memory area when a coherence control release command is issued according to the embodiment of the invention.

FIG. 42 is a PAD for explaining the operation when the coherence control release command 1805 is issued and commands in the coherence control operation memory area 1704 are executed.

First, the shared data of the shared data identifier designated as an argument of the coherence control release command 1805 is used as the process subject. At Step 4201, the in-use flag 1906 in the shared data management table 1705 corresponding to the shared data is set to "0".

Next, at Step 4202, it is checked to determine whether there is a coherence control request in the queued computer list 3104 for the shared data. If present, at Step 4203, the coherence control request at the top of the queued computer list is processed similar to Step 3830 shown in FIG. 38.

Figure 43:
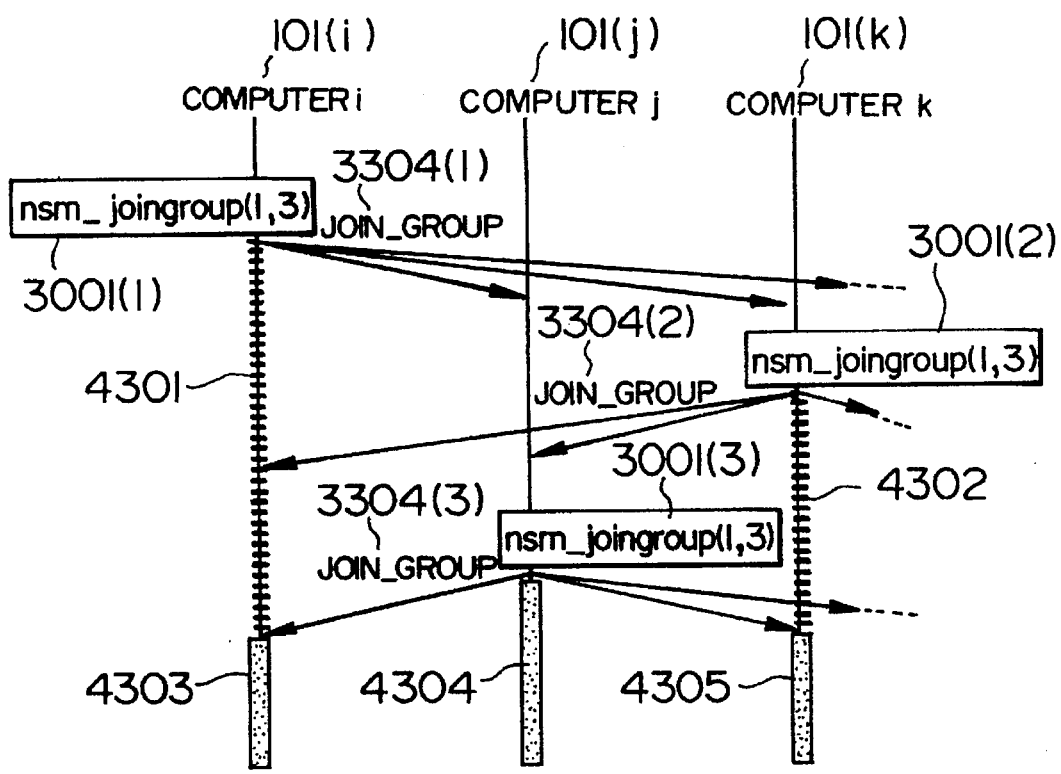
FIG. 43 is a timing chart explaining the operation when a group joining command is issued according to the embodiment of tho invention.

FIG. 43 is a timing chart showing the operation when the group joining command 3001 is issued. The group joining command 3001 is executed once before each application uses shared data. When a process on the computer 101 (i) issues the group joining command 3001 (1), commands in the coherence control execution command area 1704 are executed and the group joining command "JOIN_GROUP" 3304 (1) is broadcast to all computers. At this time, the group identifier, and the number of processes joined to the group, respectively, used as arguments of the group joining command 3001 (1), and the process identifier of the process which issued the group joining command 3001 (1), are written in the shared data management data field 2008 of the packet header 902. The process which issued the group joining command 3001 (1) is suspended during a time interval 4301 until a command in the coherence control execution command area 1704 is executed to permit the execution of the process.

When processes on the computers 101 (k) and 101 (j) issue the group joining commands 3001 (2) and 3001 (3), similar operations are performed. When the number of processes which issued the group joining command 3001 reaches the number of processes joined to the group, the suspended process restarts. Thereafter, shared data is accessed by each process joined to the group.

Figure 44:
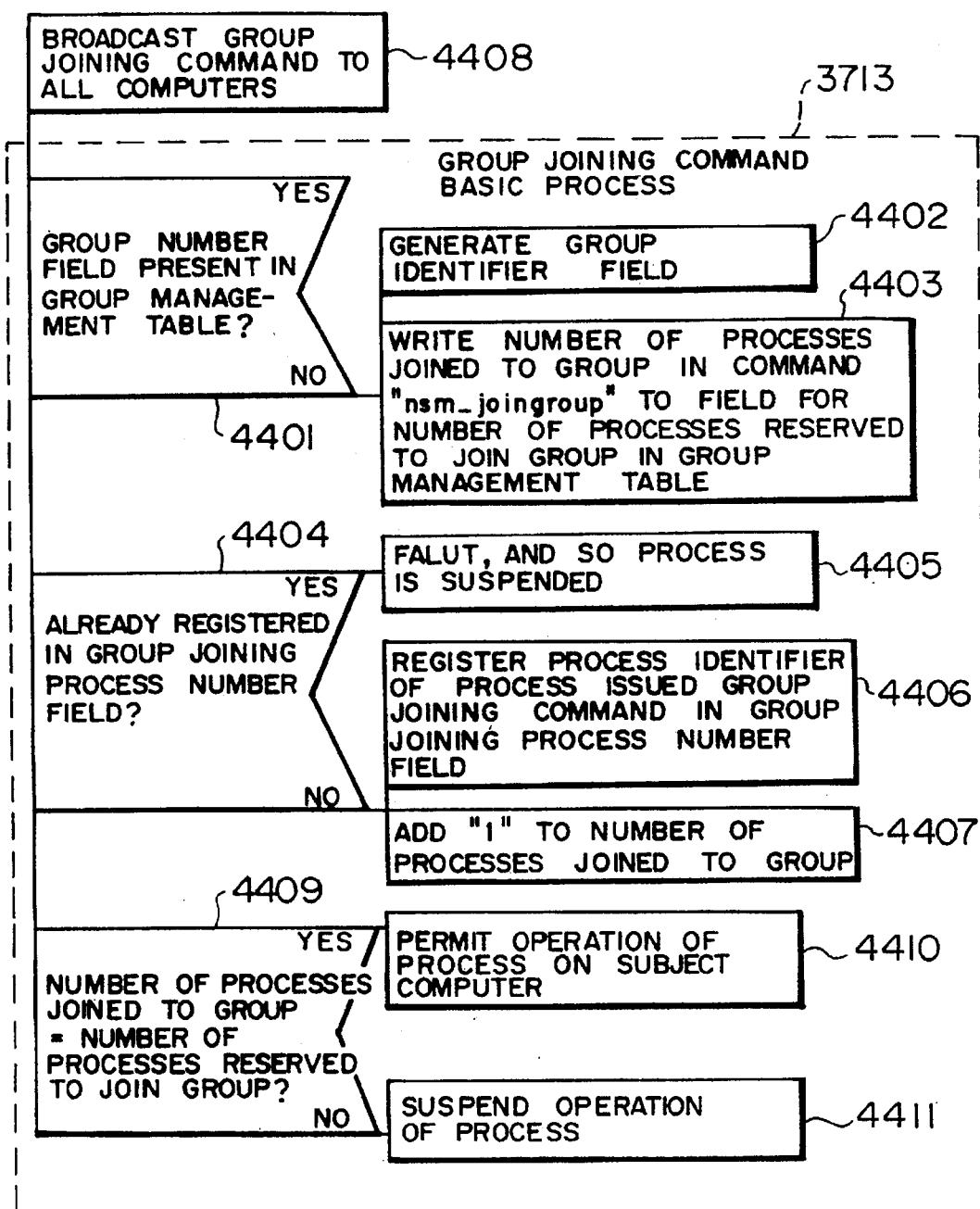
FIG. 44 is a PAD explaining the operation by commands in the shared data coherence control command memory area when the group joining command is issued according to the embodiment of the invention.

FIG. 44 is a PAD for explaining the operation when the group joining command 3001 is issued and commands in the coherence control execution command memory area 1704 of the computer are executed.

When a process on the subject computer issues the group joining command 3001, at Step 4408, the group joining command "JOIN_GROUP" 3304 is broadcast to all computers.

The same operation of the group joining basic process 3713 described below is applicable to the case when the group joining command 3304 is received from another computer.

At Step 4401, it is checked to determine whether the group management table 2902 has a field for storing the group identifier designated by the group joining command 3001. If not, the control advances to Step 4402 whereat the group identifier field is generated in the group management table 2902. At Step 4403, the number of processes designated by the group joining command 3001 is written in the group management table 2902 in the field 3202 for the number of processes reserved to join the group.

At Step 4404, it is checked to determine whether the process identifier of the process which issued the group joining command 3001 has been registered in the group joining process identifier field 3204. If already means that the means that the process has issued the group joining command a plurality of times. Therefore, at Step 4405, it is judged a fault has occurred and the process is terminated. If not registered, the control advances to Step 4406 whereat the process identifier of the process which issued the group joining command 3001 is registered to the group joining process identifier field 3204. At Step 4407, "1" is added to the number 3203 of processes joined to the group.

At Step 4409, it is checked to determine whether the number 3203 of processes joined to the group is equal to the number 3202 of processes reserved to join the group. If equal, the control advances to Step 4410 whereat the group joining process identifier field 3204 is referred to so as to permit the operation of the process on the subject computer. If the number 3203 of processes joined to the group does not reach the number 3202 of processes reserved to join the group, the control advances to Step 4411, whereas the process which issued the group joining command 3001 is suspended.

According to the invention, the number of packets necessary for synchronization for the shared data coherence control and for the control of parallel programs can be reduced in a loosely coupled computer system having a plurality of computers interconnected by a network, each computer having an independent address space, and the main storage of each computer having a shared data memory area for sharing data between computers. Accordingly, it is possible to efficiently use network resources. Furthermore, since synchronization for both the shared data coherence control and the control of parallel programs can be established, a burden on a programmer writing parallel programs can be reduced. Accordingly, problems associated with parallel processing, particularly a problem caused by a longer calculation time than a communication time and a difficulty of automatic load distribution, can be efficiently solved.

What is claimed is:

1. A distributed shared memory management method for a computer network system in which a plurality of computers are interconnected by a network and each computer shares data distributed and stored in a storage of each computer, comprising the steps of:

from an application on each computer, designating the data distributed and stored in a storage of each computer using a shared data unit determined by an address and a size; and by a shared data management function of at least one of the plurality of computers, managing the shared data using the shared data unit;

wherein a copy of shared data is generated and stored, and the application on each computer accesses said copy; and wherein a coherence control between data areas shared by each computer is designated by the shared data unit determined by the address and the size; and wherein a desired area of data areas shared by each computer is designated as a projection to a one-dimensional array in said storage, and the one-dimensional array is designated as said shared data unit.

2. The method according to claim 1, wherein an area for storing said one-dimensional array is reserved in said storage when said shared data unit is designated.

3. The method according to claim 1, wherein a hierarchical relation between a plurality of shared data units shared by each computer is defined and added to the shared data unit which designated said coherence control, and said coherence control is also collectively designated by the shared data units defined as having lower hierarchical levels.

4. The method according to claim 3, wherein when said coherence control is performed, desired lower hierarchical shared data units are selected from the shared data units defined as having lower hierarchical levels of said designated shared data unit.

5. A method according to claim 1, wherein means for exchanging data between computers includes means for exchanging data of said shared data unit subjected to said coherence control and another means for exchanging data, one of said data exchanging means is selected in accordance with an allocation of data on said storage to be exchanged.

6. A distributed shared memory management system for a computer network system in which a plurality of computers are interconnected by a network and each computer shares data distributed and stored in a storage of each computer, at least one of the plurality of computers comprising:

a shared data management table for managing said shared data distributed in the storage of each computer by a shared data unit for each computer, an application on a computer designating said shared data according to said shared data unit determined by an address and a size;

shared data area management means for managing said shared data management table;

packet sending and receiving means for sending and receiving said shared data to and from another computer by using a packet;

shared data identifier assigning means for checking a memory area for storing said shared data and for assigning a shared data identifier to said memory area in order to generate a packet to be transmitted via said packet sending and receiving means; and means for storing a copy of said shared data for read and write operations by an application on the computer.

7. The system according to claim 6, wherein said shared data management table includes a shared data identifier entry for storing a shared data identifier, a management node flag entry for storing a flag indicating whether the computer manages said shared data, a shared data address entry for storing a start address of said shared data, a shared data copy address entry for storing a start address of a copy of said shared data, a shared data size entry for storing a size of said shared data, and a computer list entry for storing a computer number of a computer storing said shared data.

8. The system according to claim 7, wherein said shared data management table includes a division flag entry for storing a flag indicating whether said shared data used by an application is in a continuous area, a shared data element number entry for storing data representing a number of shared data division elements, and a shared data offset entry for storing an interval between division elements.

9. The system according to claim 8, wherein if said shared data has a data structure, said shared data management table includes a data structure definition entry for storing a data structure definition, a data structure size entry storing a data length of the data structure, a hierarchical element flag entry for storing a hierarchical relationship between a plurality of sets of shared data, and a hierarchical element shared data identifier entry for storing a shared data identifier of a hierarchical element.

10. A distributed shared memory management method for a computer network system in which a plurality of computers are interconnected by a network and each computer shares data distributed and stored in a storage of each computer, comprising the steps of:

from an application on each computer, designating the data distributed and stored in a storage of each computer using a shared data unit determined by an address and a size;

determining a management computer for managing said shared data of said designated shared data unit for each computer, and requesting said management computer for using said shared data;

checking at said management computer whether said designated shared data is in use;

if not in use, newly registering information on said designated shared data to said management computer;

if in use, registering information on the computer newly designated a use of said shared data to said management computer and informing said information to another computer; and obtaining, at said computer which has been requested to use said shared data, said shared data distributed to the storage of each computer, and generating a copy of said shared data;

wherein a desired area of data areas shared by each computer is designated as a projection to a one-dimensional array in said storage, and the one-dimensional array is designated as said shared data unit.

11. A distributed shared memory management system for a computer system having a plurality of computers interconnected by a network, each computer having an independent address space and logically sharing data physically distributed to a storage of each computer, wherein:

each computer running a program for reading and changing said shared data comprises a coherence control designation means for designating to enter a mutual exclusion state in which plural computers cannot change said logically single shared data, coherence control release means for designating a release of said mutual exclusion state, and coherence control execution means for reflecting the contents of said shared data which has changed between the operations by said coherence control designation means and said coherence control release means, upon said logically single shared data in another computer;

at least one of the plurality of computers comprises request message queue means for storing a coherence control request message issued by said coherence control execution means when said coherence control designation means is executed;

said coherence control designation means includes means for designating an order of reading and changing said shared data; and said request message queue means includes counter means for storing a current state regarding the control of the order of reading and changing said shared data and means for storing a value regarding the control of the order of reading and changing said shared data.

12. The distributed shared memory management system according to claim 11, wherein as the value regarding the control of the order of reading and changing said shared data and designated by said coherence control designation means, a number of programs whose order of reading and changing said shared data is to be determined and a value of a priority of the program over another program for reading and changing said shared value are designated, said counter means of said request message queue means stores the number of programs whose order of reading and changing said shared data is to be determined, and said means of said coherence control designating means for storing a value regarding the control of the order of reading and changing said shared data stores the value of a priority of the program over another program for reading and changing said shared data.

13. The distributed shared memory management system according to claim 11, wherein said coherence control designation means includes means for setting a number representing the order of reading and changing said shared data, said counter means of said request message queue means includes means for counting said number representing the order of reading and changing said shared data, and said means of said coherence control designating means for storing a value regarding the control of the order of reading and changing said shared data stores the value representing the order of reading and changing said shared data.

14. The distributed shared memory management system according to claim 13, wherein synchronization means for making programs on the plurality of computers stand by at the same time, is provided, said synchronization means including means for setting said counter means to a desired value.

15. The distributed shared memory management system according to claim 13, wherein if said means for setting a number representing the order of reading and changing said shared data sets said specific value, said request message queue means rearranges the order of the contents of stored coherence control requests to have a predetermined order.

16. The distributed shared memory management system according to claim 11, wherein synchronization is established at the beginning of a coherence control time interval and continues until coherence of said shared data is ensured.

17. The distributed shared memory management system according to claim 11, wherein if the value of said counter means takes a value other than a specific value, the contents of said coherence control request message for said shared data are stored in said request message queue means.

18. The distributed shared memory management system according to claim 11, wherein in response to a coherence control request from another computer, said request message queue means changes the order of storing the contents of said coherence control request message, in accordance to the value regarding the control of the order of reading and changing said shared data.

19. The distributed shared memory management system according to claim 11, wherein said coherence control designation means includes means for designating a reservation of a coherence control request and means for waiting an acknowledgement of the coherence control request.

20. A distributed shared memory management system for a computer system having a plurality of computers interconnected by a network, each computer having an independent address space and logically sharing data physically distributed to a storage of each computer, wherein at least one of the plurality of computers comprises:
coherence control means for receiving a request for shared data, including a coherence control request of said shared data distributed to the storage of each computer during a desired time interval; and
means for storing a request for said shared data from another computer,
wherein said coherence control means includes shared data designating means for designating said shared data by an identifier and a length common in each computer, coherence control acquire means for designating a coherence control of said shared data during a desired time interval of each program, and coherence control release means for releasing a designation of the coherence control, and
wherein synchronization is established at the beginning of said designated time interval and continuous until coherence of said shared data is entered.

21. The distributed shared memory management system according to claim 20, wherein said coherence control acquire means include means for setting a value to be added to said counter for counting a wait number of a coherence control request of said shared data in said means for storing a request for said shared data.

22. A distributed shared memory management system for a computer system having a plurality of computers interconnected by a network, each computer having an independent address space and logically sharing data physically distributed to a storage of each computer, wherein at least one of the plurality of computers comprises:
coherence control means for receiving a request for shared data, including a coherence control request of said shared data distributed to the storage of each computer during a desired time interval; and
means for storing a request for said shared data from another computer,
wherein said means for storing a request for said shared data includes a counter for counting a number of queued coherence control requests of said shared data and means for storing a priority of the request for said shared data, and
wherein said means for storing a request for said shared data from another computer, changes the order of storing the coherence control requests of said shared data.

* * * * *